(12) United States Patent
Fan et al.

(10) Patent No.: US 12,443,633 B1
(45) Date of Patent: Oct. 14, 2025

(54) DETERMINING DEVICE CONTEXT

(71) Applicant: Amazon Technologies, Inc., Seattle, WA (US)

(72) Inventors: Xing Fan, Redmond, WA (US); Vasiliy Radostev, Seattle, WA (US); Jie Bao, Sammamish, WA (US); Muddu Krishna Chintha, Dublin, CA (US); Xiaojiang Huang, Bellevue, WA (US); Yi Luo, Issaquah, WA (US); Chenlei Guo, Redmond, WA (US); Nikko Strom, Kirkland, WA (US); Casey Stuart Smith, Bainbridge Island, WA (US); Spyridon Matsoukas, Hopkinton, MA (US); Priti Bisaria, Los Gatos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 260 days.

(21) Appl. No.: 18/143,285

(22) Filed: May 4, 2023

Related U.S. Application Data

(60) Provisional application No. 63/494,134, filed on Apr. 4, 2023.

(51) Int. Cl.
   *G06F 15/08* (2006.01)
   *G06F 16/3329* (2025.01)
   *G10L 15/08* (2006.01)

(52) U.S. Cl.
   CPC .......... *G06F 16/3329* (2019.01); *G10L 15/08* (2013.01)

(58) Field of Classification Search
   CPC ........ G06F 1/3231; G06F 3/011; G06F 3/017; G06F 16/3329; G06F 40/279; G06F 40/30; G06F 3/0416; G06F 8/38; G06F 9/451; G06F 16/244; G06F 16/3344; G06F 16/345; G06F 16/9024; G06F 16/972; G06F 40/237; G06F 40/284; G06N 3/044; G06N 3/08; G06N 20/00; G06Q 10/025; G06Q 30/0261; G06Q 30/0271; G06Q 10/10; G06Q 10/1053; G06V 30/274; G09G 5/363; G10L 15/08; G10L 15/26; G10L 17/06;
   (Continued)

(56) References Cited

U.S. PATENT DOCUMENTS 10,431,188 B1 * 10/2019 Nelson ................... G09G 5/363
10,762,903 B1 *  9/2020 Kahan ..................... G10L 15/26
(Continued)

*Primary Examiner* — Gerald Gauthier
(74) *Attorney, Agent, or Firm* — Pierce Atwood LLP

(57) ABSTRACT

A system may be configured to receive and process various signals to generate a natural language description of a user's environment, called situational context data. The signals may include sensor data, device status, user activity, user input, and/or inferences made using such data. The situational context data may express a user-centric description of the user's environment; for example: "User is taking a walk in the park on a sunny afternoon" or "activity: driving location: highway", etc. The system may send the situational context data to various system components that may, for example, process speech, select applications/skills for handling user inputs, and/or that implement those applications/skills. The applications/skills may use the situational context data to provide recommendations, generate responses, and/or perform actions that are more relevant to the user's current environment.

18 Claims, 18 Drawing Sheets

(58) Field of Classification Search
CPC .......... G10L 15/02; H04K 3/45; H04N 7/147; H04W 4/027; H04W 4/029; H04L 67/125
See application file for complete search history.

(56) References Cited

U.S. PATENT DOCUMENTS

| | | | | |
|---|---|---|---|---|
| 10,846,745 | B1* | 11/2020 | Meissner | G06Q 30/0261 |
| 11,854,566 | B2* | 12/2023 | Leider | G06F 3/011 |
| 2008/0270380 | A1* | 10/2008 | Ohrn | G06F 16/345 |
| | | | | 707/999.005 |
| 2009/0254971 | A1* | 10/2009 | Herz | G06Q 10/10 |
| | | | | 726/1 |
| 2013/0002805 | A1* | 1/2013 | Andresen | H04N 7/147 |
| | | | | 348/14.07 |
| 2013/0110505 | A1* | 5/2013 | Gruber | G06F 40/279 |
| | | | | 704/9 |
| 2014/0278343 | A1* | 9/2014 | Tran | G06F 40/30 |
| | | | | 704/9 |
| 2014/0379521 | A1* | 12/2014 | Novotny | G06N 20/00 |
| | | | | 706/14 |
| 2016/0132590 | A1* | 5/2016 | Byron | G06F 16/3344 |
| | | | | 707/722 |
| 2017/0139471 | A1* | 5/2017 | Bury | G06F 1/3231 |
| 2017/0142251 | A1* | 5/2017 | Lupcho, III | H04W 4/029 |
| 2017/0262529 | A1* | 9/2017 | Chim | G06F 16/3329 |
| 2018/0165062 | A1* | 6/2018 | Yoo | G10L 15/02 |
| 2018/0308133 | A1* | 10/2018 | Geist, Jr. | G06Q 30/0271 |
| 2019/0005417 | A1* | 1/2019 | Olsher | G06Q 10/025 |
| 2019/0034483 | A1* | 1/2019 | Millius | G06N 3/044 |
| 2020/0034764 | A1* | 1/2020 | Panuganty | G06F 40/284 |
| 2020/0065513 | A1* | 2/2020 | Sridharan | G06N 3/08 |
| 2020/0159836 | A1* | 5/2020 | Alkan | G06N 20/00 |
| 2020/0348836 | A1* | 11/2020 | Adem | G06F 3/017 |
| 2020/0387603 | A1* | 12/2020 | Weldemariam | G06N 3/08 |
| 2020/0401593 | A1* | 12/2020 | Panuganty | G06F 16/244 |
| 2021/0043320 | A1* | 2/2021 | Malkenson | G06F 9/451 |
| 2021/0044901 | A1* | 2/2021 | Stachura | H04K 3/45 |
| 2021/0157867 | A1* | 5/2021 | Bastide | G06F 16/9024 |
| 2021/0248136 | A1* | 8/2021 | Panuganty | G06F 16/972 |
| 2022/0037003 | A1* | 2/2022 | Oliveira | G06F 8/38 |
| 2022/0113366 | A1* | 4/2022 | Pipelidis | H04W 4/027 |
| 2022/0309469 | A1* | 9/2022 | Photos | G06Q 10/1053 |
| 2023/0034450 | A1* | 2/2023 | Sridhar | G06V 30/274 |
| 2023/0188481 | A1* | 6/2023 | Sharifi | G10L 17/06 |
| | | | | 709/204 |
| 2024/0205303 | A1* | 6/2024 | Oleinikov | H04L 67/125 |
| 2024/0267435 | A1* | 8/2024 | Wulf | G06F 40/237 |

* cited by examiner

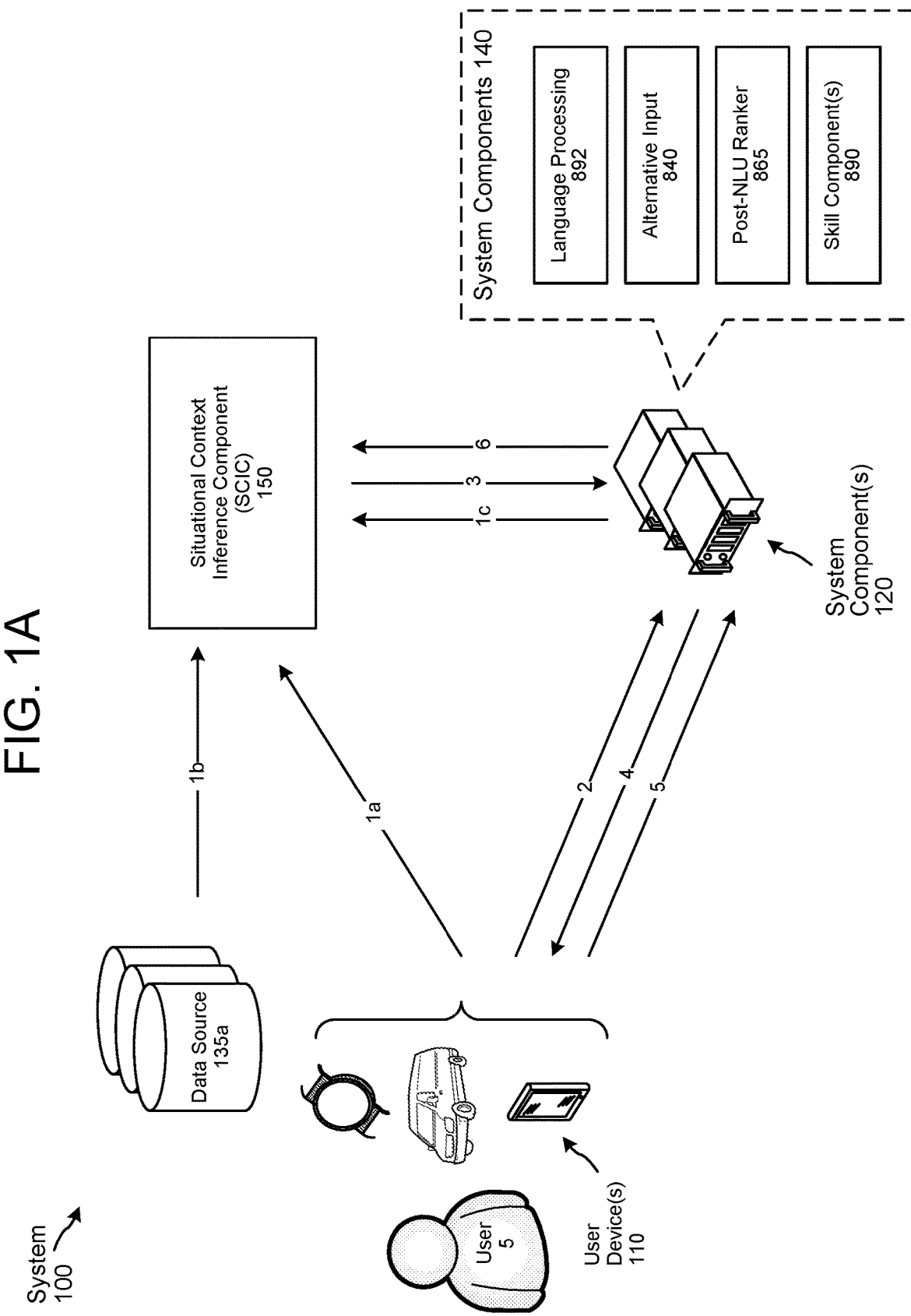

DETERMINING DEVICE CONTEXT

CROSS-REFERENCE TO RELATED APPLICATION

This application claims the benefit of priority under 35 U.S.C. § 119 (e) of U.S. Provisional Patent Application No. 63/494,134, filed Apr. 4, 2023, and entitled "DETERMINING DEVICE CONTEXT", the entire contents of which is incorporated herein by reference for all purposes.

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1A illustrates a system configured to generate situational context data for a user device, according to embodiments of the present disclosure.

DETAILED DESCRIPTION

Figure 1B:
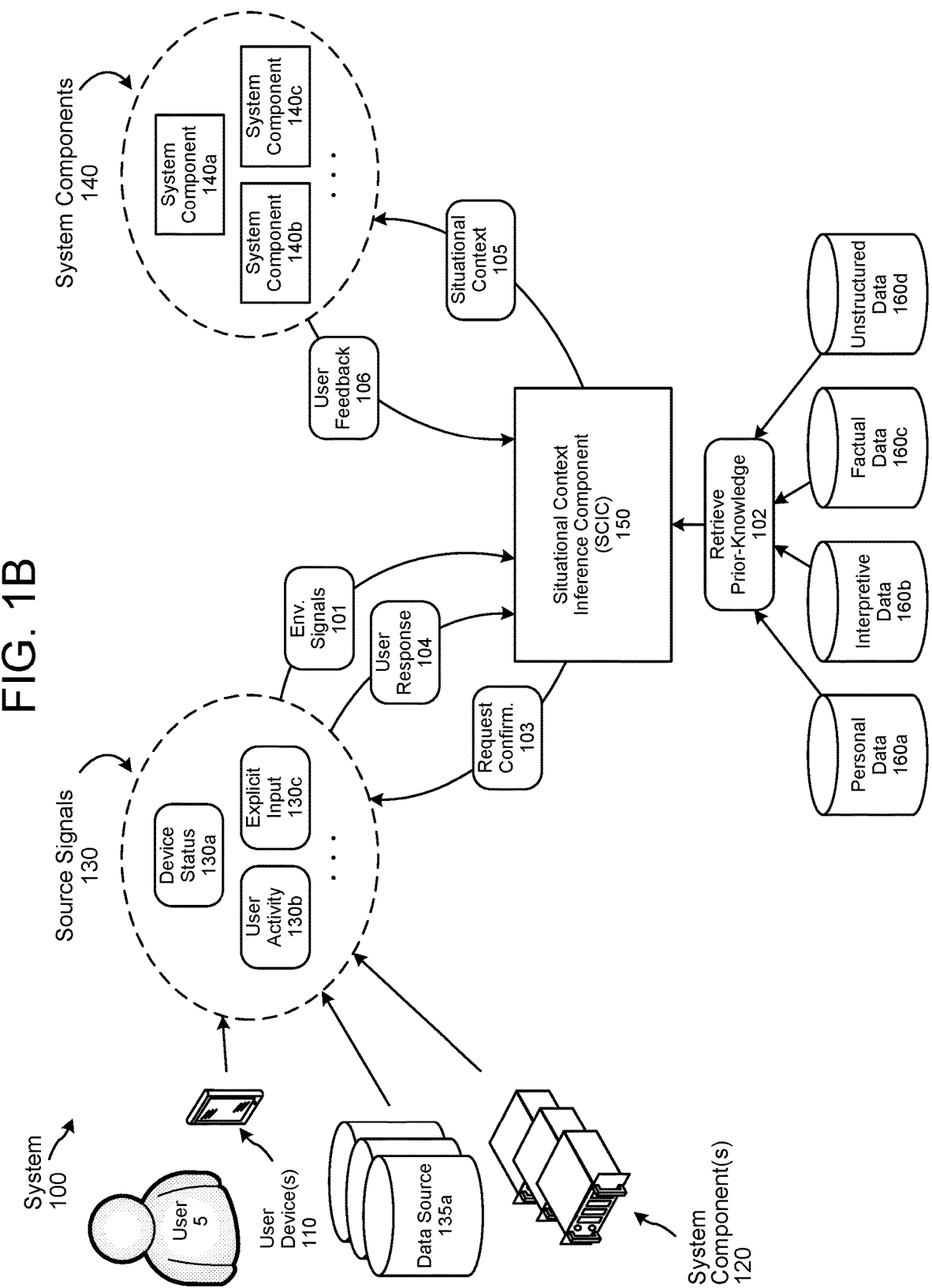
FIG. 1B illustrates a system configured to generate situational context data for a user device, according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system, sometimes referred to as a spoken language understanding (SLU) system. Natural Language Generation (NLG) includes enabling computers to generate output text or other data in words a human can understand, such as sentences or phrases. Text-to-speech (TTS) is a field of computer science concerning transforming textual and/or other data into audio data that is synthesized to resemble human speech. ASR, NLU, NLG, and TTS may be used together as part of a speech-processing/virtual assistant system that can communicate with a user by processing spoken inputs and responding with synthesized speech. The system may additionally receive inputs and provide outputs in other forms; for example, text data, image data, sensor data, etc.

As virtual assistant systems become more advanced, the range of services they can perform for a user continues to grow along with the variety of users requesting them. Providing a positive user experience relies on accurately interpreting the user input and providing an appropriate response. To improve the accuracy of interpretation and response, the system may draw on additional information when interpreting the input (e.g., a question, request, command, etc.) and generating the response (e.g., generating an output and/or performing some other action for and/or on behalf of the user).

Offered herein are techniques for expanding the capability of a virtual assistant system to be more conversational as well as proactive and adaptive to individual user's needs. To do so, the system may receive signals about the user's environment and use them to generate situational context data that the system may use to interpret a user input. The situational context data may take the form of data representing natural language text describing the context of the user at a particular time such as "walking in the park with the dog in the rain." The system may also share the situational context data with other, supporting systems, allowing them to improve the user experience of their offerings as well. For example, downstream components/services may be configured to use the situational context data (e.g., the natural language description of the user's situation) to interpret input user commands (for example, by speech processing components to interpret a spoken command based on the user context), to proactively take an action, or the like.

The virtual assistant system may include situational context data inference component configured to receive source signals describing the user's activity, environment, or other information along with prior knowledge data (which may be used to interpret the source signals) to generate the situational context data. The situational context data may be in the form of a natural language description of the user's environment. The situational context data may also be in a form of other non-natural language data that may be processed by downstream components to take various actions. The situational context data may include information representing one or more activities of the user, information about the user's environment, and/or other information. The "environment" may refer to the surroundings of the user, such as what is in physical proximity to the user (for example other devices, people, animals, etc.), what is happening in the area (for example, weather, temperature, sounds, etc.). The environment of the user may be represented by a variety of source signals available to the system. For example, microphone data, camera data, global positioning system (GPS) data, weather data, or the like may all provide information about a user's environment. Environment data may be directly obtained from a user device (e.g., from a microphone of a user device) or may be obtained using a combination of data sources (e.g., obtaining a user's location using GPS data and finding traffic or weather data from a different source but based on the GPS data). Further examples of context data associated with the user input may include the time, sensor data (e.g., vision, audio, ultrasound, Bluetooth signals, etc.), actions being performed by the user's device (e.g., applications being used, motion/speed data), and/or inferred signals such as presence detection, an activity the user is engaged in, etc.

The system may receive source signals indicating the context/environment related to the user and may interpret those signals in view of prior knowledge information in order to determine the situational context data. In this manner the situation context data may be based not only on input source signals but also based on information interpreting those signals. The prior knowledge data may include one or more data stores or other knowledge/information storage forms. For example, prior knowledge data may include data representing personal information about a user. Such information may be represented by one or more knowledge graphs that relate to the user (e.g., the user's historical affinities, preferences, settings, schedule, etc.). Such information may also be stored in profile storage, such as profile storage 870 discussed below. The prior knowledge data may also include general information that represents behavioral data which may be used to interpret context information/ perform additional actions. Such interpretive data may represent information such as literal meanings of proverbs or vernacular, data indicating individuals may turn a light on when it is dark, data linking certain outdoor activities to certain types of weather, etc.) Prior knowledge data may also include external factual knowledge (e.g., data associating an artist with their media and titles of their work, a meal with its ingredients, a business with its location and product/ service, occasional visits to a business may indicate shopping while frequent visits may indicate employment, etc.). The system may process the source signals and knowledge encoded from the knowledge source(s) and apply natural language generation to generate the user's situational context data in word form.

The situational context data may represent a person-centric view of the user's context/environment. The system may receive source data representing the user's context such as location, time of day, weather, etc. The system may then process the source data along with the prior knowledge data to generate situational context data that expresses the user's experience of the world around them and whatever activity they may be engaged in. For example, the system may determine that the user is walking outside based on location and average speed. Because the user is determined to be outside, the system may determine the current local weather as additional information potentially relevant to the user's situational context. Based on the various signals and the prior knowledge data, the system may generate situational context data such as: "User is taking a walk in the park on a sunny afternoon." In other cases, the system may generate situational context data such as: "activity: eating lunch; location: kitchen table" or "driving on the highway", etc. As illustrated, the output situational context data may represent a natural language description of the context the user is in. Such a natural language description may be in the form of a complete sentence (e.g., including subject, noun, verb, etc.) or may be in segmented text corresponding to the context (e.g., "activity: sitting; location: work; time: early afternoon"). As can be appreciated, various arrangements and construction of natural language data may be determined.

The system may use the situational context data to interpret the user input and provide an appropriate system response or affirmative action. For example, if the situational context data indicates that the user entering a gym and is close to their earbuds at a time they regularly work out, the system may push to the device a selection of the user's workout playlists for the user to select from. In addition, a user may be more receptive to a recommendation when engaged in certain activities. Accordingly, the system may generate situational context data proactively based on detected signals and/or events. For example, and subject to the relevant user permissions, the system may detect that the user has entered their kitchen in the evening and generate situational context data such as, "User has entered the kitchen and is preparing food," or "User is cleaning the house on a Sunday afternoon." This situational context data may trigger the system to recommend a music playlist. The system may generate synthesized speech, "Would you like to listen to a podcast?" or "Would you like to play some music?" In another example, the user may request the system play music and the system may use contextual signals to recommend one playlist over another. For example, the system may recommend one or more playlists in a context where a user is at a gym and may recommend one or more different playlists if a user is at home just before bedtime. The system may determine whether other users are present and generate the situational context accordingly. The presence of other users may influence recommendations and/or responses generated by the system. For example, the presence of multiple people may indicate a social setting. An identity of another user (if the user has opted into use of the system) may be used to determine particular aspects of a recommendation and/or response; for example, based on interests and/or preferences shared between the users.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Figure 8:
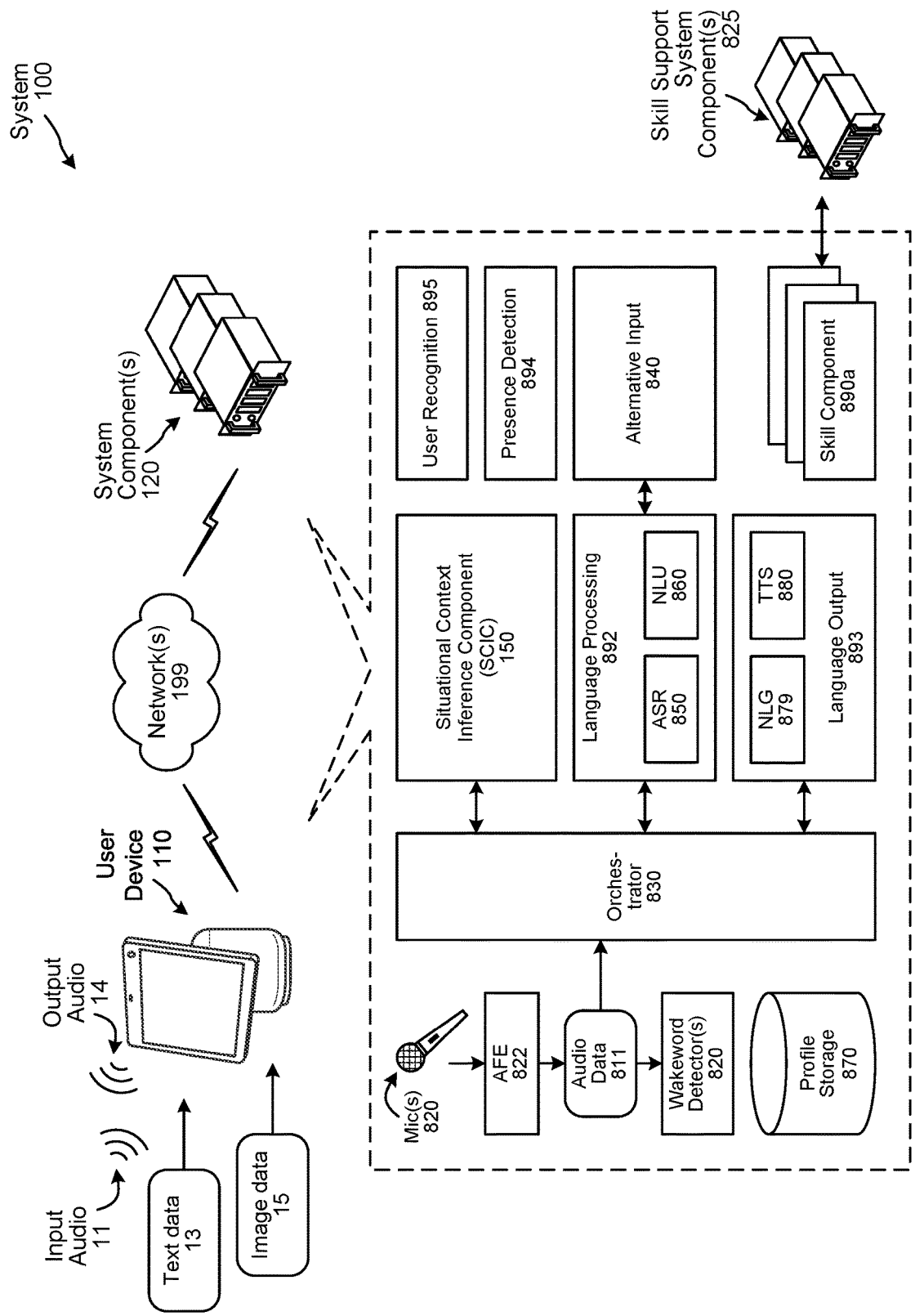
FIG. 8 illustrates integration of the situational context data system in a natural language command processing system, according to embodiments of the present disclosure.

FIGS. 1A and 1B illustrate a system 100 configured to generate situational context data for a user device, according to embodiments of the present disclosure. A user 5 may interact with the system 100 via one or more user device(s) 110 using a combination of inputs and outputs including voice, text, and/or images. The user may speak or otherwise provide input audio to the user device 110. In response, the user device 110 may output synthesized speech and/or other audio or video. In various implementations, the user device 110 may be one of the user devices 110 shown in FIG. 17 and may have a visual display (e.g., monitor, touchscreen, etc.). The user device(S) 110 may include various hardware and/or software components such as those shown in FIG. 15. In some implementations, the user device(s) 110 may operate in conjunction with one or more system components 120 as shown in FIG. 8. In some implementations, the components and/or the functions of the components may be shared and/or divided between a user device 110 and one or more system components 120. One or more user devices 110 and, in some implementations, one or more system components 120, may make up the system 100. The system 100 may include more or fewer components without departing from the scope of this disclosure.

A user 5 may opt in to allowing the system 100 to generate situational context data for the user using situational context data inference component (SCIC) 150. The situational context data may be in the form of a natural language description of the user's context and/or environment (for example environment 702 discussed below in reference to FIG. 7). As shown in FIG. 1A, the system 100 may include one or more user device(s) 110, the SCIC 150, data sources 135, and system component(s) 120. Although illustrated as a separate component, SCIC 150 may be included as part of a system component(s) 120 depending on system configuration. The SCIC 150 may receive data from a variety of sources. As shown in step 1a of FIG. 1A, user device(s) 110 may send data to SCIC 150 for processing. Such data may include data representing various sensor(s) of the device, data corresponding to application(s)/skill(s) operating with respect to the user device(s) 110, and/or other data, such as that discussed herein. As shown in step 1b of FIG. 1A, data source(s) 135 may send data to SCIC 150 for processing. The data source(s) 135a, 135b, 135c, etc. may include sources of information that may be relevant to the user's context but may not necessarily be available from one or more user device(s) 110. Examples of data source(s) 135 may include a source of weather data, a source of traffic data, a source of news data, or the like. Other data source(s) 135 may include a skill system component(s) 825 (as discussed below) which may correspond to information relevant to the user's context such as content playing in an environment, operational status of smart home application(s) and/or device(s), or other information. Data from data source(s) 135 may be used by SCIC 150 for determining situational context data as described herein. As shown in step 1c of FIG. 1A, system components 140 may also send data to SCIC 150 for processing. Such system component(s) 140 may include components used for speech processing (e.g., language processing components 892, alternative input component 840, post-NLU ranker 865, etc. as described below). Such system component(s) 140 may also include other system components like a source of user recognition data 595 (e.g., a user-recognition component 895) and/or a source of user presence data 795 (e.g., presence detection component 894) as discussed below, which may indicate other user(s) in the vicinity of user 5. As illustrated, the system component(s) 140 may include a skill component 890 (though information from a skill component 890 and/or skill system component 825 may be considered to be a data source 135 depending on system configuration). The SCIC 150 may process the various input data (e.g., from user device(s) 110, data source(s) 135, and system component(s) 120) as well as data from prior knowledge sources (shown below in reference to FIGS. 1B, 2, and 3), to determine situational context data. The SCIC 150 may determine the situational context data before, after, or during processing of a user input. As can be appreciated, system component(s) 120 may include a variety of different system components which may include system component(s) 140, which may provide input data to and/or receive situation context data from, the SCIC 150.

At some point the user may make a user input using device(s) 110. Such an input may take the form of input speech, input text, etc. The user input may be sent to system component(s) 120 for processing, as shown by step 2 in FIG. 1A. The SCIC 150 may send the situational context data to the system component(s) 120 as shown in step 3 of FIG. 1A. The system component(s) 120 may then use the situational context data (for example as described below) to determine a response to the user input. The corresponding response data may be sent from the system component(s) 120 to the user device(s) 110 as shown in step 4 of FIG. 1A. The user may also provide feedback on the response. Corresponding feedback data may be sent from the user device(s) 110 to the system component(s) 120 (as shown in step 5) which may be processed and/or sent to SCIC 150 (as shown in step 6) for purposes of further training/adjustment as described below.

Further details of operation of the SCIC 150 are discussed below in reference to further Figures. For example, as shown in FIG. 1B, the SCIC 150 may receive source signals 130 and process them using prior knowledge represented in knowledge sources 160 to generate situational context data. The SCIC 150 may send the situational context data to other system components 140 for use in handling inputs from the user 5 and/or triggering system-initiated actions (e.g., event-driven and/or context-driven recommendations) for the user 5. The system components 140 may include various components, systems, processes, services, etc. that may perform operations for and/or on behalf of the user 5 or the system itself. For example, a first system component 140a may be a speech processing component (e.g., the ASR component 850, NLU component 860, and/or entity resolution component 1270, etc.) that may use the situational context data to process a user 5 input to generate NLU output data that more appropriately reflects the user's current environment. A second system component 140b may be a routing and/or ranking component (e.g., the post-NLU ranker 865) that may use the situational context data to identify one or more other system components 140 for processing the NLU output data to generate a response to the user's input and/or cause the system 100 to perform some other action for or on behalf of the user. A third system component 140c may represent an application or skill component configured to perform such an action. In another example, a system component 140 may comprise a large language model (LLM) or other component that can operate using the situational context data. For example, the system component 140 may comprise an LLM that the stands in place of a speech processing component (for example an LLM that stands in the place of an NLU for a speech processing system). In another example, the system component 140 may comprise an LLM that operates a chatbot function (for example as part of a chatbot skill 890 or other chatbot functionality). Such chatbot function may be handled by a dialog manager or other component.

In various implementations, the system 100 may include more, fewer, or different system components 140. For example, and without limitations, the system components 140 may include components configured to determine when to initiate an action for and/or on behalf of the user 5 even in absence of an explicit user request (e.g., a system-initiated action), language output components (e.g., for performing NLG and/or TTS), smart home components (e.g., environmental control and/or security systems), smart vehicle components (e.g., for navigation and/or driver assist), etc.

As shown in FIG. 1B, the system 100 may perform operations represented as stages 101 through 106. At stage 101, the SCIC 150 may receive source signals 130. At stage 102, the SCIC 150 may receive prior knowledge data 165 from the knowledge sources 160. At stage 103, the SCIC 150 may cause the user device 110 to output a request for user confirmation of the situational context data. At stage 104, the SCIC 150 may receive a response from the user 5. At stage 105, the SCIC 150 may generate situational context data and send it to one or more system components 140. At stage 106, the SCIC 150 may receive user feedback from a system component 140 and use the user feedback to update data stored in one or more of the knowledge sources 160 and/or internal models of the SCIC 150 itself.

Figure 2:
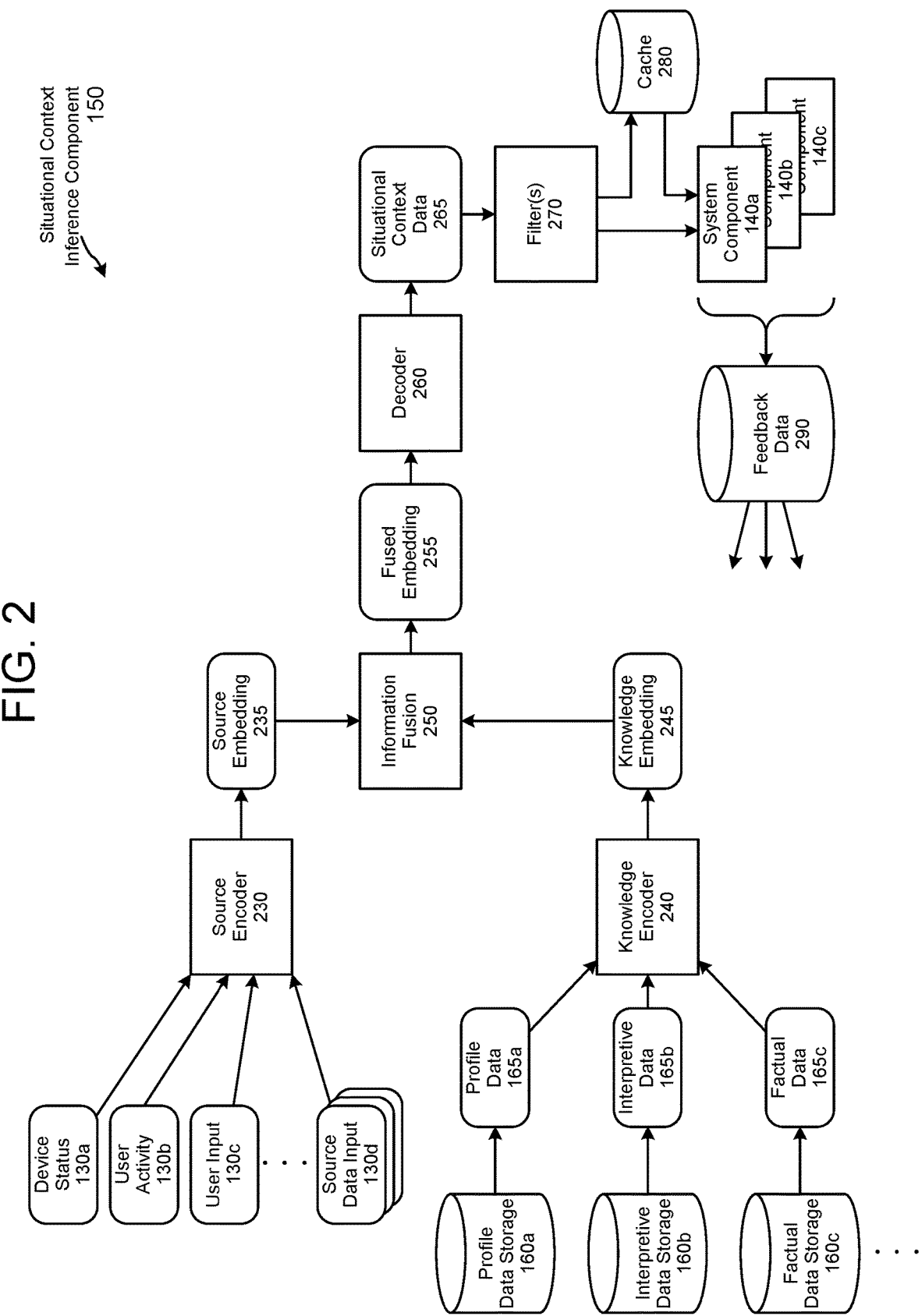
FIG. 2 is a conceptual diagram of components for generating situational context data, according to embodiments of the present disclosure.
Figure 7:
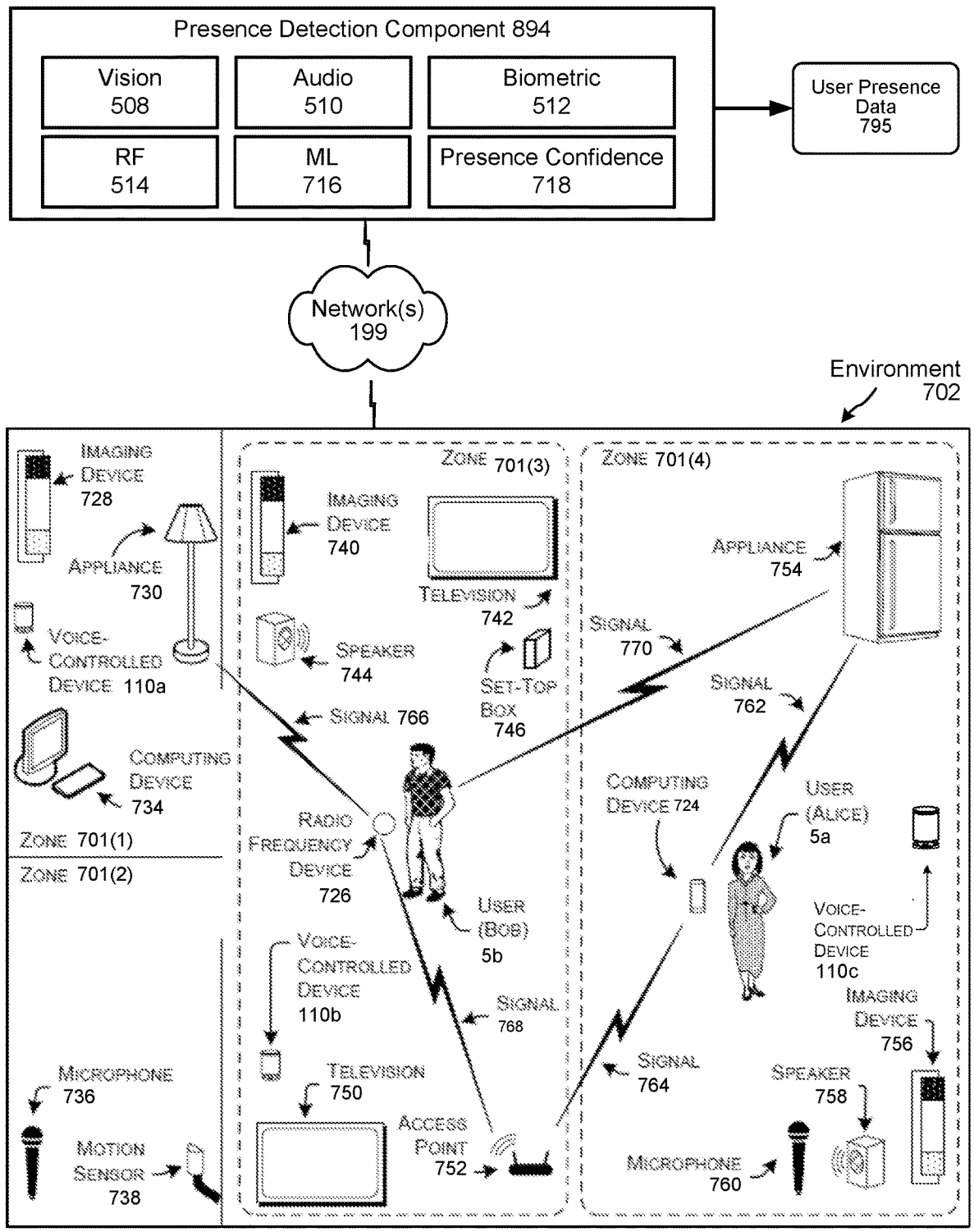
FIG. 7 is a schematic diagram of an illustrative architecture in which sensor data is combined to determine the presence and/or location of one or more users according to embodiments of the present disclosure.

The SCIC 150 may receive source signals 130 at stage 101. The source signals 130 may include a device status 130*a* (e.g., geolocation of the user device 110*a*, the local time, sensor data, smart home or vehicle device status, etc.), a user activity 130*b* (e.g., is the user walking, streaming music, cooking, doing a workout, etc.), and/or a user input 130*c* (e.g., an utterance, a search engine query, opening an app, etc.). The source signals 130 may also include input from data sources (e.g., 130*d*, 130*e*, and/or 130*f* as shown in FIG. 2). The source signals 130 may include signals from various sensing technologies such as vision (e.g., including object recognition and/or optical character recognition), sound (e.g., acoustic event detection, speaker identification, song identification, etc.), ultrasound (e.g., beacons and/or echolocation), wireless electronic signals (e.g., Bluetooth Low Energy (BLE) and/or radio frequency identification (RFID), etc.), and others. The source signals 130 may include inferred signals such as user presence detection (e.g., as determined using a presence detection component 894 as shown in FIG. 7), user situation (e.g., user left the car, podcast in kitchen user device 110 is paused, user entered the living room, etc.), weather at the user's location, etc. The source signals 130 may include detection of other users in proximity to the user 5 and/or the user device 110. In some implementations, and subject to appropriate user permissions and privacy policies, the source signals 130 may include data that identifies one or more of the other uses.

The SCIC 150 may receive prior knowledge data 165 from the knowledge sources 160 at stage 102. A knowledge source 160 may take many forms. In one example, the knowledge source may include a graph neural network. A graph may represent entities (e.g., nodes or vertices) and relationships between them (e.g., edges or links). Nodes and edges may have attributes; for example, attributes of a node may include an identity of the node and a number of neighbors (e.g., connected by edges) and attributes of an edge may include an identity of the edge and a weight. An edge or a node may store information in the form of a scalar (e.g., a weight or other value) and/or an embedding (e.g., encoded data). A graph may also include a global node embedding. Attributes of the global node may include the number of nodes, the longest path between nodes (e.g., in terms of number of edges), etc. A graph neural network (GNN) is a neural network that may process data that can be represented as a graph. A GNN may be an optimizable transformation on all attributes of the graph that preserves graph symmetries.

The knowledge sources (KSs) 160 may store various information about the user and about the world at large. A personal KS 160*a* may store user profile data and/or other data about the user 5 such as affinities, hobbies, habits, social connections, etc. An interpretive data KS 160*b* may store interpretive data that describes aspects of human cognition and/or behavior. A factual KS 160*c* may store structured factual information such as definitions, conversions between units, addresses, etc. The system 100 may include other KSs 160 such as one or more unstructured data KSs 160*d*, which may represent text collected from the world-wide web. In some implementations, the SCIC 150 may retrieve prior knowledge from the KSs 160 selectively based on the environmental signals. The size of a KS 160 may be vast; thus, the SCIC 150 may first determine a topic if information to be retrieved (e.g., related to the activity, location, user input, etc.) and retrieve prior knowledge related to that topic.

The SCIC 150 may process the source signals 130 and the prior knowledge data 165 to generate the situational context data. To do so, the SCIC 150 may encode the various source signals 130 and prior knowledge data 165, fuse the resulting embeddings, and process the fused embeddings using a decoder to generate a natural language representation of the user's environment. Operation of the SCIC 150 and its components are described in further detail below with reference to FIG. 2.

In some implementations, the SCIC 150 may allow the user 5 to confirm the situational context data. Thus, at stage 103 the SCIC 150 may cause the user device 110 to output the situational context data and a request for the user to confirm it. For example, in a user experience that includes an event-driven music recommendation, the SCIC 150 may introduce an intermediate confirmation stage where the user 5 can select a widget (e.g., graphical user interface or voice user interface menu item) that best describes the context the user 5 is in. The widget may be generated by utilizing the situational context data generated by the SCIC 150; for example, Cooking, Driving, Family Time, Focus, Party Time, Relaxing, Sleep, Waking Up, Walking, Running, etc.

The SCIC 150 may receive a response from the user 5 at stage 104. The SCIC 150 may use the response to (1) adjust the situational context data prediction in real-time and (2) generate positive/negative training examples for later SCIC 150 internal component updates.

User confirmation may not be sought in all instances due to the potentially distracting nature of interruptions. Rather, the SCIC 150 may generate a confidence value or score associated with the situational context data and seek user confirmation when the confidence score fails to satisfy a condition (e.g., falls below a threshold confidence level). In response to the user's confirmation, the SCIC 150 may send the situational context data to one or more of the system components 140 and/or update its internal components to increase a confidence of future predictions based on similar inputs.

The SCIC 150 may, at stage 105, send the situational context data to one or more system components 140. A system component 140 may use the situational context data to enhance its prediction accuracy. For example, situational context data of "User is cooking dinner in their kitchen" can be sent to components for speech processing and/or action performance to enables them to decide if their hypothesis needs adjustment or not. In speech processing, it may be beneficial to select between respective ASR/NLU/ER hypotheses; for example, to determine whether the user 5 is saying "Alexa, start my yoga routine" or "Alexa turn off my kitchen light" based on whether one of them conflicts with information in the situational context data. If the user 5 makes an ambiguous or open-ended request such as "Alexa play music", a system component 140 configured to play music may use the situational context data to decide what music (e.g., which artist, genre, tempo, etc.) to play. A music system component 140 may also be used to decide what music to play for a system-initiated recommendation (e.g., "I see you are cooking dinner. Would you like to listen to some jazz?").

The situational context data may be expressed in natural language such as a phrase, sentence, and/or sentence(s) akin to how a human would describe their environment. Thus, each system component 140 may be independently configured with regard to how processes the situational context data along with NLU results data corresponding to a user input to determine what action or actions to perform in response.

At stage 106, the SCIC 150 may receive user feedback from a system component 140 and use the user feedback to update data stored in one or more of the knowledge sources 160 and/or internal models of the SCIC 150 itself. Once a system component 140 performs the action(s) (or causes the action(s) to be performed), the system component 140 may collect implicit or explicit feedback. For example, the system component 140 may collect metrics such as CPDR, Click-or-not, Conversion-or-not to determine whether the situational context data has led to a good or bad experience for the user 5. The system component 140 may send feedback data to the SCIC 150, which may use the feedback data to generate both positive and negative training examples to continuously improve the prediction quality of the models used by the SCIC's internal components.

FIG. 2 is a conceptual diagram of components for generating situational context data, according to embodiments of the present disclosure. The SCIC 150 may include a source encoder 230 for processing the source signals 130, a knowledge encoder 240 for processing prior knowledge data 165, an information fusion component 250 for combining the outputs of the encoders, and a decoder 260 for processing the fused data to generate situational context data 265. The situational context data 265 may be text or a representation of text conveying a natural-language expression of the user's current environment. Providing the situational context data 265 in a natural language may allow for broad interoperability between the SCIC 150 and system component 140 of various types. Using natural language may allow for flexibility in the expression of the user's environment across a broad range of changing source signals 130 and/or prior knowledge data 165 sources and/or data formats. Providing the situational context data 265 in a natural language may also allow for interpretation by humans for the purpose of providing feedback about the situational context data including its accuracy and/or whether it includes information the user 5 wishes not to share. A filter component 270 may implement guardrails against sharing of certain types of personal information including identifying numbers, identification of other users/people, precise locations, medical information, etc. The filter component 270 may implement both system policies and user preferences for information sharing/scrubbing.

The SCIC 150 may receive various inputs including the source signals 130 and the prior knowledge data 165. The source signals 130 may represent the user's environment and may refer to the user, the user's device, context associated with a user input, etc. For example, the source signals 130 may include multi-modality signals captured by different sensors to represent the environment including a current local time, user's current and/or recent interactions (e.g., dialogs) with the system 100, the device type user is interacting with, user's locations, user's activity and/or actions being performed by the user device 110, detected Bluetooth signals, etc. The source signals 130 may further include inferences output from image processing (e.g., object or facial recognition, etc.), audio processing (e.g., AED, ASR, etc.), presence detection, etc.

The system 100 may include one or more the knowledge sources 160 in the form of, for example, GNNs and/or unstructured data representing prior knowledge data 165. The prior knowledge data 165 may include symbols, tensors, and/or other data stored in data structures represented in the knowledge sources 160. The prior knowledge data 165 may include user profile data 165*a* from a personalized knowledge source 160*a*, interpretive data 165*b* from an interpretive data knowledge source 160*b*, factual knowledge data 165*c* from a factual knowledge source 160*c*, etc. In some implementations, prior knowledge data 165 can also be extended to include unstructured data collected and/or extracted from the world-wide web, scanned books, databases, etc. The symbols in the various knowledge sources 160 and other data sources may represent information about users, their interests in historical interactions, facts/concepts about people, places, and things, along with various relations among them, etc.

The personalized knowledge source 160*a* may include user profile data 165*a* compiled based on user input via menus of actions and/or services selected to correspond with certain source signals 130. For example, if the user 5 selects "play relaxing music," the system 100 may note the input as a self-selection of mood and/or activity that the system 100 can record and digest as an association with whatever else the user is doing. The user 5 may input additional user profile data 165*a* such as a location of their home, work, gym, etc. The system 100 may then use the location data to determine an activity of the user (e.g., cleaning, working, exercising, etc.). Other user profile data 165*a* may include the user's historical affinities, preferences, settings, schedule, etc.

The interpretive data knowledge source 160*b* may include interpretive data 165*b* that describes aspects of human cognition and/or behavior. For example, the interpretive data 165*b* may reflect the literal meanings of proverbs, idioms, and/or vernacular language; how certain activities relate to certain environmental signals, such as fishing and flying radio-controlled airplanes may be impractical when it's windy, while sailing and flying kites may be impractical when it's not, despite other apparent parallels in those activities; human preferences for consuming certain media, such as avoiding spoilers for sporting events and/or TV shows the user watches in full live or shortly after; common sense, etc.

The factual knowledge source 160c may include factual knowledge 165c from sources of organized and/or structured information. Factual knowledge 165c may include information about history, science and/or technology, dates, addresses and hours of businesses, capital cities of states or countries, associating artists with their field of work and titles of their pieces, ingredients and recipes for meals, etc. In contrast with unstructured data, the factual knowledge 165c may be verified and/or verifiable, and may be parsed and/or organized to disambiguate names or other words, and to properly understand and associate data such as dates, currency, amounts, and/or other numbers, etc.

The SCIC 150 may include encoders 230 and 240 for encoding the source signals 130 into a source embedding data 235, and the prior knowledge data 165 into a knowledge embedding data 245, respectively. The source encoder 230 may generate a vector representation of different types of source signals 130. The source encoder 230 may take input from generic contextual information and sensors across different modalities. The source encoder 230 may also receive inferences/interpretations from other models such as those used for ASR, presence detection, user identification, etc. In various implementations, the source encoder 230 (and/or the knowledge encoder 240) may vary in size/complexity from outputting a 1-hot embedding corresponding to an input to outputting a natural language summary or description of many inputs. For example, the output could be a value or values in a vector that correspond to an activity (e.g., 1=working, 2=leisure, 3=chores, etc.) to a prose description of the activity (e.g., "User is walking", "User is preparing to leave work", etc.). The encoding may reflect relationships between different source signals 130; for example, if the user is in a particular store in December, the source encoder 230 may output: "User is holiday shopping." Alternatively, if the user is in a particular store, but the location corresponds with the user's employment, the source encoder 230 may output: "User has arrived at work."

In some implementations, the SCIC 150 may have multiple encoders 230. The respective encoders 230 may operate online and offline. For example, one source encoder 230 may encode various data about the user device 110 and/or the user 5 and store the result in a first source embedding data 235. A second source encoder 230 may encode real-time or frequently updating source signals 130 and store the result in a second source embedding data 235. The information fusion component 250 may combine the environmental embeddings with each other and/or knowledge embedding data 245 to generate fused embedding data 255. In some implementations, the SCIC 150 may include respective encoders 230 for source signals 130 having different levels of sensitivity. For example, source signals 130 related to certain capabilities of the user device 110 may have low sensitivity while source signals 130 pertaining to the user such as location, activity, other nearby users, may have high sensitivity. The SCIC 150 may include different encoders 230 or types of encoders 230 that encode, obscure, and/or encrypt the source signals 130 to different extents depending on their potential sensitivity.

The knowledge encoder(s) 240 may generate a numeric/vector representation of prior knowledge data 165 stored in the various knowledge sources 160. The knowledge encoder 240 may include one or more of various technologies such as a GNN, shallow-embedding learning, a transformer model, etc. In some implementations, the knowledge encoder 240 may be trained in an offline manner and representations (e.g., knowledge embedding data 245) can be precomputed and stored for later use. During runtime, the precomputed knowledge embedding data 245 may be retrieved and processed along with the source embedding data 235.

In some implementations, prior knowledge data 165 may be selectively retrieved from the knowledge sources 160 based on context; for example, current values of one or more source signals 130. A knowledge source 160 may be very large (e.g., including billions of facts), requiring a non-trivial amount of time for retrieval and processing of prior knowledge data 165. Accordingly, a portion of the contents of a knowledge source 160 may be retrieved based on its relationship to the source signal(s) 130. For example, the SCIC 150 may retrieve prior knowledge data 165 associated with a topic, category, etc. that corresponds to a user activity 130b, a user input 130c (e.g., an intent, domain, entity, etc.), and/or a location (e.g., factual knowledge data 165c corresponding to business within a certain distance of the user's current location), etc.

In some implementations, prior knowledge data 165 corresponding to certain topics may be selectively retrieved and a knowledge embedding data 245 precomputed and stored by keyword, topic, category, and/or other relationship to source signals 130 (e.g., individually or in combination) that are likely to occur for a given user 5 and/or user device 110. At runtime, the precomputed knowledge embedding data 245 may be retrieved based on a relationship to current source signals 130 and processed with the source embedding data 235.

In some implementations, prior knowledge data 165 may be stored in the knowledge sources 160 in the form of tensor data. A tensor may be calculated for a fact and uploaded to a knowledge source 160 offline. At runtime, one or more source signals 130 may be converted to a tensor. The tensor representing the source signal(s) 130 may be used to retrieve tensors corresponding to facts from one or more of the knowledge sources 160. The source encoder 230 and/or the knowledge encoder 240 may be used to generate tensors from their respective inputs. The source encoder 230 and the knowledge encoder 240 may share the same parameters or have different parameters. In some implementations, the knowledge encoder 240 may be used to generate the tensors (e.g., from the source signals 130) used to retrieve prior knowledge data 165 from the knowledge source(s) 160.

The system may include an information fusion component 250 that may process the knowledge representation and/or the environmental representation contained in the source embedding data 235 and/or the knowledge embedding data 245, respectively, to generate fused embedding data 255 for input into the decoder 260. In some implementations, the information fusion component 250 may be made up of multiple fusion nodes, such as the fusion nodes 350a, 350b, 350c, etc., shown in FIG. 3. The information fusion component 250 may also handle operations related to selective retrieval and/or processing of portions of knowledge embedding data 245 precomputed and/or computed in real time based on the source embedding data 235 and/or the raw source signals 130. In some implementations, the information fusion component 250 may perform post-hoc mining (e.g., embedding-based meta-path selection, node-selection based on explainable sub-graph technologies, etc.) to improve the relevance of the representations. The information fusion component 250 may then combine all or selected portions of the source embedding data 235 and/or the knowledge embedding data 245 to generate the fused embedding data 255 for use in the decoding process. The information fusion component 250 may combine the embedding data in various ways including concatenation, mean-pooling, summing, etc. The information fusion component 250 may additionally or alternatively apply more complex techniques to the individual and/or combined embedding data such as non-linear transformations (e.g., gating), and/or using one or more attention-based neural network models.

The decoder 260 may receive the fused embedding data 255 and process it to generate situational context data 265 in the form of a natural language representation of the user's environment. The decoder 260 may include one or more neural networks that can be trained together with or separately from the other models of the SCIC 150. The decoder 260 may be trained based on various feedback signals such as those received from a user 5 (e.g., confirmation of situational context data received at stage 104 as shown in FIG. 1B) and/or feedback received from one or more of the system components 140 based on an outcome of the user interaction (e.g., received at stage 106 as shown in FIG. 1B). The decoder 260 may thus be trained to perform natural language generation (NLG) to determine natural language descriptions that correspond to certain input source data (e.g., represented by different examples of source embedding data 235) in view certain input knowledge data (e.g., represented by different examples of knowledge embedding data 245).

In some implementations, the decoder 260 may be trained to optimize performance when operating with one or more of the system components 140. For example, the decoder 260 may be trained based on processing by, or an outcome of an interaction with, a particular system component 140 such as a speech processing component (e.g., for performing ASR, query rewriting, NLU, and/or entity resolution, etc.), a routing and/or ranking component, an application or skill component configured to perform an action for or on behalf of a user, a recommendation component configured to determine if and when to initiate an action for and/or on behalf of the user even in absence of an explicit user request, language output components (e.g., for performing NLG and/or TTS), smart home components (e.g., environmental control and/or security systems), smart vehicle components (e.g., for navigation and/or driver assist), etc.

The decoder 260 may correspond to structures and training associated with large language models (LLMs), and/or other machine learning components/techniques depending on system configuration. The decoder 260 may be configured and/or trained to perform operations of various complexity from template fitting to LLM processing. For example, the decoder 260 may output situational context data 265 having a simple sentence structure that expresses a combination of a mood and an activity according to a predefined template. The decoder 260 may generate more complex outputs; for example, based on prefix prompting, paraphrasing, sequence-to-sequence processing, autoregression, etc. In some implementations, the decoder 260 may select between or combine template fitting and language model processing depending on the source signals 130.

In some implementations, the SCIC 150 may include a filter component 270 configured to implement one or more filters of the data being output. The filters may check for various flaws and/or potential privacy issues in the situational context data 265. For example, the filter component 270 may check the data for sanity (e.g., to avoid "hallucinations" or other non-sensical output), accuracy (e.g., correct facts), and/or sensitivity. Sensitivity checks may be content-based, such as whether the situational context data 265 improperly includes identifying information or numbers; consent-based, such as whether the user has agreed to sharing data about their activities, etc.; policy-based, such as whether one or more system components 140 has agreed to appropriate constraints on sharing and/or storing the situational context data 265. Thus, in some cases, the filter component 270 may only send the situational context data 265 to system components 140 that satisfy user preferences and/or system policies.

In some implementations, the SCIC 150 may include a cache 280 for temporary storage of the situational context data 265. The cache 280 may store the situational context data 265 for a duration of time that corresponds to system policies, user preferences, and/or the relevance of the situational context data 265 (e.g., situational context data 265 describing shorter-term activities such as a workout or cooking may become irrelevant after an hour or so). In some implementations, the cache 280 may discard situational context data 265 upon receiving an updated situational context data 265 for that user. In some implementations, the SCIC 150 may precompute situational context data 265 for particular user/activity/etc. combinations and retrieve and propagate them when they become relevant. For example, the SCIC 150 may only generate a handful to a few dozen distinct versions of situational context data 265 for a given user. For example, while the SCIC 150 may generate a broad range of situational context data 265 having many different permutations, only a small subset of possible situational context data 265 may be relevant to a particular user. Thus, by precomputing and storing those situational context data 265, the SCIC 150 may broadcast the relevant situational context data 265 when an appropriate combination of source signals 130 is received/detected.

The SCIC 150 may send the situational context data to one or more system components 140. The system components 140 may include various downstream processes. For example, a first system component 140a may be a speech processing component (e.g., the ASR component 850, NLU component 860, and/or entity resolution component 1270, etc.) that may use the situational context data to process a user 5 input to generate NLU output data that more appropriately reflects the user's current environment. A second system component 140b may be a routing and/or ranking component (e.g., the post-NLU ranker 865) that may use the situational context data to identify one or more other system components 140 for processing the NLU output data to generate a response to the user's input and/or cause the system 100 to perform some other action for or on behalf of the user. A third system component 140c may represent an application or skill component configured to perform such an action. In various implementations, the system 100 may include more, fewer, or different system components 140. For example, and without limitations, the system components 140 may include components configured to determine when to initiate an action for and/or on behalf of the user 5 even in absence of an explicit user request (e.g., a system-initiated action), language output components (e.g., for performing NLG and/or TTS), smart home components (e.g., environmental control and/or security systems), smart vehicle components (e.g., for navigation and/or driver assist), etc.

The system components 140 may be individually and/or jointly trained to consume the situational context data 265. A system component 140 may process the situational context data 265 to generate an embedding for use as an input to its own model(s). A system component 140 may preprocess the situational context data 265 to, for example, perform semantic processing to select a certain portion of the situational context data 265 (e.g., the activity, the mood, the location, etc.) to use as an input to its model(s). In some implementations, the SCIC 150 may provide a system component 140 (or multiple system components 140) with situations contexts 265 that conform to a structured ontology of attributes; for example, in the form of defined values for known activity types. This may allow the system components 140 to, for example, generate their own recommendation and/or other output based on the user input, the attributes from the situational context data 265, and/or the system components 140 own information regarding the user 5 (e.g., based on a history of interactions with that system component 140). The situational context data 265 may, subject to user permissions and privacy controls, be made available to a skill/application developer for the purposes of configuring and/or training a system component 140 to ingest the situational context data 265. In some implementations, the SCIC 150 may include a mechanism for receiving and processing feedback from a system component 140 (e.g., in addition to user feedback signals) to improve the format and/or content of the situational context data 265 generally (e.g., distinct from the accuracy and/or applicability to any particular user interaction) for that particular system component 140 or all system components 140.

The SCIC 150 may receive feedback data 290 from the system components 140 based on outcomes of user interactions. For example, positive feedback may include clicking on a link in a search query, allowing a recommended song to play all the way through, purchasing a suggested item, and/or other indications that the interpretation of the user's input by the system 100 and a subsequent action performed by the system component 140 was acceptable to the user. In some implementations, the feedback data 290 may include non-user feedback from the system components 140. The non-user feedback may be generated by a system component 140 (and/or a skill/application developer) based on the situational context data 265 generally and unrelated to its accuracy or applicability to a particular user interaction. The SCIC 150 may store the feedback data 290 and use it to train the various models of the system including the source encoder 230, the personalized knowledge source 160a or other knowledge sources 160, the knowledge encoder 240, the information fusion component 250, and/or the decoder 260.

Figure 3:
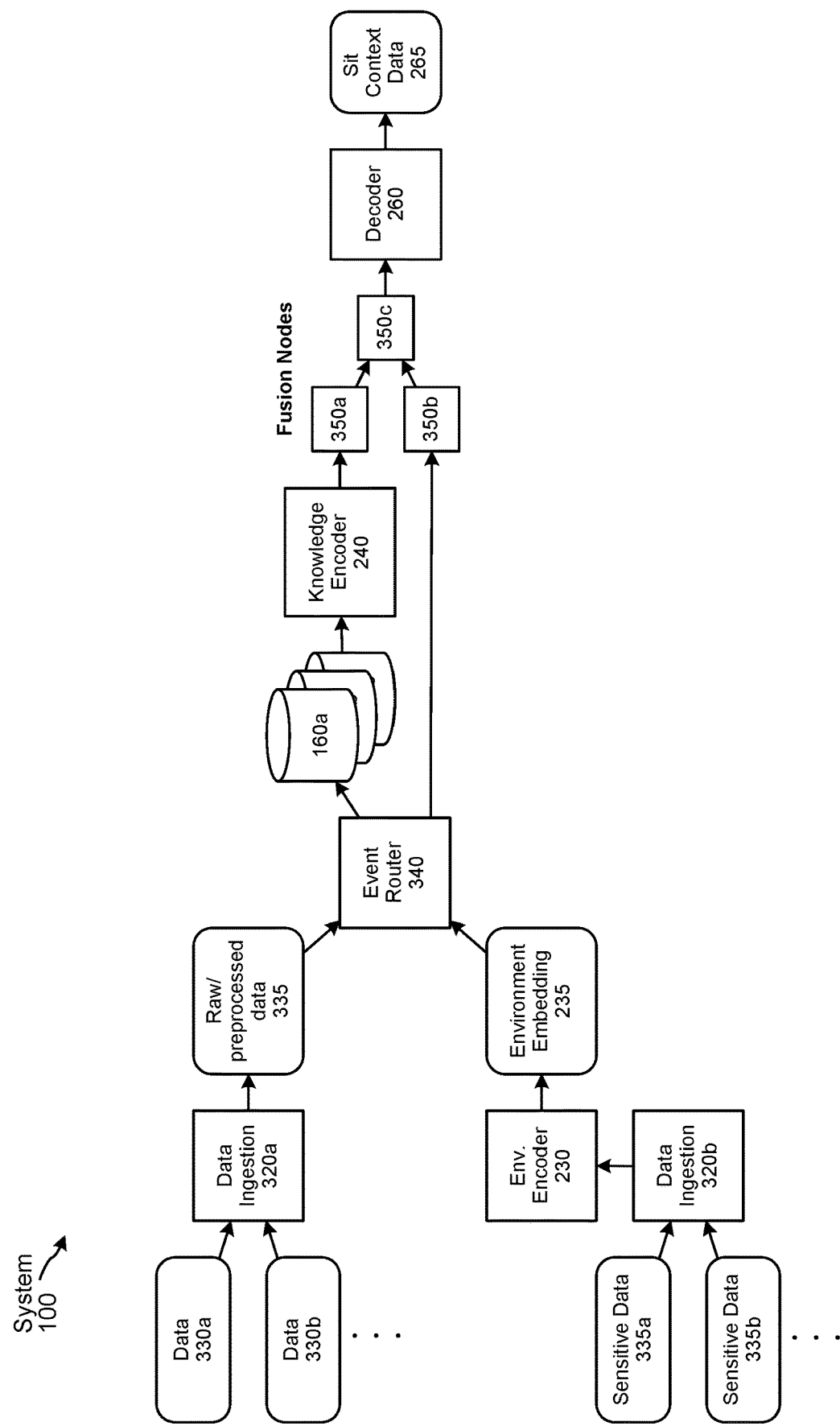
FIG. 3 is a conceptual diagram of components for enhancing privacy regarding context signals, according to embodiments of the present disclosure.

FIG. 3 is a conceptual diagram of components for enhancing privacy regarding context signals, according to embodiments of the present disclosure. The system 100 may implement a data ingestion framework that can perform on-device encoding and/or encryption to avoid sending user data from the user device 110 while using a federated learning framework to update the model(s) used for ingestion/encoding/encryption/etc. The privacy-enhancing techniques my include sending a blank (e.g., untrained) encoder model to the user device(s) 110, training the encoder model based on user data received by the device(s), sending gradients representing encoder model updates to a system component for aggregation, and sending a global model back to the user device(s) 110. These techniques may enhance privacy while providing for personalization of the model(s) to allow them to deliver better results to the user 5.

Data ingestion may vary depending on the sensitivity (and/or potential sensitivity) of different types of data. For example, the user device 110 may receive first data 330a and second data 330b, etc. The data 330 may include or represent information that has low or no sensitivity or implications for privacy. The data 330 may represent non-identifying information such as source signals 130 related to certain capabilities of the user device 110 (e.g., whether it has a display, is a vehicle, etc.). The user device 110 may process the data 330 using a first data ingestion component 320a, which may send raw and/or preprocessed data to other components of the system 100.

In contrast, the user device 110 may encode, encrypt, and/or otherwise obscure sensitive data 335 before sending it to other components of the system 100. For example, the user device 110 may receive first sensitive data 335a and second sensitive data 335b, etc. The sensitive data 335 may include, for example, source signals 130 pertaining to the user such as personally identifying information (PII), location, activity, other nearby users, etc. The user device 110 may process the sensitive data 335 using a second data ingestion component 320b. The user device 110 may further process the ingested data using a source encoder 230 to generate a source embedding data 235. The source encoder 230 and/or other component of the user device 110 may further encrypt the source embedding data 235 before sending it to other components of the system 100. In this manner, no sensitive data 335 has to leave the user device 110 and can be deleted after a brief retention period (e.g., 1 hour to 24 hours).

An event router 340 of the system 100 may receive the raw data 330 and/or the source embedding data 235 from various user devices 110 and either store the data in one or more of the knowledge sources 160 for current and/or future use, and/or send the data to one or more fusion nodes 350 of the information fusion component 250. The fusion nodes 350 may include a first fusion node 350a for combining encoded prior knowledge data 165 received from one or more knowledge sources 160. A second fusion node 350b may receive and/or combine raw data 335 and/or source embedding data 235 from the event router 340. A third fusion node 350c may receive and combine the fused data from the first fusion node 350a and the second fusion node 350b.

The information fusion component 250 (and/or fusion nodes 350) may be user configurable; for example, through a user interface and/or a configuration file. The information fusion component 250 may perform basic fusion functions such as score-level fusion (e.g., calculating cosine similarities between pairs of embeddings and/or model-based score inference based on a single embedding), embedding-level fusion (e.g., concatenating or otherwise combining multiple embeddings into a new embedding), and/or customizable, workflow-driven processing.

The privacy-enhancing techniques may be implemented in a training phase and a runtime phase. During the training stage, the data ingestion components 320 may retrieve an empty (e.g., blank/untrained) model from the system 100. The data ingestion components 320 may implement the empty model as a local copy. During training, the data ingestion components 320 may feed the model with local training data (e.g., source signals 130 and/or feedback). The trained local model(s) (e.g., the source encoder 230) may be ingested through a secure channel to the SCIC 150 (e.g., via gradients or other data indicating training updates made to the local model(s)). The SCIC 150 may combine data from multiple trained local models from various user device 110 and aggregate the training into a global, consensus-based model for runtime inference.

During a runtime stage, the data ingestion components 320 may retrieve the global runtime model(s) from the SCIC 150, store them on the user device 110, and use them for processing source signals 130. Sensitive data 335 (and, in some cases, some or all data 330 as well) may be processed via the locally trained/globally aggregated source encoder 230. The resulting source embedding data 235 may be sent to other components of the system 100 (e.g., the event router 340 and/or information fusion component 250) for processing and decoding into situational context data 265 by the decoder 260.

Figure 4:
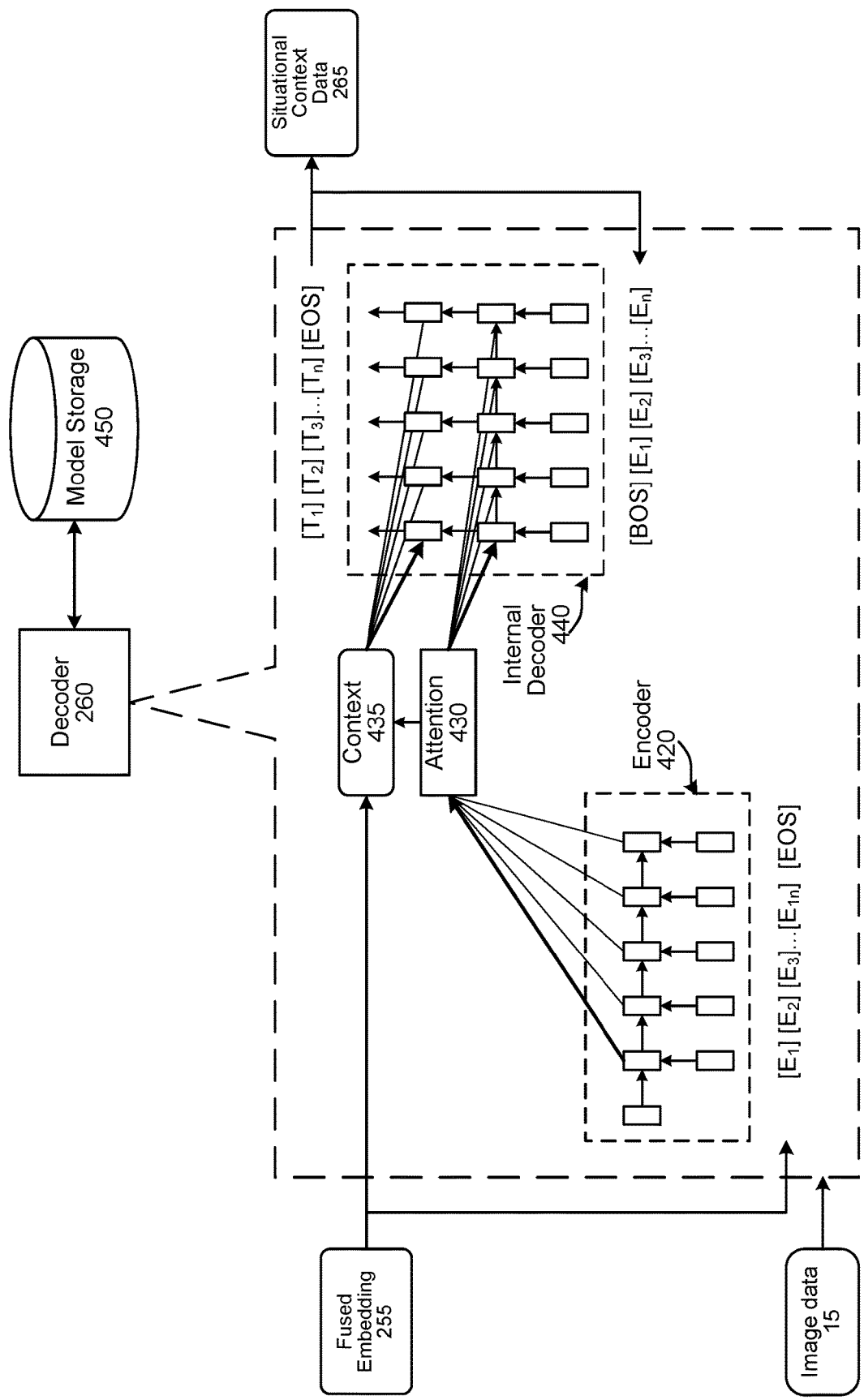
FIG. 4 is a conceptual diagram of a decoder configured to generate situational context data, according to embodiments of the present disclosure.

FIG. 4 is a conceptual diagram of a decoder 260 configured to generate situational context data, according to embodiments of the present disclosure. The decoder 260 shown in FIG. 4 may include a language model with an attention-based mechanism; for example, such as that found in a transformer DNN architecture. The language model may be pretrained on large sets of data (such as books and/or other prose retrieved from the world-wide web, etc.) using various tasks such as masked-word prediction and next-sentence prediction. The language model may be finetuned for particular tasks such as generating situational context data 265 from fused embedding data 255. The language model may be pretrained and/or finetuned for tasks such as prefix prompting, paraphrasing, sequence-to-sequence processing, and/or autoregression. One or more of these techniques may be used to generate a natural language output representing a user-centric description of the user's current environment.

The decoder 260 may receive the fused embedding data 255 and generate situational context data 265. The decoder 260 may encode the fused embedding data 255 in a manner that determines semantic meaning of the fused embedding data 255 and uses it as a prompt or prefix for generating a natural language output having a sentence structure. The decoder 260 may process the fused embedding data 255 using an attention-based mechanism; for example, such as that found in a transformer DNN architecture.

The decoder 260 may include an encoder 420, an attention mechanism 430, and an internal decoder 440. The decoder 260 may retrieve parameters for the various networks/models from a model storage 450. In some cases, the fused embedding data 255 may include an end-of-sentence (EOS) indicator and/or other symbol to indicate an end to a segment of fused embedding data 255 that should be decoded into a natural language output. The encoder 420 may produce a hidden representation of the fused embedding data 255. The hidden representation may be, for example, vectors representing amounts, moods, activities, words, and/or other values or contents of the source signals 130 and/or prior knowledge data 165. of the source text in, for example, a sequence-to-sequence model. The encoder 420 may be a recurrent neural network (RNN), such as a long short-term memory (LSTM) network.

The internal decoder 440 may also be a neural network such as a recurrent neural network (RNN). The internal decoder 440 may produce the situational context data 265 starting with a beginning-of-sentence (BOS) indicator or symbol. The internal decoder 440 may have access to the fused embedding data 255 (and/or an encoded representation thereof) through the attention mechanism 430. The attention mechanism 430 may generate a context vector 435. The context vector 435 may be filtered for each output time step (e.g., each word in the situational context data 265). The internal decoder 440 may use the context vector 435 at each time step to predict the next word of the situational context data 265 (e.g., based on a preceding word of the situational context data 265). In some implementations, the context data 435 may include (and/or be derived from) the fused embedding data 255. The decoder 260 may thus operate in a decoder only mode using a neural network such as the internal decoder 440 but without a neural network encoder such as the encoder 420.

In some implementations, the decoder 260 may be or include a cross-modality neural network model, such as a cross-modality LLM. The decoder 260 configured for cross-modality operation may receive and process image data 15 in addition to the fused embedding data 265 and/or other input data. The image data 15 may represent information about the user 5 and/or the user's surroundings such as whether it is light or dark, inside or outdoors, whether other people are present, etc. In some implementations, the image data 15 may be raw image data (e.g., as received by a camera 1518 of the user device 110). In some implementations, the image data 15 may be video data (e.g., a periodic sequence of image frames). In some implementations, the decoder 260 may receive image data that has been downsampled, compressed, and/or otherwise preprocessed to reduce its size. For example, the decoder 260 may receive every fourth, tenth, twentieth, etc. image frame from a video feed. In another example, image frames may be processed using one or more convolutional layers to extract certain features from the image data to preserve information relevant to generating the situational context data 265 while reducing the amount of image data the decoder 260 processes, thereby reducing an amount of computation used to generate the situational context data 265.

Using the attention mechanism 430, the internal decoder 440 may decide which portion of the situational context data 265 and/or encoded representation thereof (e.g., corresponding to individual source signals 130 and/or items of prior knowledge data 165) are most relevant for generating a word in the situational context data 265. Thus, the attention mechanism 430 provides the internal decoder 440 with access to portions of the fused embedding data 255 other than just a single source signal 130 and/or item of prior knowledge data 165. The attention mechanism 430 can further indicate a different importance to different portions of the fused embedding data 255 and/or encoded representation thereof (e.g., a hidden representation) for purposes of generating a corresponding portion of the situational context data 265. In other words, the attention mechanism 430 may enable the internal decoder 440 to focus on the most relevant parts of the fused embedding data 255. This may aid the decoder's 440 capability to convert an ambiguous signal or fact into an appropriate natural language representation. The internal decoder 440 may predict subsequent words in the situational context data 265 based on the generated word and/or its hidden representation (e.g., reflecting a semantic meaning of the word). The internal decoder 440 may continue to generate words until it predicts an EOS. The internal decoder 440 may predict an EOS based on converting all relevant source signals 130 and/or prior knowledge data 165, and/or based on identifying a logical semantic and/or grammatical end of a sentence, paragraph, etc.

One or both of the encoder 420 or the internal decoder 440 may include a confidence mechanism. The confidence mechanism may determine a confidence score associated an interpretation of a portion or all of the fused embedding data 255 (in the case of the encoder 420), or the hidden representation of the portion or all of the fused embedding data 255 (in the case of the internal decoder 440). The confidence score may represent a likelihood that a portion the fused embedding data 255 or hidden representation can be unambiguously associated with a particular meaning/translation based on the current information. If the score does not satisfy a certain condition (e.g., is below a threshold), the encoder 420/internal decoder 440 may continue to process the fused embedding data 255/hidden representations until the condition is satisfied (e.g., meets or exceeds a threshold).

In some implementations, the decoder 260 may leverage natural language processing capabilities of the NLU component 860. For example, the decoder 260 may receive NLU output data that represents a semantic representation of a user input. For example, the NLU results data may represent semantically cohesive speech portions, for example, in the form of <noun> <verb> <subject> etc. Based on the semantic portioning provided by the NLU processing, the decoder 260 may determine, for example, which prior knowledge data 165 may be more relevant to the source signals 130 based on disambiguation of portions of the user input performed by the NLU processing. The encoder 420 may also use the NLU output data to select an appropriate word or phrase for expressing information in the situational context data 265.

Figure 5:
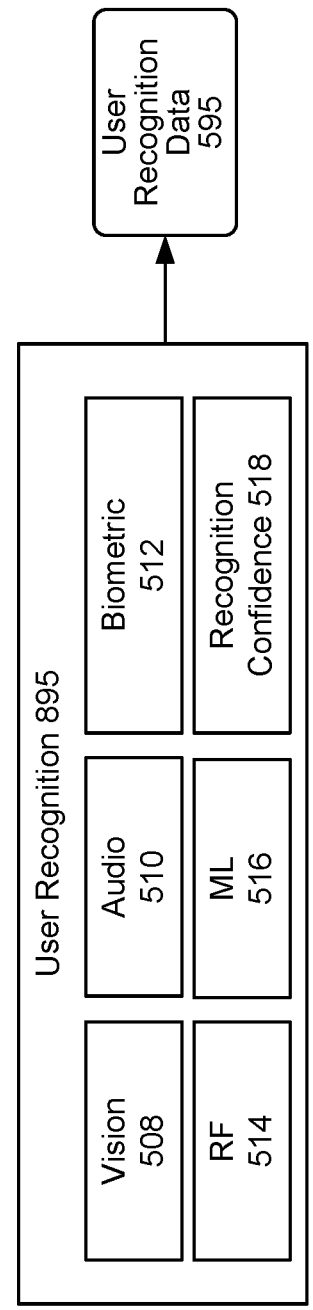
FIG. 5 is a schematic diagram of an illustrative architecture in which sensor data is combined to recognize one or more users according to embodiments of the present disclosure.

FIG. 5 is a schematic diagram of an illustrative architecture in which sensor data is combined to recognize one or more users, according to embodiments of the present disclosure. The device 110 and/or the system component(s) 120 may include a user-recognition component 895 that recognizes one or more users using various source signals 130; for example, image data, audio data, sensor data, etc. As illustrated in FIG. 5, the user-recognition component 895 may include one or more subcomponents including a vision component 508, an audio component 510, a biometric component 512, a radio frequency (RF) component 514, a machine learning (ML) component 516, and a recognition confidence component 518. In some instances, the user-recognition component 895 may monitor data and determinations from one or more subcomponents to determine an identity of one or more users associated with data input to the device 110 and/or the system component(s) 120. The user-recognition component 895 may output user recognition data 595, which may include a user identifier associated with a user the user-recognition component 895 determines originated data input to the device 110 and/or the system component(s) 120. The user recognition data 595 may be used to inform processes performed by various components of the device 110 and/or the system component(s) 120. For example, inferences generated by the user-recognition component 895—including outputs of the vision component 508, audio component 510, biometric component 512, radio frequency (RF) component 514, machine learning (ML) component 516, and recognition confidence component 518 as well as the ultimate user recognition data 595—may be received by the SCIC 150 as source signals 130. Alternatively, or in addition, the user-recognition component 895 may also use situational context data 265. As can be appreciated, both the user recognition data 595 and the situational context data 265 may be regularly updated, allowing a loop of input and changing data to alter each, enabling the system to make more accurate determinations of situational context data 265 and user recognition data 595 based on changing conditions. In certain configurations, for example where situational context data 265 may represent natural language text describing the situational context, user-recognition component 895 may be configured to process natural language data to assist with performing user-recognition operations.

The vision component 508 may receive data from one or more sensors capable of providing images (e.g., cameras) or sensors indicating motion (e.g., motion sensors). The vision component 508 can perform facial recognition or image analysis to determine an identity of a user and to associate that identity with a user profile associated with the user. In some instances, when a user is facing a camera, the vision component 508 may perform facial recognition and identify the user with a high degree of confidence. In other instances, the vision component 508 may have a low degree of confidence of an identity of a user, and the user-recognition component 895 may utilize determinations from additional components to determine an identity of a user. The vision component 508 can be used in conjunction with other components to determine an identity of a user. For example, the user-recognition component 895 may use data from the vision component 508 with data from the audio component 510 to identify what user's face appears to be speaking at the same time audio is captured by a device 110 the user is facing for purposes of identifying a user who spoke an input to the device 110 and/or the system component(s) 120.

The overall system of the present disclosure may include biometric sensors that transmit data to the biometric component 512. For example, the biometric component 512 may receive data corresponding to fingerprints, iris or retina scans, thermal scans, weights of users, a size of a user, pressure (e.g., within floor sensors), etc., and may determine a biometric profile corresponding to a user. The biometric component 512 may distinguish between a user and sound from a television, for example. Thus, the biometric component 512 may incorporate biometric information into a confidence level for determining an identity of a user. Biometric information output by the biometric component 512 can be associated with specific user profile data such that the biometric information uniquely identifies a user profile of a user.

The radio frequency (RF) component 514 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 514 the strength of the signal (e.g., as a received signal strength indication (RSSI)). The RF component 514 may use the RSSI to determine an identity of a user (with an associated confidence level). In some instances, the RF component 514 may determine that a received RF signal is associated with a mobile device that is associated with a particular user identifier.

In some instances, a personal device (such as a phone, tablet, wearable or other device) may include some RF or other detection processing capabilities so that a user who speaks an input may scan, tap, or otherwise acknowledge his/her personal device to the device 110. In this manner, the user may "register" with the system 100 for purposes of the system 100 determining who spoke a particular input. Such a registration may occur prior to, during, or after speaking of an input.

The ML component 516 may track the behavior of various users as a factor in determining a confidence level of the identity of the user. By way of example, a user may adhere to a regular schedule such that the user is at a first location during the day (e.g., at work or at school). In this example, the ML component 516 would factor in past behavior and/or trends in determining the identity of the user that provided input to the device 110 and/or the system component(s) 120. Thus, the ML component 516 may use historical data and/or usage patterns over time to increase or decrease a confidence level of an identity of a user.

In at least some instances, the recognition confidence component 518 receives determinations from the various components 508, 510, 512, 514, and 516, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 595.

The audio component 510 may receive data from one or more sensors capable of providing an audio signal (e.g., one or more microphones 1520) to facilitate recognition of a user. The audio component 510 may perform audio recognition on an audio signal to determine an identity of the user and associated user identifier. In some instances, aspects of device 110 and/or the system component(s) 120 may be configured at a computing device (e.g., a local server). Thus, in some instances, the audio component 510 operating on a computing device may analyze all sound to facilitate recognition of a user. In some instances, the audio component 510 may perform voice recognition to determine an identity of a user.

The audio component 510 may also perform user identification based on audio data 811 input into the device 110 and/or the system component(s) 120 for speech processing. The audio component 510 may determine scores indicating whether speech in the audio data 811 originated from particular users. For example, a first score may indicate a likelihood that speech in the audio data 811 originated from a first user associated with a first user identifier, a second score may indicate a likelihood that speech in the audio data 811 originated from a second user associated with a second user identifier, etc. The audio component 510 may perform user recognition by comparing speech characteristics represented in the audio data 811 to stored speech characteristics of users (e.g., stored voice profiles associated with the device 110 that captured the spoken user input).

Figure 6:
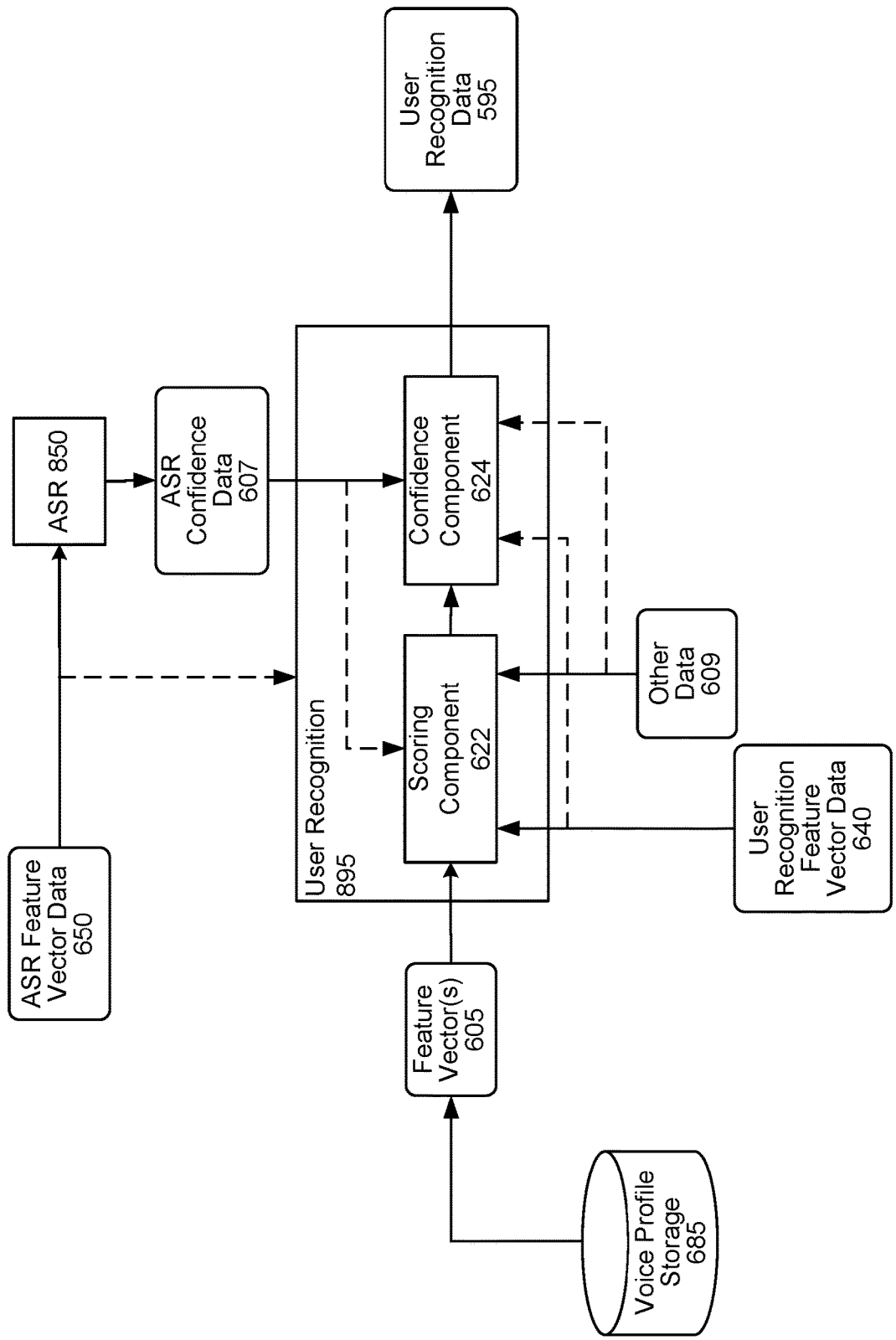
FIG. 6 is a system flow diagram illustrating user recognition according to embodiments of the present disclosure.

FIG. 6 illustrates user recognition processing as may be performed by the user-recognition component 895. The ASR component 850 performs ASR processing on ASR feature vector data 650. ASR confidence data 607 may be passed to the user-recognition component 895.

The user-recognition component 895 performs user recognition using various data including the user recognition feature vector data 640, feature vectors 605 representing voice profiles of users of the system 100, the ASR confidence data 607, and other data 609. The user-recognition component 895 may output the user recognition data 595, which reflects a certain confidence that the user input was spoken by one or more particular users. The user recognition data 595 may include one or more user identifiers (e.g., corresponding to one or more voice profiles). Each user identifier in the user recognition data 595 may be associated with a respective confidence value, representing a likelihood that the user input corresponds to the user identifier. A confidence value may be a numeric or binned value.

The feature vector(s) 605 input to the user-recognition component 895 may correspond to one or more voice profiles. The user-recognition component 895 may use the feature vector(s) 605 to compare against the user recognition feature vector data 640, representing the present user input, to determine whether the user recognition feature vector data 640 corresponds to one or more of the feature vectors 605 of the voice profiles. Each feature vector 605 may be the same size as the user recognition feature vector data 640.

To perform user recognition, the user-recognition component 895 may determine the device 110 from which the audio data 811 originated. For example, the audio data 811 may be associated with metadata including a device identifier representing the device 110. Either the device 110 or the system component(s) 120 may generate the metadata. The system 100 may determine a group profile identifier associated with the device identifier, may determine user identifiers associated with the group profile identifier, and may include the group profile identifier and/or the user identifiers in the metadata. The system 100 may associate the metadata with the user recognition feature vector data 640 produced from the audio data 811. The user-recognition component 895 may send a signal to voice profile storage 685, with the signal requesting only audio data and/or feature vectors 605 (depending on whether audio data and/or corresponding feature vectors are stored) associated with the device identifier, the group profile identifier, and/or the user identifiers represented in the metadata. This limits the universe of possible feature vectors 605 the user-recognition component 895 considers at runtime and thus decreases the amount of time to perform user recognition processing by decreasing the amount of feature vectors 605 needed to be processed. Alternatively, the user-recognition component 895 may access all (or some other subset of) the audio data and/or feature vectors 605 available to the user-recognition component 895. However, accessing all audio data and/or feature vectors 605 will likely increase the amount of time needed to perform user recognition processing based on the magnitude of audio data and/or feature vectors 605 to be processed.

If the user-recognition component 895 receives audio data from the voice profile storage 685, the user-recognition component 895 may generate one or more feature vectors 605 corresponding to the received audio data.

The user-recognition component 895 may attempt to identify the user that spoke the speech represented in the audio data 811 by comparing the user recognition feature vector data 640 to the feature vector(s) 605. The user-recognition component 895 may include a scoring component 622 that determines respective scores indicating whether the user input (represented by the user recognition feature vector data 640) was spoken by one or more particular users (represented by the feature vector(s) 605). The user-recognition component 895 may also include a confidence component 624 that determines an overall accuracy of user recognition processing (such as those of the scoring component 622) and/or an individual confidence value with respect to each user potentially identified by the scoring component 622. The output from the scoring component 622 may include a different confidence value for each received feature vector 605. For example, the output may include a first confidence value for a first feature vector 605a (representing a first voice profile), a second confidence value for a second feature vector 605b (representing a second voice profile), etc. Although illustrated as two separate components, the scoring component 622 and the confidence component 624 may be combined into a single component or may be separated into more than two components.

The scoring component 622 and the confidence component 624 may implement one or more trained machine learning models (such as neural networks, classifiers, etc.) as known in the art. For example, the scoring component 622 may use probabilistic linear discriminant analysis (PLDA) techniques. PLDA scoring determines how likely it is that the user recognition feature vector data 640 corresponds to a particular feature vector 605. The PLDA scoring may generate a confidence value for each feature vector 605 considered and may output a list of confidence values associated with respective user identifiers. The scoring component 622 may also use other techniques, such as GMMs, generative Bayesian models, or the like, to determine confidence values.

The confidence component 624 may input various data including information about the ASR confidence 607, speech length (e.g., number of frames or other measured length of the user input), audio condition/quality data (such as signal-to-interference data or other metric data), fingerprint data, image data, or other factors to consider how confident the user-recognition component 895 is with regard to the confidence values linking users to the user input. The confidence component 624 may also consider the confidence values and associated identifiers output by the scoring component 622. For example, the confidence component 624 may determine that a lower ASR confidence 607, or poor audio quality, or other factors, may result in a lower confidence of the user-recognition component 895. Whereas a higher ASR confidence 607, or better audio quality, or other factors, may result in a higher confidence of the user-recognition component 895. Precise determination of the confidence may depend on configuration and training of the confidence component 624 and the model(s) implemented thereby. The confidence component 624 may operate using a number of different machine learning models/techniques such as GMM, neural networks, etc. For example, the confidence component 624 may be a classifier configured to map a score output by the scoring component 622 to a confidence value.

The user-recognition component 895 may output user recognition data 595 specific to a one or more user identifiers. For example, the user-recognition component 895 may output user recognition data 595 with respect to each received feature vector 605. The user recognition data 595 may include numeric confidence values (e.g., 0.0-1.0, 0-1000, or whatever scale the system is configured to operate). Thus, the user recognition data 595 may output an n-best list of potential users with numeric confidence values (e.g., user identifier 123—0.2, user identifier 234—0.8). Alternatively or in addition, the user recognition data 595 may include binned confidence values. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." The user-recognition component 895 may output an n-best list of user identifiers with binned confidence values (e.g., user identifier 123—low, user identifier 234—high). Combined binned and numeric confidence value outputs are also possible. Rather than a list of identifiers and their respective confidence values, the user recognition data 595 may only include information related to the top scoring identifier as determined by the user-recognition component 895. The user-recognition component 895 may also output an overall confidence value that the individual confidence values are correct, where the overall confidence value indicates how confident the user-recognition component 895 is in the output results. The confidence component 624 may determine the overall confidence value.

The confidence component 624 may determine differences between individual confidence values when determining the user recognition data 595. For example, if a difference between a first confidence value and a second confidence value is large, and the first confidence value is above a threshold confidence value, then the user-recognition component 895 is able to recognize a first user (associated with the feature vector 605 associated with the first confidence value) as the user that spoke the user input with a higher confidence than if the difference between the confidence values were smaller.

The user-recognition component 895 may perform thresholding to avoid incorrect user recognition data 595 being output. For example, the user-recognition component 895 may compare a confidence value output by the confidence component 624 to a threshold confidence value. If the confidence value does not satisfy (e.g., does not meet or exceed) the threshold confidence value, the user-recognition component 895 may not output user recognition data 595, or may only include in that data 595 an indicator that a user that spoke the user input could not be recognized. Further, the user-recognition component 895 may not output user recognition data 595 until enough user recognition feature vector data 640 is accumulated and processed to verify a user above a threshold confidence value. Thus, the user-recognition component 895 may wait until a sufficient threshold quantity of audio data of the user input has been processed before outputting user recognition data 595. The quantity of received audio data may also be considered by the confidence component 624.

The user-recognition component 895 may be defaulted to output binned (e.g., low, medium, high) user recognition confidence values. However, such may be problematic in certain situations. For example, if the user-recognition component 895 computes a single binned confidence value for multiple feature vectors 605, the system may not be able to determine which particular user originated the user input. In this situation, the user-recognition component 895 may override its default setting and output numeric confidence values. This enables the system to determine a user, associated with the highest numeric confidence value, originated the user input.

The user-recognition component 895 may use other data 609 to inform user recognition processing. A trained model(s) or other component of the user-recognition component 895 may be trained to take other data 609 as an input feature when performing user recognition processing. Other data 609 may include a variety of data types depending on system configuration and may be made available from other sensors, devices, or storage. The other data 609 may include a time of day at which the audio data 811 was generated by the device 110 or received from the device 110, a day of a week in which the audio data 811 was generated by the device 110 or received from the device 110, etc.

The other data 609 may include image data or video data. For example, facial recognition may be performed on image data or video data received from the device 110 from which the audio data 811 was received (or another device). Facial recognition may be performed by the user-recognition component 895. The output of facial recognition processing may be used by the user-recognition component 895. That is, facial recognition output data may be used in conjunction with the comparison of the user recognition feature vector data 640 and one or more feature vectors 605 to perform more accurate user recognition processing.

The other data 609 may include location data of the device 110. The location data may be specific to a building within which the device 110 is located. For example, if the device 110 is located in user A's bedroom, such location may increase a user recognition confidence value associated with user A and/or decrease a user recognition confidence value associated with user B.

The other data 609 may include data indicating a type of the device 110. Different types of devices may include, for example, a smart watch, a smart phone, a tablet, and a vehicle. The type of the device 110 may be indicated in a profile associated with the device 110. For example, if the device 110 from which the audio data 811 was received is a smart watch or vehicle belonging to a user A, the fact that the device 110 belongs to user A may increase a user recognition confidence value associated with user A and/or decrease a user recognition confidence value associated with user B.

The other data 609 may include geographic coordinate data associated with the device 110. For example, a group profile associated with a vehicle may indicate multiple users (e.g., user A and user B). The vehicle may include a global positioning system (GPS) indicating latitude and longitude coordinates of the vehicle when the vehicle generated the audio data 811. As such, if the vehicle is located at a coordinate corresponding to a work location/building of user A, such may increase a user recognition confidence value associated with user A and/or decrease user recognition confidence values of all other users indicated in a group profile associated with the vehicle. A profile associated with the device 110 may indicate global coordinates and associated locations (e.g., work, home, etc.). One or more user profiles may also or alternatively indicate the global coordinates.

The other data 609 may include data representing activity of a particular user that may be useful in performing user recognition processing. For example, a user may have recently entered a code to disable a home security alarm. A device 110, represented in a group profile associated with the home, may have generated the audio data 811. The other data 609 may reflect signals from the home security alarm about the disabling user, time of disabling, etc. If a mobile device (such as a smart phone, Tile, dongle, or other device) known to be associated with a particular user is detected proximate to (for example physically close to, connected to the same Wi-Fi network as, or otherwise nearby) the device 110, this may be reflected in the other data 609 and considered by the user-recognition component 895.

Depending on system configuration, the other data 609 may be configured to be included in the user recognition feature vector data 640 so that all the data relating to the user input to be processed by the scoring component 622 may be included in a single feature vector. Alternatively, the other data 609 may be reflected in one or more different data structures to be processed by the scoring component 622.

FIG. 7 is a schematic diagram of an illustrative architecture for receiving and processing certain context signals, according to embodiments of the present disclosure. The system 100 may include a presence detection component 894 that determines the presence and/or location of one or more users using a variety of data. FIG. 7 is a schematic diagram of an illustrative architecture in which sensor data is combined to determine the presence and/or location of one or more users, according to embodiments of the present disclosure. Both the sensor data and the presence/inference data may be ingested as environmental signals by the SCIC 150.

In some implementations, the presence detection component 894 may use sensors and/or sensor data in common with the user-recognition component 895 including the vision component 508, audio component 510, biometric component 512, and/or radio frequency (RF) component 514, etc. The presence detection component 894 may use these components to determine the presence of users within an environment. The presence detection component 894 may base its operation on sensor data detected by a variety of devices, for example devise such as those shown in FIG. 7 which may provide image data, audio data, RF data or even data from other sensors not expressly shown in FIG. 7 such as a RADAR sensor, LIDAR sensor, proximity sensor, etc.

Thus, in some instances, the presence detection component 894 may monitor data and determinations from one or more components to determine an identity of a user and/or a location of a user in an environment 702. The presence detection component 894 may output user presence data 795 which may indicate the presence of one or more users in an environment. The user presence data 795 may also indicate a location of the user within the environment if the system has determined such information. The user presence data 795 may also include a user identifier (e.g., user recognition data 595) matched with location information as to where the system believes the particular user of the user identifier is located. Such data may rely on processing by the user-recognition component 895.

The location information may include geographic information (such as an address, city, state, country, geo-position (e.g., GPS coordinates), velocity, latitude, longitude, altitude, or the like). The location information may also include a device identifier, zone identifier or environment identifier corresponding to a device/zone/environment the particular user is nearby/within. Output of the presence detection component 894 may be used to inform NLU component 860 processes as well as processing performed by skill components 890, routing of output data, permission access to further information, etc. The details of the vision component 508, the audio component 510, the biometric component 512, the radio frequency component 514, the machine learning component 716, and the presence confidence component 718 are provided below following a description of the environment 702.

In some instances, the environment 702 may represent a home or office associated with a user 5a "Alice" and/or a user 5b "Bob." In some instances, the user 5a "Alice" may be associated with a computing device 724, such as a smartphone. In some instances, the user 5b "Bob" may be associated with a radio frequency device 726, such as a wearable device (e.g., a smartwatch) or an identifier beacon.

The environment 702 may include, but is not limited to, a number of devices that may be used to locate a user. For example, within zone 701(1), the environment 702 may include an imaging device 728, an appliance 730, a voice-controlled device 110a, and a computing device 734. Within zone 701(2), the environment 702 may include a microphone 736 and a motion sensor 738. Within zone 701(3), the environment may include an imaging device 740, a television 742, a speaker 744, a set-top box 746, a voice-controlled device 110b, a television 750, and an access point 752. Within zone 701(4), the environment 702 may include an appliance 754, an imaging device 756, a speaker 758, a voice-controlled device 110c, and a microphone 760.

Further, in some instances, the presence detection component 894 may have information regarding the layout of the environment 702, include details regarding which devices are in which zones, the relationship between zones (e.g., which rooms are adjacent), and/or the placement of individual devices within each zone. In some instances, the presence detection component 894 can leverage knowledge of the relationships between zones and the devices within each zone to increase a confidence level of user identity and location as a user moves about the environment 702. For example, in a case where the user 5b is in zone 701(3), and subsequently moves beyond a field of view of the imaging device 740 into the zone 701(2), the presence detection component 894 may infer a location and/or identity of the user to determine with a high confidence level (in combination with data from one or more other devices) that any motion detected by the motion sensor 738 corresponds to movement by the user 5*b*.

In some instances, the vision component 508 may receive data from one or more sensors capable of providing images (e.g., such as the imaging devices 728, 740, 756 and the computing devices 724 and 734) or sensors indicating motion (e.g., such as the motion sensor 738). In some instances, the vision component 508 can perform facial recognition or image analysis to determine an identity of a user and to associate that identity with a user profile associated with the user. In some instances, when a user (e.g., the user 5*b* "Bob") is facing the imaging device 740, the vision component 508 may perform facial recognition and identify the user 5*b* with a high degree of confidence. In some instances, the vision component 508 may have a low degree of confidence of an identity of a user, and the presence detection component 894 may utilize determinations from additional components to determine an identity and/or location of a user. In some instances, the vision component 508 can be used in conjunction with other components to determine when a user is moving to a new location within the environment 702. In some instances, the vision component 508 can receive data from one or more imaging devices to determine a layout of a zone or room, and/or to determine which devices are in a zone and where they are located. In some instances, data from the vision component 508 may be used with data from the audio component 510 to identify what face appears to be speaking at the same time audio is captured by a particular device the user is facing for purposes of identifying a user who spoke an utterance.

In some instances, the environment 702 may include biometric sensors that may transmit data to the biometric component 512. For example, the biometric component 512 may receive data corresponding to fingerprints, iris or retina scans, thermal scans, weights of users, a size of a user, pressure (e.g., within floor sensors), etc., and may determine a biometric profile corresponding to a user. In some instances, the biometric component 512 may distinguish between a user and sound from a television, for example. Thus, the biometric component 512 may incorporate biometric information into a confidence level for determining an identity and/or location of a user. In some instances, the biometric information from the biometric component 512 can be associated with a specific user profile such that the biometric information uniquely identifies a user profile of a user (for example in conjunction with user-recognition component 895).

In some instances, the radio frequency (RF) component 514 may use RF localization to track devices that a user may carry or wear. For example, as discussed above, the user 5*a* (and a user profile associated with the user) may be associated with a computing device 724. The computing device 724 may emit RF signals (e.g., Wi-Fi, Bluetooth®, etc.), which are illustrated as signals 762 and 764. As illustrated, the appliance 754 may detect the signal 762 and the access point 752 may detect the signal 764. In some instances, the access point 752 and the appliance 754 may indicate to the RF component 514 the strength of the signals 764 and 762 (e.g., as a received signal strength indication (RSSI)), respectively. Thus, the RF component 514 may compare the RSSI for various signals and for various appliances and may determine an identity and/or location of a user (with an associated confidence level). In some instances, the RF component 514 may determine that a received RF signal is associated with a mobile device that is associated with a particular user. In some instances, a device (e.g., the access point 752) may be configured with multiple antennas to determine a location of a user relative to the device using beamforming or spatial diversity techniques. In such a case, the RF component 514 may receive an indication of the direction of the user relative to an individual device.

As illustrated, the appliance 730 may receive a signal 766 from the RF device 726 associated with the user and a user profile, while the access point 752 may receive a signal 768. Further, the appliance 754 can receive a signal 770 from the RF device 726. In an example where there is some uncertainty about an identity of the users in zones 701(3) and 701(4), the RF component 514 may determine that the RSSI of the signals 762, 764, 766, 768, and/or 770 increases or decreases a confidence level of an identity and/or location of the users, such as the user 5*a* and/or 5*b*. For example, if an RSSI of the signal 762 is higher than the RSSI of the signal 770, the RF component may determine that it is more likely that a user in the zone 701(4) is the user 5*a* than the user 5*b*. In some instances, a confidence level of the determination may depend on a relative difference of the RSSIs, for example.

In some instances, a voice-controlled device 110, or another device proximate to the voice controlled device 110 may include some RF or other detection processing capabilities so that a user who speaks an utterance may scan, tap, or otherwise acknowledge his/her personal device (such as a phone) to a sensing device in the environment 702. In this manner the user may "register" with the system for purposes of the system determining who spoke a particular utterance. Such a registration may occur prior to, during, or after speaking of an utterance.

In some instances, the audio component 510 may receive data from one or more sensors capable of providing an audio signal (e.g., the voice-controlled devices 110*a-c*, the microphones 736 and 760, the computing devices 724 and 734, the set-top box 746) to facilitate locating a user. In some instances, the audio component 510 may perform audio recognition on an audio signal to determine an identity of the user and an associated user profile. Further, in some instances, the imaging devices 728, 740, and 756 may provide an audio signal to the audio component 510. In some instances, the audio component 510 is configured to receive an audio signal from one or more devices and may determine a sound level or volume of the source of the audio. In some instances, if multiple sources of audio are available, the audio component 510 may determine that two audio signals correspond to the same source of sound and may compare the relative amplitudes or volumes of the audio signal to determine a location of the source of sound. In some instances, individual devices may include multiple microphones and may determine a direction of a user with respect to an individual device. In some instances, aspects of the system component(s) 120 may be configured at a computing device (e.g., a local server) within the environment 702. Thus, in some instances, the audio component 510 operating on a computing device in the environment 702 may analyze all sound within the environment 702 (e.g., without requiring a wake word) to facilitate locating a user.

The ML component 716 may track the behavior of various users as a factor in determining a confidence level of the presence of users. By way of example, a user may adhere to a regular schedule such that the user is at a first location during the day (e.g., at work or at school). In this example, the ML component 716 may factor in past behavior and/or trends in determining the presence of a user that provided input to the device 110 and/or the system component(s) 120. Thus, the ML component 716 may use historical data and/or usage patterns over time to increase or decrease a confidence level of a presence of a user.

In at least some instances, the recognition confidence component 718 receives determinations from the various components 508, 510, 512, 514, and 716, and may determine a final confidence level associated with the presence of a user. The confidence level or other score data may be included in the user presence data 795.

The user presence data 795 may be used to inform processes performed by various components of the device 110 and/or the system component(s) 120. For example, inferences generated by the presence detection component 894—including outputs of the vision component 508, audio component 510, biometric component 512, radio frequency (RF) component 514, machine learning (ML) component 716, and presence confidence component 718 as well as the ultimate user presence data 795—may be received by the SCIC 150 as source signals 130. Alternatively, or in addition, the presence detection component 894 may also use situational context data 265. As can be appreciated, both the user presence data 795 and the situational context data 265 may be regularly updated, allowing a loop of input and changing data to alter each, enabling the system to make more accurate determinations of situational context data 265 and user presence data 795 based on changing conditions. In certain configurations, for example where situational context data 265 may represent natural language text describing the situational context, presence detection component 894 may be configured to process natural language data to assist with performing user presence detection operations.

FIG. 8 illustrates integration of the situational context data system in a natural language command processing system, according to embodiments of the present disclosure. The system 100 may operate using various components as described in FIG. 8. The various components may be located on same or different physical devices. Communication between various components may occur directly or across a network(s) 199. The device 110 may include audio capture component(s), such as a microphone 1520 or array of microphones 1520 of a device 110, captures audio 11 and creates corresponding audio data. Once speech is detected in audio data representing the audio 11, the device 110 may determine if the speech is directed at the device 110/system component 120. In at least some embodiments, such determination may be made using a wakeword detection component 820. The wakeword detection component 820 may be configured to detect various wakewords. In at least some examples, each wakeword may correspond to a name of a different digital assistant. An example wakeword/digital assistant name is "Alexa." In another example, input to the system may be in form of text data 13, for example as a result of a user typing an input into a user interface of device 110. Other input forms may include indication that the user has pressed a physical or virtual button on device 110, the user has made a gesture, etc. The device 110 may also capture images using camera(s) 1518 of the device 110 and may send image data 15 representing those image(s) to the system component 120. The image data 15 may include raw image data or image data processed by the device 110 before sending to the system component 120. The image data 15 may be used in various manners by different components of the system to perform operations such as determining whether a user is directing an utterance to the system, interpreting a user command, responding to a user command, etc.

An acoustic front end (AFE) 822 may receive the audio 11 and generate audio data 811. The wakeword detection component 820 of the device 110 may process the audio data 811, representing the audio 11, to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 820 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 820 may be built on deep neural network (DNN)/recursive neural network (RNN) structures directly, without HMM being involved. Such an architecture may estimate the posteriors of wakewords with context data, either by stacking frames within a context window for DNN or using RNN. Follow-on posterior threshold tuning or smoothing is applied for decision making. Other techniques for wakeword detection, such as those known in the art, may also be used.

Once the wakeword is detected by the wakeword detection component 820 and/or input is detected by an input detector, the device 110 may "wake" and begin transmitting audio data 811, representing the audio 11, to the system component(s) 120. The audio data 811 may include data corresponding to the wakeword; in other embodiments, the portion of the audio corresponding to the wakeword is removed by the device 110 prior to sending the audio data 811 to the system component(s) 120. In the case of touch input detection or gesture-based input detection, the audio data may not include a wakeword.

In some implementations, the system 100 may include more than one system component 120. The system components 120 may respond to different wakewords and/or perform different categories of tasks. Each system component 120 may be associated with its own wakeword such that speaking a certain wakeword results in audio data be sent to and processed by a particular system. For example, detection of the wakeword "Alexa" by the wakeword detection component 820 may result in sending audio data to system component 120a for processing while detection of the wakeword "Computer" by the wakeword detector may result in sending audio data to system component 120b for processing. The system may have a separate wakeword and system for different skills/systems (e.g., "Dungeon Master" for a game play skill/system component 120c) and/or such skills/systems may be coordinated by one or more skill component(s) 890 of one or more system components 120.

Upon receipt by the system component(s) 120, the audio data 811 may be sent to an orchestrator component 830. The orchestrator component 830 may include memory and logic that enables the orchestrator component 830 to transmit various pieces and forms of data to various components of the system, as well as perform other operations as described herein.

The orchestrator component 830 may send the audio data 811 to language processing components 892. The language processing components 892 (sometimes also referred to as a spoken language understanding (SLU) component) include an automatic speech recognition (ASR) component 850 and a natural language understanding (NLU) component 860. The ASR component 850 may transcribe the audio data 811 into text data. The text data output by the ASR component 850 represents one or more than one (e.g., in the form of an N-best list) ASR hypotheses representing speech represented in the audio data 811. The ASR component 850 interprets the speech in the audio data 811 based on a similarity between the audio data 811 and pre-established language models. For example, the ASR component 850 may compare the audio data 811 with models for sounds (e.g., acoustic units such as phonemes, senons, phones, etc.) and sequences of sounds to identify words that match the sequence of sounds of the speech represented in the audio data 811. The ASR component 850 sends the text data generated thereby to an NLU component 860, via, in some embodiments, the orchestrator component 830. The text data sent from the ASR component 850 to the NLU component 860 may include a single top-scoring ASR hypothesis or may include an N-best list including multiple top-scoring ASR hypotheses. An N-best list may additionally include a respective score associated with each ASR hypothesis represented therein. The ASR component 850 is described in greater detail below with regard to FIG. 9.

The language processing components 892 may further include a NLU component 860. The NLU component 860 may receive the text data from the ASR component. The NLU component 860 may attempts to make a semantic interpretation of the phrase(s) or statement(s) represented in the text data input therein by determining one or more meanings associated with the phrase(s) or statement(s) represented in the text data. The NLU component 860 may determine an intent representing an action that a user desires be performed and may determine information that allows a device (e.g., the device 110, the system component(s) 120, a skill component 890, a skill support system component(s) 825, etc.) to execute the intent. For example, if the text data corresponds to "play the 5th Symphony by Beethoven," the NLU component 860 may determine an intent that the system output music and may identify "Beethoven" as an artist/composer and "5th Symphony" as the piece of music to be played. For further example, if the text data corresponds to "what is the weather," the NLU component 860 may determine an intent that the system output weather information associated with a geographic location of the device 110. In another example, if the text data corresponds to "turn off the lights," the NLU component 860 may determine an intent that the system turn off lights associated with the device 110 or the user 5. However, if the NLU component 860 is unable to resolve the entity—for example, because the entity is referred to by anaphora such as "this song" or "my next appointment"—the language processing components 892 can send a decode request to other language processing components 892 for information regarding the entity mention and/or other context related to the utterance. The language processing components 892 may augment, correct, or base results data upon the audio data 811 as well as any data received from the other language processing components 892.

The NLU component 860 may return NLU results data 1285/1225 (which may include tagged text data, indicators of intent, etc.) back to the orchestrator component 830. The orchestrator component 830 may forward the NLU results data to a skill component(s) 890. If the NLU results data includes a single NLU hypothesis, the NLU component 860 and the orchestrator component 830 may direct the NLU results data to the skill component(s) 890 associated with the NLU hypothesis. If the NLU results data 1285/1225 includes an N-best list of NLU hypotheses, the NLU component 860 and the orchestrator component 830 may direct the top scoring NLU hypothesis to a skill component(s) 890 associated with the top scoring NLU hypothesis. The system may also include a post-NLU ranker 865 which may incorporate other information to rank potential interpretations determined by the NLU component 860. In some implementations, the NLU component 860 may send ASR data to an alternative input component 840 as described further below with reference to FIG. 10. The NLU component 860, post-NLU ranker 865 and other components are described in greater detail below with regard to FIGS. 11 and 12.

A skill component may be software running on the system component(s) 120 that is akin to a software application. That is, a skill component 890 may enable the system component(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The skill component(s) 890 may perform actions for and/or on behalf the user 5, and/or cause such performance. In some implementations, the system 100 may send situational context data 265 to one or more skill component(s) 890 for use in handing user requests (e.g., determining an action to perform and/or effecting performance of the action). The system component(s) 120 may be configured with more than one skill component 890. Various skill components 890 may handle actions including recommendations (e.g., system-initiated actions), generating responses (e.g., answering user inquiries), and/or performing other actions (e.g., online shopping, messaging, controlling smart home and/or smart vehicle devices, etc.). For example, a weather service skill component may enable the system component(s) 120 to provide weather information, a car service skill component may enable the system component(s) 120 to book a trip with respect to a taxi or ride sharing service, a restaurant skill component may enable the system component(s) 120 to order a pizza with respect to the restaurant's online ordering system, etc. A skill component 890 may operate in conjunction between the system component(s) 120 and other devices, such as the device 110, in order to complete certain functions. Inputs to a skill component 890 may come from speech processing interactions or through other interactions or input sources. A skill component 890 may include hardware, software, firmware, or the like that may be dedicated to a particular skill component 890 or shared among different skill components 890.

A skill support skill support system component(s) 825 may communicate with a skill component(s) 890 within the system component(s) 120 and/or directly with the orchestrator component 830 or with other components. A skill support skill support system component(s) 825 may be configured to perform one or more actions. An ability to perform such action(s) may sometimes be referred to as a "skill." That is, a skill may enable a skill support skill support system component(s) 825 to execute specific functionality in order to provide data or perform some other action requested by a user. For example, a weather service skill may enable a skill support skill support system component(s) 825 to provide weather information to the system component(s) 120, a car service skill may enable a skill support skill support system component(s) 825 to book a trip with respect to a taxi or ride sharing service, an order pizza skill may enable a skill support skill support system component(s) 825 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 120 may be configured with a skill component 890 dedicated to interacting with the skill support skill support system component(s) 825. Unless expressly stated otherwise, reference to a skill, skill device, or skill component may include a skill component 890 operated by the system component(s) 120 and/or skill operated by the skill support skill support system component(s) 825. Moreover, the functionality described herein as a skill or skill may be referred to using many different terms, such as an action, bot, app, or the like. The skill component 890 and or skill support skill support system component(s) 825 may return output data to the orchestrator component 830.

The system component 120 includes a language output component 893. The language output component 893 includes a natural language generation (NLG) component 879 and a text-to-speech (TTS) component 880. The NLG component 879 can generate text for purposes of TTS output to a user. For example, the NLG component 879 may generate text corresponding to instructions corresponding to a particular action for the user to perform. The NLG component 879 may generate appropriate text for various outputs as described herein. The NLG component 879 may include one or more trained models configured to output text appropriate for a particular input. The text output by the NLG component 879 may become input for the TTS component 880 (e.g., output text data 1415 discussed below). Alternatively or in addition, the TTS component 880 may receive text data from a skill component 890 or other system component for output.

The NLG component 879 may include a trained model. The NLG component 879 generates text data 1415 from dialog data, for example as received from a dialog manager such that the output text data 1415 has a natural feel and, in some embodiments, includes words and/or phrases specifically formatted for a requesting individual. The NLG may use templates to formulate responses. And/or the NLG system may include models trained from the various templates for forming the output text data 1415. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the text-to-speech component 880.

The TTS component 880 may generate audio data (e.g., synthesized speech) from text data using one or more different methods. Text data input to the TTS component 880 may come from a skill component 890, the orchestrator component 830, or another component of the system. In one method of synthesis called unit selection, the TTS component 880 matches text data against a database of recorded speech. The TTS component 880 selects matching units of recorded speech and concatenates the units together to form audio data. In another method of synthesis called parametric synthesis, the TTS component 880 varies parameters such as frequency, volume, and noise to create audio data including an artificial speech waveform. Parametric synthesis uses a computerized voice generator, sometimes called a vocoder.

The device 110 may include still image and/or video capture components such as a camera or cameras to capture one or more images. The device 110 may include circuitry for digitizing the images and/or video for transmission to the system component(s) 120 as image data. The device 110 may further include circuitry for voice command-based control of the camera, allowing a user 5 to request capture of image or video data. The device 110 may process the commands locally or send audio data 811 representing the commands to the system component(s) 120 for processing, after which the system component(s) 120 may return output data that can cause the device 110 to engage its camera.

Upon receipt by the system component(s) 120, the image data 15 may be sent to an orchestrator component 830. The orchestrator component 830 may send the image data 15 to, for example, an image processing component such as the vision component 508. The image processing component can perform computer vision functions such as object recognition, modeling, reconstruction, etc. For example, the image processing component may detect a person, face, etc. (which may then be identified using user-recognition component 895).

In some implementations, the image processing component can detect the presence of text in an image. In such implementations, the image processing component can recognize the presence of text, convert the image data to text data, and send the resulting text data via the orchestrator component 830 to the language processing components 892 for processing by the NLU component 860.

The system component(s) 120 may include a user-recognition component 895 that recognizes one or more users using a variety of data, as described in greater detail below with regard to FIGS. 5-6. The user-recognition component 895 may take as input the audio data 811 and/or text data output by the ASR component 850. The user-recognition component 895 may perform user recognition by comparing audio characteristics in the audio data 811 to stored audio characteristics of users. The user-recognition component 895 may also perform user recognition by comparing biometric data (e.g., fingerprint data, iris data, etc.), received by the system in correlation with the present user input, to stored biometric data of users assuming user permission and previous authorization. The user-recognition component 895 may further perform user recognition by comparing image data (e.g., including a representation of at least a feature of a user), received by the system in correlation with the present user input, with stored image data including representations of features of different users. The user-recognition component 895 may perform additional user recognition processes, including those known in the art.

The user-recognition component 895 determines scores indicating whether user input originated from a particular user. For example, a first score may indicate a likelihood that the user input originated from a first user, a second score may indicate a likelihood that the user input originated from a second user, etc. The user-recognition component 895 also determines an overall confidence regarding the accuracy of user recognition operations.

Output of the user-recognition component 895 may include a single user identifier corresponding to the most likely user that originated the user input. Alternatively, output of the user-recognition component 895 may include an N-best list of user identifiers with respective scores indicating likelihoods of respective users originating the user input. The output of the user-recognition component 895 may be used to inform NLU processing as well as processing performed by other components of the system.

The system component(s) 120/device 110 may include a presence detection component 894 that determines the presence and/or location of one or more users using a variety of data, as described in greater detail below with regard to FIG. 7.

The system 100 (either on device 110, system component 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 870 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the system component 120 with permission to allow the skill to execute with respect to the user's natural language user inputs. If a user does not enable a skill, the system component 120 may not invoke the skill to execute with respect to the user's natural language user inputs.

The profile storage 870 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 870 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Figure 9:
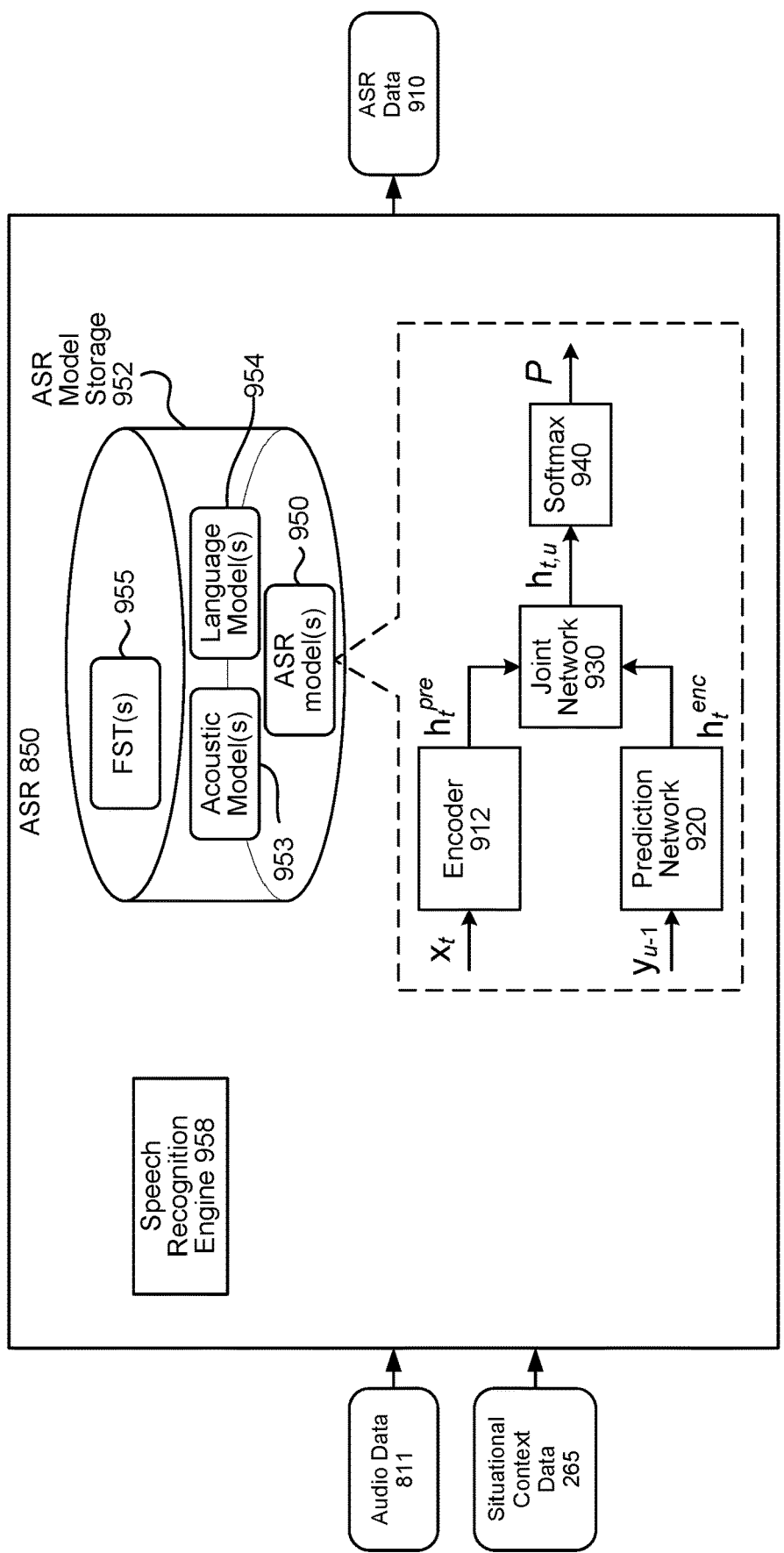
FIG. 9 is a conceptual diagram of an ASR component, according to embodiments of the present disclosure.

FIG. 9 is a conceptual diagram of an ASR component, according to embodiments of the present disclosure. The ASR component 850 may process the audio data 811 using one or more ASR models 950, finite state transducers (FSTs) 955, acoustic models 953, and/or language models 954 to generate ASR output data 910. The ASR output data 910 can include one or more hypotheses (e.g., possible transcriptions of speech represented in the input audio data 811). One or more of the hypotheses represented in the ASR output data 910 may then be sent to further components (such as the NLU component 860) for further processing as discussed herein. The ASR output data 910 may include representations of text of an utterance, such as words, subword units, etc., in the form of text, tokens, or the like. The ASR output data 910 may be received as a source signal 130 by the SCIC 150 as well as an input to one or more of the user-recognition components 895, the presence detection component 894, and/or the NLU component 860.

The ASR component 850 may include one or more ASR models 950. An ASR model 950 may be, for example, a recurrent neural network such as an RNN-T. An example RNN-T architecture is illustrated in FIG. 9. The ASR model 950 may predict a probability (y|x) of labels y=($y_1, \ldots, y_u$) given acoustic features x=($x_1, \ldots, x_t$). During inference, the ASR model 950 can generate an N-best list using, for example, a beam search decoding algorithm. The ASR model 950 may include an encoder 912, a prediction network 920, a joint network 930, and a softmax 940. The encoder 912 may be similar or analogous to an acoustic model (e.g., similar to the acoustic model 953 described below), and may process a sequence of acoustic input features to generate encoded hidden representations. The prediction network 920 may be similar or analogous to a language model (e.g., similar to the language model 954 described below), and may process the previous output label predictions, and map them to corresponding hidden representations. The joint network 930 may be, for example, a feed forward neural network (NN) that may process hidden representations from both the encoder 912 and prediction network 920, and predict output label probabilities. The softmax 940 may be a function implemented (e.g., as a layer of the joint network 930) to normalize the predicted output probabilities.

In some implementations, the ASR component 850 may interpret a spoken natural language input based on the similarity between the spoken natural language input and pre-established language models 954 stored in an ASR model storage 952. For example, the ASR component 850 may compare the audio data with models for sounds (e.g., subword units or phonemes) and sequences of sounds to identify words that match the sequence of sounds spoken in the natural language input. Alternatively, the ASR component 850 may use a finite state transducer (FST) 955 to implement the language model functions.

When the ASR component 850 generates more than one ASR hypothesis for a single spoken natural language input, each ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on a number of factors including, for example, the similarity of the sound in the spoken natural language input to models for language sounds (e.g., an acoustic model 953 stored in the ASR model storage 952), and the likelihood that a particular word, which matches the sounds, would be included in the sentence at the specific location (e.g., using a language or grammar model 954). Based on the considered factors and the assigned confidence score, the ASR component 850 may output an ASR hypothesis that most likely matches the spoken natural language input, or may output multiple ASR hypotheses in the form of a lattice or an N-best list, with each ASR hypothesis corresponding to a respective score.

The ASR component 850 may include a speech recognition engine 958. The ASR component 850 receives audio data 811 (for example, received from a local device 110 having processed audio detected by a microphone by an acoustic front end (AFE) or other component). The speech recognition engine 958 compares the audio data 811 with acoustic models 953, language models 954, FST(s) 955, and/or other data models and information for recognizing the speech conveyed in the audio data. The audio data 811 may be audio data that has been digitized (for example by an AFE) into frames representing time intervals for which the AFE determines a number of values, called features, representing the qualities of the audio data, along with a set of those values, called a feature vector, representing the features/qualities of the audio data within the frame. In at least some embodiments, audio frames may be 10 ms each. Many different features may be determined, as known in the art, and each feature may represent some quality of the audio that may be useful for ASR processing. A number of approaches may be used by an AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. In some cases, feature vectors of the audio data may arrive at the supporting system component(s) 120 encoded, in which case they may be decoded by the speech recognition engine 958 and/or prior to processing by the speech recognition engine 958.

The speech recognition engine 958 may process the audio data 811 with reference to information stored in the ASR model storage 952. Feature vectors of the audio data 811 may arrive at the system component 120 encoded, in which case they may be decoded prior to processing by the speech recognition engine 958.

The speech recognition engine 958 attempts to match received feature vectors to language acoustic units (e.g., phonemes) and words as known in the stored acoustic models 953, language models 954, and FST(s) 955. For example, audio data 811 may be processed by one or more acoustic model(s) 953 to determine acoustic unit data. The acoustic unit data may include indicators of acoustic units detected in the audio data 811 by the ASR component 850. For example, acoustic units can consist of one or more of phonemes, diaphonemes, tonemes, phones, diphones, triphones, or the like. The acoustic unit data can be represented using one or a series of symbols from a phonetic alphabet such as the X-SAMPA, the International Phonetic Alphabet, or Initial Teaching Alphabet (ITA) phonetic alphabets. In some implementations a phoneme representation of the audio data can be analyzed using an n-gram based tokenizer. An entity, or a slot representing one or more entities, can be represented by a series of n-grams.

The acoustic unit data may be processed using the language model 954 (and/or using FST 955) to determine the ASR output data 910. The speech recognition engine 958 computes scores for the feature vectors based on acoustic information and language information. The acoustic information (such as identifiers for acoustic units and/or corresponding scores) is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR component 850 will output ASR hypotheses that make sense grammatically. The specific models used may be general models or may be models corresponding to a particular domain, such as music, banking, etc.

The speech recognition engine 958 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using FSTs, may also be used.

The speech recognition engine 958 may use the acoustic model(s) 953 to attempt to match received audio feature vectors to words or subword acoustic units. An acoustic unit may be a senone, phoneme, phoneme in context, syllable, part of a syllable, syllable in context, or any other such portion of a word. The speech recognition engine 958 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR component 850 outputs ASR hypotheses that make sense grammatically.

The speech recognition engine 958 may use a number of techniques to match feature vectors to phonemes or other acoustic units, such as diphones, triphones, etc. One common technique is using Hidden Markov Models (HMMs). HMMs are used to determine probabilities that feature vectors may match phonemes. Using HMMs, a number of states are presented, in which the states together represent a potential phoneme (or other acoustic unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 958, the state may change or stay the same, based on the processing of the new feature vectors. A Viterbi algorithm may be used to find the most likely sequence of states based on the processed feature vectors.

The probable phonemes and related states/state transitions, for example HMM states, may be formed into paths traversing a lattice of potential phonemes. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score, or probabilities may be converted to the log domain and added to assist processing.

The speech recognition engine 958 may also compute scores of branches of the paths based on language models or grammars. Language modeling involves determining scores for what words are likely to be used together to form coherent words and sentences. Application of a language model may improve the likelihood that the ASR component 850 correctly interprets the speech contained in the audio data. For example, for an input audio sounding like "hello," acoustic model processing that returns the potential phoneme paths of "H E L O", "HALO", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance.

Figure 10:
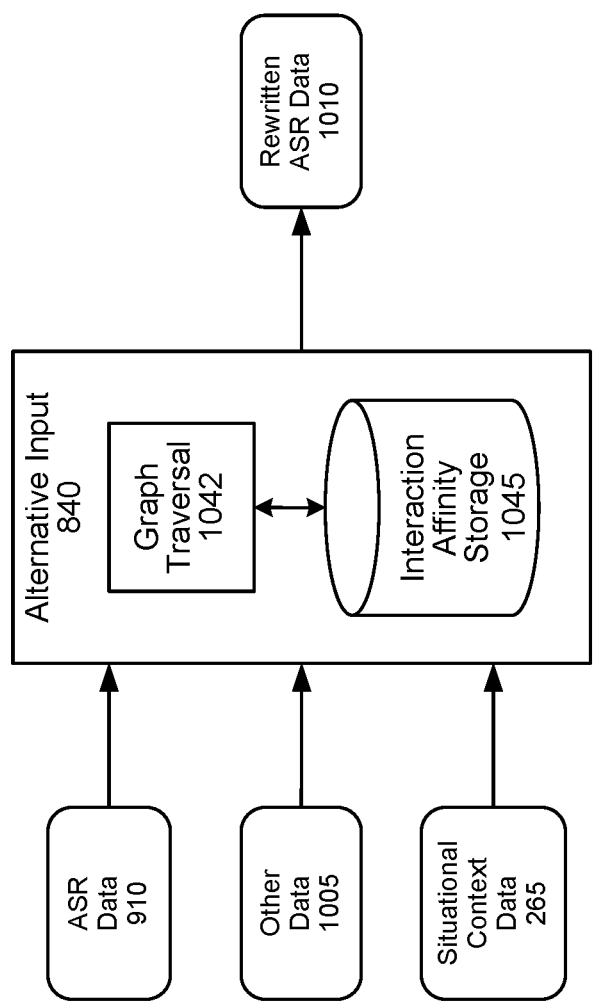
FIG. 10 is a conceptual diagram illustrating example components of an alternative input component, according to embodiments of the present disclosure.

FIG. 10 is a conceptual diagram illustrating example components of an alternative input component 840, according to embodiments of the present disclosure. The alternative input component 840 may be one of the system components 140 configured to receive and process the situational context data 265. The alternative input component 840 may be invoked by the system 100 to perform a query rewrite of the ASR output data 910 to generate rewritten ASR data 1010. For example, an NLU component 860 may invoke the alternative input component 840 via the orchestrator component 830. The NLU component 860 may send the ASR data to the alternative input component 840. The NLU component 860 may also send the NLU data in some embodiments to the alternative input component 840. The alternative input component 840 may generate rewritten ASR data 1010 based on the ASR output data 910 and/or other data 1005 (which may include a variety of data including situational context data 265), which may include the situational context data 265 and/or other data relevant to disambiguating or otherwise interpreting the ASR output data 910. The alternative input component 840 may return the rewritten ASR data 1010 to the NLU component 860.

As shown in FIG. 10, in some embodiments, an alternative input component 840 may be configured to determine an alternative input representation for a user input spoken by the user 5. In some cases, certain spoken inputs may be misrecognized by the ASR component 850, resulting in performance of an action that is undesired by the user or not responsive to the user input. The alternative input component 840 may determine an alternative input representation (e.g., a rephrased input, a rewrite of the input, etc.) for the spoken input that results in a desired action being performed. As described below, the alternative input component 840 may use stored data, such as, interaction affinity data to determine the alternative input representation.

In an example operation, the NLU component 860 may send the ASR output data 910 and/or the NLU data output data 1285/1225 corresponding to the user input to the alternative input component 840. Before determining an alternative input representation for the spoken input, the alternative input component 840, in some embodiments, may determine whether or not the system component 120 will output an undesired response to the spoken input. The alternative input component 840 may determine, using the ASR data and/or the NLU data, that the system component 120 is going to output an undesired response to the spoken input. The alternative input component 840 may make this determination based on one or more confidence scores included in the ASR data or the NLU data not satisfying a condition (e.g., being below a threshold value) indicating that the ASR component 850 or the NLU component 860 is not confident in its processing. The alternative input component 840 may determine that the system component 120 will output an undesired response based on past interaction data indicating the user 5 (or other users) have received undesired responses in the past when the user input corresponds to the ASR data and the NLU data for the instant spoken input. Other techniques may be used by the alternative input component 840 to determine that the system component 120 will output an undesired response to the spoken input.

In some embodiments, the alternative input component 840 may determine an alternative input representation for the spoken input without determining whether or not the system component 120 will output an undesired response.

The alternative input component 840 may determine one or more alternative input representations using the ASR data and/or the NLU data corresponding to the spoken input. The alternative input component 840 may use interaction affinity data, stored at an interaction affinity storage 1045, for determining the alternative input representation(s). The interaction affinity data may indicate an explicit and latent affinity between various data included in interactions. For example, the interaction affinity data may indicate a latent affinity between a first entity (e.g., a first song name) and a second entity (e.g., a second song name) based on multiple users and/or the user 5 during multiple interactions providing user inputs including the first entity and the second entity (e.g., the user 5 requests output of the first song name and the second song name during the same interaction or same dialog session). In some embodiments, the interaction affinity data may be represented as a graph (e.g., a knowledge graph corresponding to a knowledge source 160 and/or GNN) in which such latent affinity, between entities for example, may be indicated by connecting, with an edge, a first entity node corresponding to the first entity to a second entity node corresponding to the second entity. As another example, the interaction affinity data may indicate a latent affinity between a first intent (e.g., <PlaySongIntent>) and a second intent (e.g., <AddToPlayQueueIntent>) based on multiple users and/or the user 5 during multiple interactions providing user inputs including the first intent and the second intent (e.g., the user 5 requests playback of a song, and asks the song to be added to a play queue during the same interaction or same dialog session). The interaction affinity data may indicate a latent affinity between different types of data as well, for example, between an intent and an entity (e.g., the user 5 requests output of a song (entity), and asks the song to be added to a play queue (<AddToPlayQueueIntent>) during the same interaction or same dialog session). The interaction affinity data may indicate an association combined with a preference between NLU hypotheses, entities, intents, device types, grammar, domains, and syntax of a user input.

Based on such interaction affinity data, the alternative input component 840 may determine an alternative input representation for the spoken input based on there being a latent affinity between the data corresponding to the spoken input and the data included in the interaction affinity data. That is, the alternative input component 840, using the interaction affinity data, may determine what the user 5 likely said. For example, the spoken input may include a first entity (as determined by the ASR component 850 and the NLU component 860), based on the interaction affinity data indicating a latent affinity between the first entity and a second entity, the alternative input component 840 may determine that the spoken input likely corresponds to the second entity, and may determine the alternative input representation to include the second entity. As another example, the spoken input may correspond to a first intent (as determined by the ASR component 850 and the NLU component 860), based on the interaction affinity data indicating a latent affinity between the first intent and a second intent, the alternative input component 840 may determine that the spoken input likely corresponds to the second intent, and may determine the alternative input representation to correspond to the second intent. As another example, the spoken input may correspond to a first entity and a first intent (as determined by the ASR component 850 and the NLU component 860), based on the interaction affinity data indicating a latent affinity between the first entity and a second intent, the alternative input component 840 may determine that the spoken input likely corresponds to the second intent, and may determine the alternative input representation to correspond to the second intent. As such, the alternative input component 840, using the interaction affinity data, can determine an alternative input representation based on affinities between different types of data (e.g., a latent affinity between an intent and an entity, a latent affinity between an intent and a device type, a latent affinity between an entity and a device type, a latent affinity between an intent and a syntax, etc.).

As a non-limiting example, the user 5 or other users may often use a particular syntax for a user input when the user input corresponds to a particular intent. The interaction affinity data may include such a latent affinity (e.g., which, in some implementations, may be retrieved from the personalized knowledge source 160*a*). For a spoken input that has the particular syntax, the alternative input component 840 may determine an alternative input representation as corresponding to the particular intent, based on the latent affinity included in the interaction affinity data.

The interaction affinity data, in some embodiments, may be represented as a graph (e.g., a knowledge graph corresponding to a knowledge source 160 and/or GNN). The alternative input component 840 may include a graph traversal component 1042 that may traverse the graph, using the ASR data and the NLU data corresponding to the spoken input, to determine one or more alternative input representations for the spoken input. The graph traversal component 1042 may take as input text data or token data representing the spoken input. The graph traversal component 1042 may determine to modify a portion of the spoken input. For example, based on processing the interaction affinity data, the graph traversal component 1042 may determine to modify the entity included in the NLU data corresponding to the spoken input (e.g., [first song name]) to another entity (e.g., [second song name]). As a further example, the intent included in the NLU data corresponding to the spoken input (e.g., <TurnOnIntent>) may be modified to another intent (e.g., <PlayMusicIntent>).

The alternative input component 840 may send the rewritten ASR data 1010 (e.g., an alternative input representation(s) for the spoken input) to the NLU component 860. The rewritten ASR data 1010 may be text data or token data corresponding to an entire input, such that the alternative input representation(s) may be used by the NLU component 860, like an ASR hypothesis, to determine an NLU hypothesis corresponding to the alternative input representation. In some embodiments, the alternative input component 840 may also send, to the NLU component 860, intent data, entity data or a NLU hypothesis corresponding to the alternative input representation(s).

Figure 11:
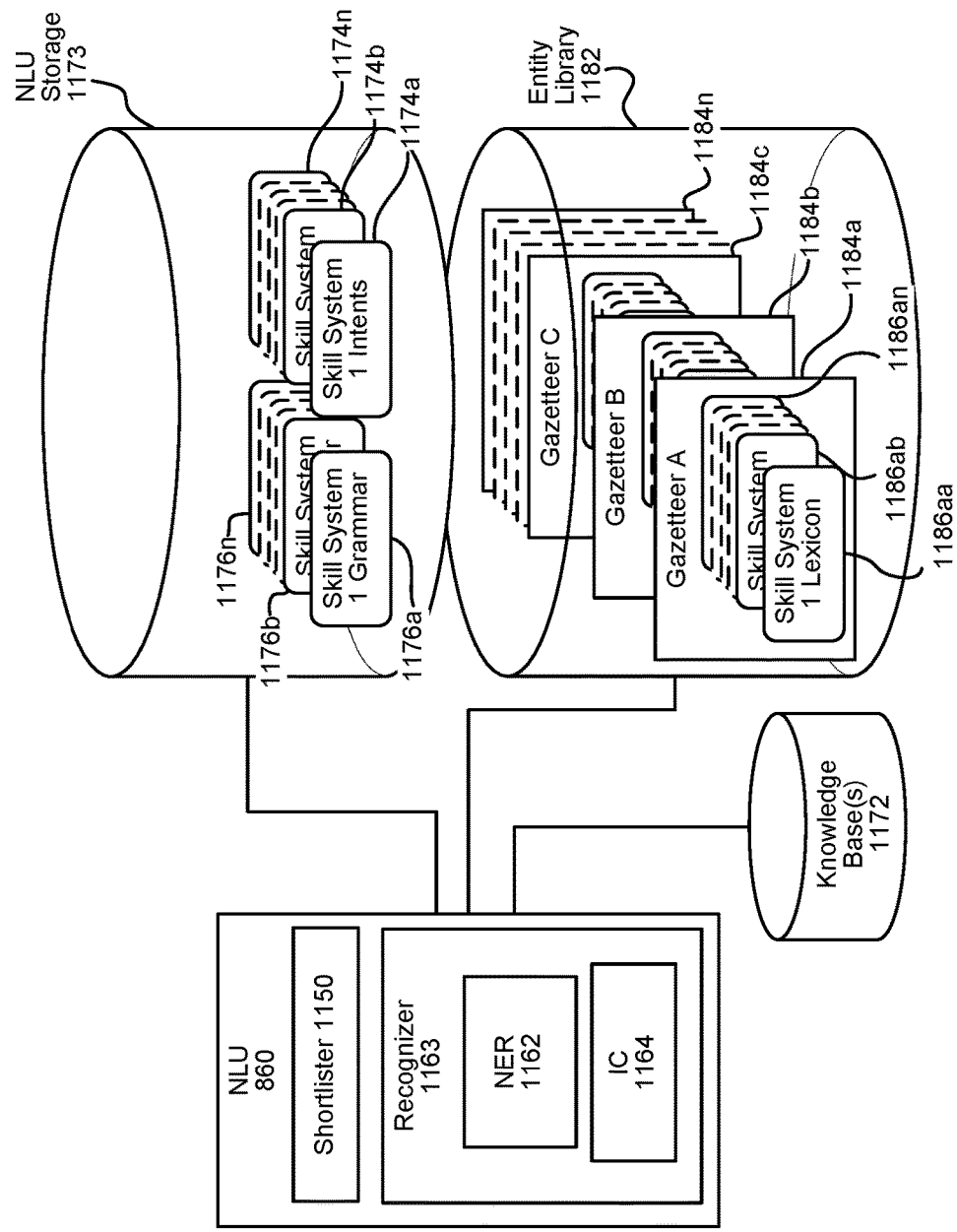
FIG. 11 is a conceptual diagram of how natural language processing is performed, according to embodiments of the present disclosure.
Figure 12:
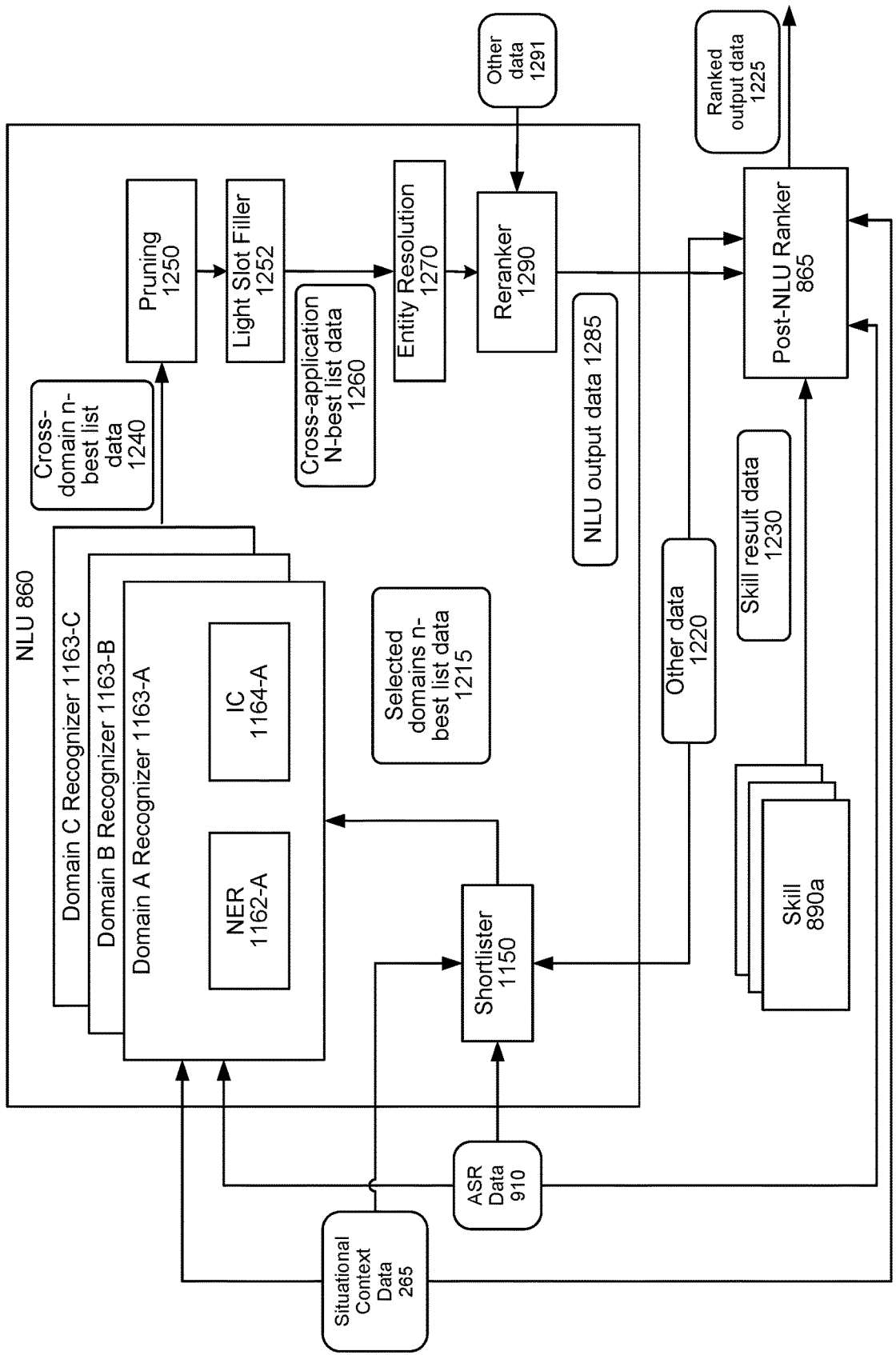
FIG. 12 is a conceptual diagram of how natural language processing is performed, according to embodiments of the present disclosure.

FIGS. 11 and 12 illustrates how the NLU component 860 may perform NLU processing. FIG. 11 is a conceptual diagram of how natural language processing is performed, according to embodiments of the present disclosure. And FIG. 12 is a conceptual diagram of how natural language processing is performed, according to embodiments of the present disclosure. The NLU component 860 may receive and process ASR output data 910 from the ASR component 850 along with other data 1220 and/or 1291 to generate NLU output data 1285 and/or ranked output data 1225. The NLU output data 1285 and/or ranked output data 1225 may include one or more NLU hypotheses representing an actionable semantic interpretation of a user's natural language input. For example, the NLU component 860 may perform intent classification and/or domain selection to determine what type of action the user has requested. In some implementations, the NLU component 860 may receive other data 1220 in the form of situational context data 265 from the SCIC 150 for use in intent classification and/or domain selection. For example, situational context data 265 indicating that the user is driving may be used by the shortlister component 1150 to select a music domain over a video domain for the user's request. Similarly, the other data 1220 and/or 1291 may be used by a reranker component 1290 and/or the post-NLU ranker 865 to arbitrate between different NLU hypotheses (e.g., indicating different skill components 890*a* for performing the requested action).

FIG. 11 illustrates how NLU processing is performed on text data. The NLU component 860 may process text data including several ASR hypotheses of a single user input. For example, if the ASR component 850 outputs text data including an n-best list of ASR hypotheses, the NLU component 860 may process the text data with respect to all (or a portion of) the ASR hypotheses represented therein.

The NLU component 860 may annotate text data by parsing and/or tagging the text data. For example, for the text data "tell me the weather for Seattle," the NLU component 860 may tag "tell me the weather for Seattle" as an <OutputWeather> intent as well as separately tag "Seattle" as a location for the weather information.

The NLU component 860 may include a shortlister component 1150. The shortlister component 1150 selects skills that may execute with respect to ASR output data 910 input to the NLU component 860 (e.g., applications that may execute with respect to the user input). The ASR output data 910 (which may also be referred to as ASR output data 910) may include representations of text of an utterance, such as words, subword units, or the like. The shortlister component 1150 thus limits downstream, more resource intensive NLU processes to being performed with respect to skills that may execute with respect to the user input.

Without a shortlister component 1150, the NLU component 860 may process ASR output data 910 input thereto with respect to every skill of the system, either in parallel, in series, or using some combination thereof. By implementing a shortlister component 1150, the NLU component 860 may process ASR output data 910 with respect to only the skills that may execute with respect to the user input. This reduces total compute power and latency attributed to NLU processing. The shortlister component 1150 may also input situational context data 265 in order to assist with the narrowing down of potential skills to operate with respect to a user input. In certain configurations, for example where situational context data 265 may represent natural language text describing the situational context, the shortlister component 1150 may be configured to process natural language data to assist with skill selection operations.

The shortlister component 1150 may include one or more trained models. The model(s) may be trained to recognize various forms of user inputs that may be received by the system component(s) 120. For example, during a training period skill support system component(s) 825 associated with a skill may provide the system component(s) 120 with training text data representing sample user inputs that may be provided by a user to invoke the skill. For example, for a ride sharing skill, a skill support system component(s) 825 associated with the ride sharing skill may provide the system component(s) 120 with training text data including text corresponding to "get me a cab to [location]," "get me a ride to [location]," "book me a cab to [location]," "book me a ride to [location]," etc. The one or more trained models that will be used by the shortlister component 1150 may be trained, using the training text data representing sample user inputs, to determine other potentially related user input structures that users may try to use to invoke the particular skill. During training, the system component(s) 120 may solicit the skill support system component(s) 825 associated with the skill regarding whether the determined other user input structures are permissible, from the perspective of the skill support system component(s) 825, to be used to invoke the skill. The alternate user input structures may be derived by one or more trained models during model training and/or may be based on user input structures provided by different skills. The skill support system component(s) 825 associated with a particular skill may also provide the system component(s) 120 with training text data indicating grammar and annotations. The system component(s) 120 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 1150 may be trained with respect to a different skill. Alternatively, the shortlister component 1150 may use one trained model per domain, such as one trained model for skills associated with a weather domain, one trained model for skills associated with a ride sharing domain, etc.

The system component(s) 120 may use the sample user inputs provided by a skill support system component(s) 825, and related sample user inputs potentially determined during training, as binary examples to train a model associated with a skill associated with the skill support system component(s) 825. The model associated with the particular skill may then be operated at runtime by the shortlister component 1150. For example, some sample user inputs may be positive examples (e.g., user inputs that may be used to invoke the skill). Other sample user inputs may be negative examples (e.g., user inputs that may not be used to invoke the skill).

As described above, the shortlister component 1150 may include a different trained model for each skill of the system, a different trained model for each domain, or some other combination of trained model(s). For example, the shortlister component 1150 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 1150 to output indications of only a portion of the skills that the ASR output data 910 may relate to. For example, a user input may correspond to "tell me about Tom Collins." If the model is clustered based on domain, the shortlister component 1150 may determine the user input corresponds to a recipe skill (e.g., a drink recipe) even though the user input may also correspond to an information skill (e.g., including information about a person named Tom Collins).

The NLU component 860 may include one or more recognizers 1163. In at least some embodiments, a recognizer 1163 may be associated with a skill support system component 825 (e.g., the recognizer may be configured to interpret text data to correspond to the skill support system component 825). In at least some other examples, a recognizer 1163 may be associated with a domain such as smart home, video, music, weather, custom, etc. (e.g., the recognizer may be configured to interpret text data to correspond to the domain).

If the shortlister component 1150 determines ASR output data 910 is potentially associated with multiple domains, the recognizers 1163 associated with the domains may process the ASR output data 910, while recognizers 1163 not indicated in the shortlister component 1150's output may not process the ASR output data 910. The "shortlisted" recognizers 1163 may process the ASR output data 910 in parallel, in series, partially in parallel, etc. For example, if ASR output data 910 potentially relates to both a communications domain and a music domain, a recognizer associated with the communications domain may process the ASR output data 910 in parallel, or partially in parallel, with a recognizer associated with the music domain processing the ASR output data 910.

Each recognizer 1163 may include a named entity recognition (NER) component 1162. The NER component 1162 attempts to identify grammars and lexical information that may be used to construe meaning with respect to text data input therein. The NER component 1162 identifies portions of text data that correspond to a named entity associated with a domain, associated with the recognizer 1163 implementing the NER component 1162. The NER component 1162 (or other component of the NLU component 860) may also determine whether a word refers to an entity whose identity is not explicitly mentioned in the text data, for example "him," "her," "it" or other anaphora, exophora, or the like.

Each recognizer 1163, and more specifically each NER component 1162, may be associated with a particular grammar database 1176, a particular set of intents/actions 1174, and a particular personalized lexicon 1186. The grammar databases 1176, and intents/actions 1174 may be stored in an NLU storage 1173. Each gazetteer 1184 may include domain/skill-indexed lexical information associated with a particular user and/or device 110. For example, a Gazetteer A (1184*a*) includes skill-indexed lexical information 1186*aa* to 1186*an*. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 1162 applies grammar information 1176 and lexical information 1186 associated with a domain (associated with the recognizer 1163 implementing the NER component 1162) to determine a mention of one or more entities in text data. In this manner, the NER component 1162 identifies "slots" (each corresponding to one or more particular words in text data) that may be useful for later processing. The NER component 1162 may also label each slot with a type (e.g., noun, place, city, artist name, song name, etc.).

Each grammar database 1176 includes the names of entities (i.e., nouns) commonly found in speech about the particular domain to which the grammar database 1176 relates, whereas the lexical information 1186 is personalized to the user and/or the device 110 from which the user input originated. For example, a grammar database 1176 associated with a shopping domain may include a database of words commonly used when people discuss shopping.

A downstream process called entity resolution (discussed in detail elsewhere herein) links a slot of text data to a specific entity known to the system. To perform entity resolution, the NLU component 860 may utilize gazetteer information (1184*a*-1184*n*) stored in an entity library storage 1182. The gazetteer information 1184 may be used to match text data (representing a portion of the user input) with text data representing known entities, such as song titles, contact names, etc. Gazetteers 1184 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 1163 may also include an intent classification (IC) component 1164. An IC component 1164 parses text data to determine an intent(s) (associated with the domain associated with the recognizer 1163 implementing the IC component 1164) that potentially represents the user input. An intent represents to an action a user desires be performed. An IC component 1164 may communicate with a database 1174 of words linked to intents. For example, a music intent database may link words and phrases such as "quiet," "volume off," and "mute" to a <Mute> intent. An IC component 1164 identifies potential intents by comparing words and phrases in text data (representing at least a portion of the user input) to the words and phrases in an intents database 1174 (associated with the domain that is associated with the recognizer 1163 implementing the IC component 1164).

The intents identifiable by a specific IC component 1164 are linked to domain-specific (i.e., the domain associated with the recognizer 1163 implementing the IC component 1164) grammar frameworks 1176 with "slots" to be filled. Each slot of a grammar framework 1176 corresponds to a portion of text data that the system believes corresponds to an entity. For example, a grammar framework 1176 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 1176 may not be structured as sentences, but rather based on associating slots with grammatical tags.

For example, an NER component 1162 may parse text data to identify words as subject, object, verb, preposition, etc. based on grammar rules and/or models prior to recognizing named entities in the text data. An IC component 1164 (implemented by the same recognizer 1163 as the NER component 1162) may use the identified verb to identify an intent. The NER component 1162 may then determine a grammar model 1176 associated with the identified intent. For example, a grammar model 1176 for an intent corresponding to <PlayMusic> may specify a list of slots applicable to play the identified "object" and any object modifier (e.g., a prepositional phrase), such as {Artist Name}, {Album Name}, {Song name}, etc. The NER component 1162 may then search corresponding fields in a lexicon 1186 (associated with the domain associated with the recognizer 1163 implementing the NER component 1162), attempting to match words and phrases in text data the NER component 1162 previously tagged as a grammatical object or object modifier with those identified in the lexicon 1186.

An NER component 1162 may perform semantic tagging, which is the labeling of a word or combination of words according to their type/semantic meaning. An NER component 1162 may parse text data using heuristic grammar rules, or a model may be constructed using techniques such as Hidden Markov Models, maximum entropy models, log linear models, conditional random fields (CRF), and the like. For example, an NER component 1162 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 1162 identifies "Play" as a verb based on a word database associated with the music domain, which an IC component 1164 (also implemented by the music domain recognizer) may determine corresponds to a <PlayMusic> intent. At this stage, no determination has been made as to the meaning of "mother's little helper" or "the rolling stones," but based on grammar rules and models, the NER component 1162 has determined the text of these phrases relates to the grammatical object (i.e., entity) of the user input represented in the text data.

An NER component 1162 may tag text data to attribute meaning thereto. For example, an NER component 1162 may tag "play mother's little helper by the rolling stones" as: {domain} Music, {intent}<PlayMusic>, {artist name} rolling stones, {media type} SONG, and {song title} mother's little helper. For further example, the NER component 1162 may tag "play songs by the rolling stones" as: {domain} Music, {intent}<PlayMusic>, {artist name} rolling stones, and {media type} SONG.

A recognizer 1163, including an NER 1162 and/or IC 1164 may be configured to process situational context data 265 in order to consider contextual information in processing ASR data, performing entity recognition, intent classification, etc. In certain configurations, for example where situational context data 265 may represent natural language text describing the situational context, a recognizer 1163, including an NER 1162 and/or IC 1164 may be configured to process natural language data to assist with performing respective operations.

The shortlister component 1150 may receive ASR output data 910 output from the ASR component 850 or output from the device 110b (as illustrated in FIG. 12). The ASR component 850 may embed the ASR output data 910 into a form processable by a trained model(s) using sentence embedding techniques as known in the art. Sentence embedding results in the ASR output data 910 including text in a structure that enables the trained models of the shortlister component 1150 to operate on the ASR output data 910. For example, an embedding of the ASR output data 910 may be a vector representation of the ASR output data 910.

The shortlister component 1150 may make binary determinations (e.g., yes or no) regarding which domains relate to the ASR output data 910. The shortlister component 1150 may make such determinations using the one or more trained models described herein above. If the shortlister component 1150 implements a single trained model for each domain, the shortlister component 1150 may simply run the models that are associated with enabled domains as indicated in a user profile associated with the device 110 and/or user that originated the user input.

The shortlister component 1150 may generate n-best list data 1215 representing domains that may execute with respect to the user input represented in the ASR output data 910. The size of the n-best list represented in the n-best list data 1215 is configurable. In an example, the n-best list data 1215 may indicate every domain of the system as well as contain an indication, for each domain, regarding whether the domain is likely capable to execute the user input represented in the ASR output data 910. In another example, instead of indicating every domain of the system, the n-best list data 1215 may only indicate the domains that are likely to be able to execute the user input represented in the ASR output data 910. In yet another example, the shortlister component 1150 may implement thresholding such that the n-best list data 1215 may indicate no more than a maximum number of domains that may execute the user input represented in the ASR output data 910. In an example, the threshold number of domains that may be represented in the n-best list data 1215 is ten. In another example, the domains included in the n-best list data 1215 may be limited by a threshold a score, where only domains indicating a likelihood to handle the user input is above a certain score (as determined by processing the ASR output data 910 by the shortlister component 1150 relative to such domains) are included in the n-best list data 1215.

The ASR output data 910 may correspond to more than one ASR hypothesis. When this occurs, the shortlister component 1150 may output a different n-best list (represented in the n-best list data 1215) for each ASR hypothesis. Alternatively, the shortlister component 1150 may output a single n-best list representing the domains that are related to the multiple ASR hypotheses represented in the ASR output data 910.

As indicated above, the shortlister component 1150 may implement thresholding such that an n-best list output therefrom may include no more than a threshold number of entries. If the ASR output data 910 includes more than one ASR hypothesis, the n-best list output by the shortlister component 1150 may include no more than a threshold number of entries irrespective of the number of ASR hypotheses output by the ASR component 850. Alternatively or in addition, the n-best list output by the shortlister component 1150 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the ASR output data 910, the shortlister component 1150 may generate confidence scores representing likelihoods that domains relate to the ASR output data 910. If the shortlister component 1150 implements a different trained model for each domain, the shortlister component 1150 may generate a different confidence score for each individual domain trained model that is run. If the shortlister component 1150 runs the models of every domain when ASR output data 910 is received, the shortlister component 1150 may generate a different confidence score for each domain of the system. If the shortlister component 1150 runs the models of only the domains that are associated with skills indicated as enabled in a user profile associated with the device 110 and/or user that originated the user input, the shortlister component 1150 may only generate a different confidence score for each domain associated with at least one enabled skill. If the shortlister component 1150 implements a single trained model with domain specifically trained portions, the shortlister component 1150 may generate a different confidence score for each domain who's specifically trained portion is run. The shortlister component 1150 may perform matrix vector modification to obtain confidence scores for all domains of the system in a single instance of processing of the ASR output data 910.

N-best list data 1215 including confidence scores that may be output by the shortlister component 1150 may be represented as, for example:

Search domain, 0.67
Recipe domain, 0.62
Information domain, 0.57
Shopping domain, 0.42

As indicated, the confidence scores output by the shortlister component 1150 may be numeric values. The confidence scores output by the shortlister component 1150 may alternatively be binned values (e.g., high, medium, low).

The n-best list may only include entries for domains having a confidence score satisfying (e.g., equaling or exceeding) a minimum threshold confidence score. Alternatively, the shortlister component 1150 may include entries for all domains associated with user enabled skills, even if one or more of the domains are associated with confidence scores that do not satisfy the minimum threshold confidence score.

The shortlister component 1150 may consider other data 1220 when determining which domains may relate to the user input represented in the ASR output data 910 as well as respective confidence scores. The other data 1220 may include usage history data associated with the device 110 and/or user that originated the user input. For example, a confidence score of a domain may be increased if user inputs originated by the device 110 and/or user routinely invoke the domain. Conversely, a confidence score of a domain may be decreased if user inputs originated by the device 110 and/or user rarely invoke the domain. Thus, the other data 1220 may include an indicator of the user associated with the ASR output data 910, for example as determined by the user-recognition component 895.

The other data 1220 may be character embedded prior to being input to the shortlister component 1150. The other data 1220 may alternatively be embedded using other techniques known in the art prior to being input to the shortlister component 1150.

The other data 1220 may also include data indicating the domains associated with skills that are enabled with respect to the device 110 and/or user that originated the user input. The shortlister component 1150 may use such data to determine which domain-specific trained models to run. That is, the shortlister component 1150 may determine to only run the trained models associated with domains that are associated with user-enabled skills. The shortlister component 1150 may alternatively use such data to alter confidence scores of domains.

As an example, considering two domains, a first domain associated with at least one enabled skill and a second domain not associated with any user-enabled skills of the user that originated the user input, the shortlister component 1150 may run a first model specific to the first domain as well as a second model specific to the second domain. Alternatively, the shortlister component 1150 may run a model configured to determine a score for each of the first and second domains. The shortlister component 1150 may determine a same confidence score for each of the first and second domains in the first instance. The shortlister component 1150 may then alter those confidence scores based on which domains is associated with at least one skill enabled by the present user. For example, the shortlister component 1150 may increase the confidence score associated with the domain associated with at least one enabled skill while leaving the confidence score associated with the other domain the same. Alternatively, the shortlister component 1150 may leave the confidence score associated with the domain associated with at least one enabled skill the same while decreasing the confidence score associated with the other domain. Moreover, the shortlister component 1150 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage 870. When the shortlister component 1150 receives the ASR output data 910, the shortlister component 1150 may determine whether profile data associated with the user and/or device 110 that originated the command includes an indication of enabled skills.

The other data 1220 may also include data indicating the type of the device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 1150 may use such data to determine which domain-specific trained models to run. For example, if the device 110 corresponds to a displayless type device, the shortlister component 1150 may determine not to run trained models specific to domains that output video data. The shortlister component 1150 may alternatively use such data to alter confidence scores of domains.

As an example, considering two domains, one that outputs audio data and another that outputs video data, the shortlister component 1150 may run a first model specific to the domain that generates audio data as well as a second model specific to the domain that generates video data. Alternatively, the shortlister component 1150 may run a model configured to determine a score for each domain. The shortlister component 1150 may determine a same confidence score for each of the domains in the first instance. The shortlister component 1150 may then alter the original confidence scores based on the type of the device 110 that originated the user input corresponding to the ASR output data 910. For example, if the device 110 is a displayless device, the shortlister component 1150 may increase the confidence score associated with the domain that generates audio data while leaving the confidence score associated with the domain that generates video data the same. Alternatively, if the device 110 is a displayless device, the shortlister component 1150 may leave the confidence score associated with the domain that generates audio data the same while decreasing the confidence score associated with the domain that generates video data. Moreover, if the device 110 is a displayless device, the shortlister component 1150 may increase the confidence score associated with the domain that generates audio data as well as decrease the confidence score associated with the domain that generates video data.

The type of device information represented in the other data 1220 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones. Thus, the other data 1220 may represent the smart TV of other display device, and not the displayless device that captured the spoken user input.

The other data 1220 may also include data indicating the user input originating device's speed, location, or other mobility information. For example, the device may correspond to a vehicle including a display. If the vehicle is moving, the shortlister component 1150 may decrease the confidence score associated with a domain that generates video data as it may be undesirable to output video content to a user while the user is driving. The device may output data to the system component(s) 120 indicating when the device is moving.

The other data 1220 may also include situational context data 265 such as that described herein.

The other data 1220 may also include data indicating a currently invoked domain. For example, a user may speak a first (e.g., a previous) user input causing the system to invoke a music domain skill to output music to the user. As the system is outputting music to the user, the system may receive a second (e.g., the current) user input. The shortlister component 1150 may use such data to alter confidence scores of domains. For example, the shortlister component 1150 may run a first model specific to a first domain as well as a second model specific to a second domain. Alternatively, the shortlister component 1150 may run a model configured to determine a score for each domain. The shortlister component 1150 may also determine a same confidence score for each of the domains in the first instance. The shortlister component 1150 may then alter the original confidence scores based on the first domain being invoked to cause the system to output content while the current user input was received. Based on the first domain being invoked, the shortlister component 1150 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 1215 generated by the shortlister component 1150 as well as the different types of other data 1220 considered by the shortlister component 1150 are configurable. For example, the shortlister component 1150 may update confidence scores as more other data 1220 is considered. For further example, the n-best list data 1215 may exclude relevant domains if thresholding is implemented. Thus, for example, the shortlister component 1150 may include an indication of a domain in the n-best list data 1215 unless the shortlister component 1150 is one hundred percent confident that the domain may not execute the user input represented in the ASR output data 910 (e.g., the shortlister component 1150 determines a confidence score of zero for the domain).

The shortlister component 1150 may send the ASR output data 910 to recognizers 1163 associated with domains represented in the n-best list data 1215. Alternatively, the shortlister component 1150 may send the n-best list data 1215 or some other indicator of the selected subset of domains to another component (such as the orchestrator component 830) which may in turn send the ASR output data 910 to the recognizers 1163 corresponding to the domains included in the n-best list data 1215 or otherwise indicated in the indicator. If the shortlister component 1150 generates an n-best list representing domains without any associated confidence scores, the shortlister component 1150/orchestrator component 830 may send the ASR output data 910 to recognizers 1163 associated with domains that the shortlister component 1150 determines may execute the user input. If the shortlister component 1150 generates an n-best list representing domains with associated confidence scores, the shortlister component 1150/orchestrator component 830 may send the ASR output data 910 to recognizers 1163 associated with domains associated with confidence scores satisfying (e.g., meeting or exceeding) a threshold minimum confidence score.

A recognizer 1163 may output tagged text data generated by an NER component 1162 and an IC component 1164, as described herein above. The NLU component 860 may compile the output tagged text data of the recognizers 1163 into a single cross-domain n-best list 1240 and may send the cross-domain n-best list 1240 to a pruning component 1250. Each entry of tagged text (e.g., each NLU hypothesis) represented in the cross-domain n-best list data 1240 may be associated with a respective score indicating a likelihood that the NLU hypothesis corresponds to the domain associated with the recognizer 1163 from which the NLU hypothesis was output. For example, the cross-domain n-best list data 1240 may be represented as (with each line corresponding to a different NLU hypothesis):

[0.95] Intent: <PlayMusic>ArtistName: Beethoven SongName: Waldstein Sonata

[0.70] Intent: <Play Video>ArtistName: Beethoven VideoName: Waldstein Sonata

[0.01] Intent: <PlayMusic> ArtistName: Beethoven AlbumName: Waldstein Sonata

[0.01] Intent: <PlayMusic> SongName: Waldstein Sonata

The pruning component 1250 may sort the NLU hypotheses represented in the cross-domain n-best list data 1240 according to their respective scores. The pruning component 1250 may perform score thresholding with respect to the cross-domain NLU hypotheses. For example, the pruning component 1250 may select NLU hypotheses associated with scores satisfying (e.g., meeting and/or exceeding) a threshold score. The pruning component 1250 may also or alternatively perform number of NLU hypothesis thresholding. For example, the pruning component 1250 may select the top scoring NLU hypothesis(es). The pruning component 1250 may output a portion of the NLU hypotheses input thereto. The purpose of the pruning component 1250 is to create a reduced list of NLU hypotheses so that downstream, more resource intensive, processes may only operate on the NLU hypotheses that most likely represent the user's intent.

The NLU component 860 may include a light slot filler component 1252. The light slot filler component 1252 can take text from slots represented in the NLU hypotheses output by the pruning component 1250 and alter them to make the text more easily processed by downstream components. The light slot filler component 1252 may perform low latency operations that do not involve heavy operations such as reference to a knowledge base (e.g., 1172. The purpose of the light slot filler component 1252 is to replace words with other words or values that may be more easily understood by downstream components. For example, if a NLU hypothesis includes the word "tomorrow," the light slot filler component 1252 may replace the word "tomorrow" with an actual date for purposes of downstream processing. Similarly, the light slot filler component 1252 may replace the word "CD" with "album" or the words "compact disc." The replaced words are then included in the cross-domain n-best list data 1260.

The cross-domain n-best list data 1260 may be input to an entity resolution component 1270. The entity resolution component 1270 can apply rules or other instructions to standardize labels or tokens from previous stages into an intent/slot representation. The precise transformation may depend on the domain. For example, for a travel domain, the entity resolution component 1270 may transform text corresponding to "Boston airport" to the standard BOS three-letter code referring to the airport. The entity resolution component 1270 can refer to a knowledge base (e.g., 1172) that is used to specifically identify the precise entity referred to in each slot of each NLU hypothesis represented in the cross-domain n-best list data 1260. Specific intent/slot combinations may also be tied to a particular source, which may then be used to resolve the text. In the example "play songs by the stones," the entity resolution component 1270 may reference a personal music catalog, Amazon Music account, a user profile, or the like. The entity resolution component 1270 may output an altered n-best list that is based on the cross-domain n-best list 1260 but that includes more detailed information (e.g., entity IDs) about the specific entities mentioned in the slots and/or more detailed slot data that can eventually be used by a skill. The NLU component 860 may include multiple entity resolution components 1270 and each entity resolution component 1270 may be specific to one or more domains.

The NLU component 860 may include a reranker 1290. The reranker 1290 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 1270.

The reranker 1290 may apply re-scoring, biasing, or other techniques. The reranker 1290 may consider not only the data output by the entity resolution component 1270, but may also consider other data 1291. The other data 1291 may include a variety of information. For example, the other data 1291 may include skill rating or popularity data. For example, if one skill has a high rating, the reranker 1290 may increase the score of a NLU hypothesis that may be processed by the skill. The other data 1291 may also include information about skills that have been enabled by the user that originated the user input. For example, the reranker 1290 may assign higher scores to NLU hypothesis that may be processed by enabled skills than NLU hypothesis that may be processed by non-enabled skills. The other data 1291 may also include data indicating user usage history, such as if the user that originated the user input regularly uses a particular skill or does so at particular times of day. The other data 1291 may additionally include data indicating date, time, location, weather, type of device 110, user identifier, context (such as situational context data 265 described herein), as well as other information. For example, the reranker 1290 may consider when any particular skill is currently active (e.g., music being played, a game being played, etc.).

As illustrated and described, the entity resolution component 1270 is implemented prior to the reranker 1290. The entity resolution component 1270 may alternatively be implemented after the reranker 1290. Implementing the entity resolution component 1270 after the reranker 1290 limits the NLU hypotheses processed by the entity resolution component 1270 to only those hypotheses that successfully pass through the reranker 1290.

The reranker 1290 may be a global reranker (e.g., one that is not specific to any particular domain). Alternatively, the NLU component 860 may implement one or more domain-specific rerankers. Each domain-specific reranker may rerank NLU hypotheses associated with the domain. Each domain-specific reranker may output an n-best list of reranked hypotheses (e.g., 5-10 hypotheses).

The NLU component 860 may perform NLU processing described above with respect to domains associated with skills wholly implemented as part of the system component(s) 120 (e.g., designated 890 in FIG. 8). The NLU component 860 may separately perform NLU processing described above with respect to domains associated with skills that are at least partially implemented as part of the skill support system component(s) 825. In an example, the shortlister component 1150 may only process with respect to the latter domains. Results of these two NLU processing paths may be merged into NLU output data 1285, which may be sent to a post-NLU ranker 865, which may be implemented by the system component(s) 120.

The post-NLU ranker 865 may include a statistical component that produces a ranked list of intent/skill pairs with associated confidence scores. Each confidence score may indicate an adequacy of the skill's execution of the intent with respect to NLU results data associated with the skill. The post-NLU ranker 865 may operate one or more trained models configured to process the NLU results data 1285, skill result data 1230, and the other data 1220 in order to output ranked output data 1225. The ranked output data 1225 may include an n-best list where the NLU hypotheses in the NLU results data 1285 are reordered such that the n-best list in the ranked output data 1225 represents a prioritized list of skills to respond to a user input as determined by the post-NLU ranker 865. The ranked output data 1225 may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 865 enables the system to better determine the best skill to execute the user input. For example, first and second NLU hypotheses in the NLU results data 1285 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 865 (or other scheduling component such as orchestrator component 830) may solicit the first skill and the second skill to provide potential result data 1230 based on the first NLU hypothesis and the second NLU hypothesis, respectively. For example, the post-NLU ranker 865 may send the first NLU hypothesis to the first skill component 890a along with a request for the first skill component 890a to at least partially execute with respect to the first NLU hypothesis. The post-NLU ranker 865 may also send the second NLU hypothesis to the second skill component 890b along with a request for the second skill component 890b to at least partially execute with respect to the second NLU hypothesis. The post-NLU ranker 865 receives, from the first skill component 890a, first result data 1230a generated from the first skill component 890a's execution with respect to the first NLU hypothesis. The post-NLU ranker 865 also receives, from the second skill component 890b, second results data 1230b generated from the second skill component 890b's execution with respect to the second NLU hypothesis.

The result data 1230 may include various portions. For example, the result data 1230 may include content (e.g., audio data, text data, and/or video data) to be output to a user. The result data 1230 may also include a unique identifier used by the system component(s) 120 and/or the skill support system component(s) 825 to locate the data to be output to a user. The result data 1230 may also include an instruction. For example, if the user input corresponds to "turn on the light," the result data 1230 may include an instruction causing the system to turn on a light associated with a profile of the device (110a/110b) and/or user.

The post-NLU ranker 865 may consider the first result data 1230a and the second result data 1230b to alter the first confidence score and the second confidence score of the first NLU hypothesis and the second NLU hypothesis, respectively. That is, the post-NLU ranker 865 may generate a third confidence score based on the first result data 1230a and the first confidence score. The third confidence score may correspond to how likely the post-NLU ranker 865 determines the first skill will correctly respond to the user input. The post-NLU ranker 865 may also generate a fourth confidence score based on the second result data 1230b and the second confidence score. One skilled in the art will appreciate that a first difference between the third confidence score and the fourth confidence score may be greater than a second difference between the first confidence score and the second confidence score. The post-NLU ranker 865 may also consider the other data 1220 to generate the third confidence score and the fourth confidence score. While it has been described that the post-NLU ranker 865 may alter the confidence scores associated with first and second NLU hypotheses, one skilled in the art will appreciate that the post-NLU ranker 865 may alter the confidence scores of more than two NLU hypotheses. The post-NLU ranker 865 may select the result data 1230 associated with the skill component 890 with the highest altered confidence score to be the data output in response to the current user input. The post-NLU ranker 865 may also consider the ASR output data 910 to alter the NLU hypotheses confidence scores.

The orchestrator component 830 may, prior to sending the NLU results data 1285 to the post-NLU ranker 865, associate intents in the NLU hypotheses with skill components 890. For example, if a NLU hypothesis includes a <PlayMusic> intent, the orchestrator component 830 may associate the NLU hypothesis with one or more skill components 890 that can execute the <PlayMusic> intent. Thus, the orchestrator component 830 may send the NLU results data 1285, including NLU hypotheses paired with skill components 890, to the post-NLU ranker 865. In response to ASR output data 910 corresponding to "what should I do for dinner today," the orchestrator component 830 may generates pairs of skill components 890 with associated NLU hypotheses corresponding to:

Skill 1/NLU hypothesis including <Help> intent
Skill 2/NLU hypothesis including <Order> intent
Skill 3/NLU hypothesis including <DishType> intent The post-NLU ranker 865 queries each skill component 890, paired with a NLU hypothesis in the NLU output data 1285, to provide result data 1230 based on the NLU hypothesis with which it is associated. That is, with respect to each skill, the post-NLU ranker 865 colloquially asks each skill "if given this NLU hypothesis, what would you do with it." According to the above example, the post-NLU ranker 865 may send skill components 890 the following data:

Skill 1: First NLU hypothesis including <Help> intent indicator
Skill 2: Second NLU hypothesis including <Order> intent indicator
Skill 3: Third NLU hypothesis including <DishType> intent indicator The post-NLU ranker 865 may query each of the skill components 890 in parallel or substantially in parallel.

A skill component 890 may provide the post-NLU ranker 865 with various data and indications in response to the post-NLU ranker 865 soliciting the skill component 890 for result data 1230. A skill component 890 may simply provide the post-NLU ranker 865 with an indication of whether or not the skill can execute with respect to the NLU hypothesis it received. A skill component 890 may also or alternatively provide the post-NLU ranker 865 with output data generated based on the NLU hypothesis it received. In some situations, a skill component 890 may need further information in addition to what is represented in the received NLU hypothesis to provide output data responsive to the user input. In these situations, the skill component 890 may provide the post-NLU ranker 865 with result data 1230 indicating slots of a framework that the skill component 890 further needs filled or entities that the skill component 890 further needs resolved prior to the skill component 890 being able to provide result data 1230 responsive to the user input. The skill component 890 may also provide the post-NLU ranker 865 with an instruction and/or computer-generated speech indicating how the skill component 890 recommends the system solicit further information needed by the skill component 890. The skill component 890 may further provide the post-NLU ranker 865 with an indication of whether the skill component 890 will have all needed information after the user provides additional information a single time, or whether the skill component 890 will need the user to provide various kinds of additional information prior to the skill component 890 having all needed information. According to the above example, skill components 890 may provide the post-NLU ranker 865 with the following:

Skill 1: indication representing the skill can execute with respect to a NLU hypothesis including the <Help> intent indicator
Skill 2: indication representing the skill needs to the system to obtain further information
Skill 3: indication representing the skill can provide numerous results in response to the third NLU hypothesis including the <DishType> intent indicator Result data 1230 includes an indication provided by a skill component 890 indicating whether or not the skill component 890 can execute with respect to a NLU hypothesis; data generated by a skill component 890 based on a NLU hypothesis; as well as an indication provided by a skill component 890 indicating the skill component 890 needs further information in addition to what is represented in the received NLU hypothesis.

The post-NLU ranker 865 uses the result data 1230 provided by the skill components 890 to alter the NLU processing confidence scores generated by the reranker 1290. That is, the post-NLU ranker 865 uses the result data 1230 provided by the queried skill components 890 to create larger differences between the NLU processing confidence scores generated by the reranker 1290. Without the post-NLU ranker 865, the system may not be confident enough to determine an output in response to a user input, for example when the NLU hypotheses associated with multiple skills are too close for the system to confidently determine a single skill component 890 to invoke to respond to the user input. For example, if the system does not implement the post-NLU ranker 865, the system may not be able to determine whether to obtain output data from a general reference information skill or a medical information skill in response to a user input corresponding to "what is acne."

The post-NLU ranker 865 may prefer skill components 890 that provide result data 1230 responsive to NLU hypotheses over skill components 890 that provide result data 1230 corresponding to an indication that further information is needed, as well as skill components 890 that provide result data 1230 indicating they can provide multiple responses to received NLU hypotheses. For example, the post-NLU ranker 865 may generate a first score for a first skill component 890*a* that is greater than the first skill's NLU confidence score based on the first skill component 890*a* providing result data 1230*a* including a response to a NLU hypothesis. For further example, the post-NLU ranker 865 may generate a second score for a second skill component 890*b* that is less than the second skill's NLU confidence score based on the second skill component 890*b* providing result data 1230*b* indicating further information is needed for the second skill component 890*b* to provide a response to a NLU hypothesis. Yet further, for example, the post-NLU ranker 865 may generate a third score for a third skill component 890*c* that is less than the third skill's NLU confidence score based on the third skill component 890*c* providing result data 1230*c* indicating the third skill component 890*c* can provide multiple responses to a NLU hypothesis.

The post-NLU ranker 865 may consider other data 1220 in determining scores. The other data 1220 may include rankings associated with the queried skill components 890. A ranking may be a system ranking or a user-specific ranking. A ranking may indicate a veracity of a skill from the perspective of one or more users of the system. For example, the post-NLU ranker 865 may generate a first score for a first skill component 890*a* that is greater than the first skill's NLU processing confidence score based on the first skill component 890*a* being associated with a high ranking. For further example, the post-NLU ranker 865 may generate a second score for a second skill component 890*b* that is less than the second skill's NLU processing confidence score based on the second skill component 890*b* being associated with a low ranking.

The other data 1220 may include information indicating whether or not the user that originated the user input has enabled one or more of the queried skill components 890. For example, the post-NLU ranker 865 may generate a first score for a first skill component 890*a* that is greater than the first skill's NLU processing confidence score based on the first skill component 890*a* being enabled by the user that originated the user input. For further example, the post-NLU ranker 865 may generate a second score for a second skill component 890*b* that is less than the second skill's NLU processing confidence score based on the second skill component 890*b* not being enabled by the user that originated the user input. When the post-NLU ranker 865 receives the NLU results data 1285, the post-NLU ranker 865 may determine whether profile data, associated with the user and/or device that originated the user input, includes indications of enabled skills.

The other data 1220 may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 865 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 865 may increase the NLU processing confidence score associated with a first skill configured to output visual data and/or decrease the NLU processing confidence score associated with a second skill configured to output audio data.

The other data 1220 may include information indicating the veracity of the result data 1230 provided by a skill component 890. For example, if a user says "tell me a recipe for pasta sauce," a first skill component 890*a* may provide the post-NLU ranker 865 with first result data 1230*a* corresponding to a first recipe associated with a five star rating and a second skill component 890*b* may provide the post-NLU ranker 865 with second result data 1230*b* corresponding to a second recipe associated with a one star rating. In this situation, the post-NLU ranker 865 may increase the NLU processing confidence score associated with the first skill component 890*a* based on the first skill component 890*a* providing the first result data 1230*a* associated with the five star rating and/or decrease the NLU processing confidence score associated with the second skill component 890*b* based on the second skill component 890*b* providing the second result data 1230*b* associated with the one star rating.

The other data 1220 may include information indicating the type of device that originated the user input. For example, the device may correspond to a "hotel room" type if the device is located in a hotel room. If a user inputs a command corresponding to "order me food" to the device located in the hotel room, the post-NLU ranker 865 may increase the NLU processing confidence score associated with a first skill component 890*a* corresponding to a room service skill associated with the hotel and/or decrease the NLU processing confidence score associated with a second skill component 890*b* corresponding to a food skill not associated with the hotel.

The other data 1220 may include information indicating a location of the device and/or user that originated the user input. The system may be configured with skill components 890 that may only operate with respect to certain geographic locations. For example, a user may provide a user input corresponding to "when is the next train to Portland." A first skill component 890a may operate with respect to trains that arrive at, depart from, and pass through Portland, Oregon. A second skill component 890b may operate with respect to trains that arrive at, depart from, and pass through Portland, Maine. If the device and/or user that originated the user input is located in Seattle, Washington, the post-NLU ranker 865 may increase the NLU processing confidence score associated with the first skill component 890a and/or decrease the NLU processing confidence score associated with the second skill component 890b. Likewise, if the device and/or user that originated the user input is located in Boston, Massachusetts, the post-NLU ranker 865 may increase the NLU processing confidence score associated with the second skill component 890b and/or decrease the NLU processing confidence score associated with the first skill component 890a.

The other data 1220 may include information indicating a time of day. The system may be configured with skill components 890 that operate with respect to certain times of day. For example, a user may provide a user input corresponding to "order me food." A first skill component 890a may generate first result data 1230a corresponding to breakfast. A second skill component 890b may generate second result data 1230b corresponding to dinner. If the system component(s) 120 receives the user input in the morning, the post-NLU ranker 865 may increase the NLU processing confidence score associated with the first skill component 890a and/or decrease the NLU processing score associated with the second skill component 890b. If the system component(s) 120 receives the user input in the afternoon or evening, the post-NLU ranker 865 may increase the NLU processing confidence score associated with the second skill component 890b and/or decrease the NLU processing confidence score associated with the first skill component 890a.

The other data 1220 may include information indicating user preferences. The system may include multiple skill components 890 configured to execute in substantially the same manner. For example, a first skill component 890a and a second skill component 890b may both be configured to order food from respective restaurants. The system may store a user preference (e.g., in the profile storage 870) that is associated with the user that provided the user input to the system component(s) 120 as well as indicates the user prefers the first skill component 890a over the second skill component 890b. Thus, when the user provides a user input that may be executed by both the first skill component 890a and the second skill component 890b, the post-NLU ranker 865 may increase the NLU processing confidence score associated with the first skill component 890a and/or decrease the NLU processing confidence score associated with the second skill component 890b.

The other data 1220 may include information indicating system usage history associated with the user that originated the user input. For example, the system usage history may indicate the user originates user inputs that invoke a first skill component 890a more often than the user originates user inputs that invoke a second skill component 890b. Based on this, if the present user input may be executed by both the first skill component 890a and the second skill component 890b, the post-NLU ranker 865 may increase the NLU processing confidence score associated with the first skill component 890a and/or decrease the NLU processing confidence score associated with the second skill component 890b.

The other data 1220 may include information indicating a speed at which the device 110 that originated the user input is traveling. For example, the device 110 may be located in a moving vehicle, or may be a moving vehicle. When a device 110 is in motion, the system may prefer audio outputs rather than visual outputs to decrease the likelihood of distracting the user (e.g., a driver of a vehicle). Thus, for example, if the device 110 that originated the user input is moving at or above a threshold speed (e.g., a speed above an average user's walking speed), the post-NLU ranker 865 may increase the NLU processing confidence score associated with a first skill component 890a that generates audio data. The post-NLU ranker 865 may also or alternatively decrease the NLU processing confidence score associated with a second skill component 890b that generates image data or video data.

The other data 1220 may include information indicating how long it took a skill component 890 to provide result data 1230 to the post-NLU ranker 865. When the post-NLU ranker 865 multiple skill components 890 for result data 1230, the skill components 890 may respond to the queries at different speeds. The post-NLU ranker 865 may implement a latency budget. For example, if the post-NLU ranker 865 determines a skill component 890 responds to the post-NLU ranker 865 within a threshold amount of time from receiving a query from the post-NLU ranker 865, the post-NLU ranker 865 may increase the NLU processing confidence score associated with the skill component 890. Conversely, if the post-NLU ranker 865 determines a skill component 890 does not respond to the post-NLU ranker 865 within a threshold amount of time from receiving a query from the post-NLU ranker 865, the post-NLU ranker 865 may decrease the NLU processing confidence score associated with the skill component 890.

It has been described that the post-NLU ranker 865 uses the other data 1220 to increase and decrease NLU processing confidence scores associated with various skill components 890 that the post-NLU ranker 865 has already requested result data from. Alternatively, the post-NLU ranker 865 may use the other data 1220 to determine which skill components 890 to request result data from. For example, the post-NLU ranker 865 may use the other data 1220 to increase and/or decrease NLU processing confidence scores associated with skill components 890 associated with the NLU results data 1285 output by the NLU component 860. The post-NLU ranker 865 may select n-number of top scoring altered NLU processing confidence scores. The post-NLU ranker 865 may then request result data 1230 from only the skill components 890 associated with the selected n-number of NLU processing confidence scores.

As described, the post-NLU ranker 865 may request result data 1230 from all skill components 890 associated with the NLU results data 1285 output by the NLU component 860. Alternatively, the system component(s) 120 may prefer result data 1230 from skills implemented entirely by the system component(s) 120 rather than skills at least partially implemented by the skill support system component(s) 825. Therefore, in the first instance, the post-NLU ranker 865 may request result data 1230 from only skills associated with the NLU results data 1285 and entirely implemented by the system component(s) 120. The post-NLU ranker 865 may only request result data 1230 from skills associated with the NLU results data 1285, and at least partially implemented by the skill support system component(s) 825, if none of the skills, wholly implemented by the system component(s) 120, provide the post-NLU ranker 865 with result data 1230 indicating either data response to the NLU results data 1285, an indication that the skill can execute the user input, or an indication that further information is needed.

As indicated above, the post-NLU ranker 865 may request result data 1230 from multiple skill components 890. If one of the skill components 890 provides result data 1230 indicating a response to a NLU hypothesis and the other skills provide result data 1230 indicating either they cannot execute or they need further information, the post-NLU ranker 865 may select the result data 1230 including the response to the NLU hypothesis as the data to be output to the user. If more than one of the skill components 890 provides result data 1230 indicating responses to NLU hypotheses, the post-NLU ranker 865 may consider the other data 1220 to generate altered NLU processing confidence scores, and select the result data 1230 of the skill associated with the greatest score as the data to be output to the user.

A system that does not implement the post-NLU ranker 865 may select the highest scored NLU hypothesis in the NLU results data 1285. The system may send the NLU hypothesis to a skill component 890 associated therewith along with a request for output data. In some situations, the skill component 890 may not be able to provide the system with output data. This results in the system indicating to the user that the user input could not be processed even though another skill associated with lower ranked NLU hypothesis could have provided output data responsive to the user input.

The post-NLU ranker 865 reduces instances of the aforementioned situation. As described, the post-NLU ranker 865 queries multiple skills associated with the NLU results data 1285 to provide result data 1230 to the post-NLU ranker 865 prior to the post-NLU ranker 865 ultimately determining the skill component 890 to be invoked to respond to the user input. Some of the skill components 890 may provide result data 1230 indicating responses to NLU hypotheses while other skill components 890 may providing result data 1230 indicating the skills cannot provide responsive data. Whereas a system not implementing the post-NLU ranker 865 may select one of the skill components 890 that could not provide a response, the post-NLU ranker 865 only selects a skill component 890 that provides the post-NLU ranker 865 with result data corresponding to a response, indicating further information is needed, or indicating multiple responses can be generated.

The post-NLU ranker 865 may select result data 1230, associated with the skill component 890 associated with the highest score, for output to the user. Alternatively, the post-NLU ranker 865 may output ranked output data 1225 indicating skill components 890 and their respective post-NLU ranker rankings. Since the post-NLU ranker 865 receives result data 1230, potentially corresponding to a response to the user input, from the skill components 890 prior to post-NLU ranker 865 selecting one of the skills or outputting the ranked output data 1225, little to no latency occurs from the time skills provide result data 1230 and the time the system outputs responds to the user.

If the post-NLU ranker 865 selects result audio data to be output to a user and the system determines content should be output audibly, the post-NLU ranker 865 (or another component of the system component(s) 120) may cause the device 110a and/or the device 110b to output audio corresponding to the result audio data. If the post-NLU ranker 865 selects result text data to output to a user and the system determines content should be output visually, the post-NLU ranker 865 (or another component of the system component(s) 120) may cause the device 110b to display text corresponding to the result text data. If the post-NLU ranker 865 selects result audio data to output to a user and the system determines content should be output visually, the post-NLU ranker 865 (or another component of the system component(s) 120) may send the result audio data to the ASR component 850. The ASR component 850 may generate output text data corresponding to the result audio data. The system component(s) 120 may then cause the device 110b to display text corresponding to the output text data. If the post-NLU ranker 865 selects result text data to output to a user and the system determines content should be output audibly, the post-NLU ranker 865 (or another component of the system component(s) 120) may send the result text data to the TTS component 880. The TTS component 880 may generate output audio data (corresponding to computer-generated speech) based on the result text data. The system component(s) 120 may then cause the device 110a and/or the device 110b to output audio corresponding to the output audio data.

As described, a skill component 890 may provide result data 1230 either indicating a response to the user input, indicating more information is needed for the skill component 890 to provide a response to the user input, or indicating the skill component 890 cannot provide a response to the user input. If the skill component 890 associated with the highest post-NLU ranker score provides the post-NLU ranker 865 with result data 1230 indicating a response to the user input, the post-NLU ranker 865 (or another component of the system component(s) 120, such as the orchestrator component 830) may simply cause content corresponding to the result data 1230 to be output to the user. For example, the post-NLU ranker 865 may send the result data 1230 to the orchestrator component 830. The orchestrator component 830 may cause the result data 1230 to be sent to the device (110a/110b), which may output audio and/or display text corresponding to the result data 1230. The orchestrator component 830 may send the result data 1230 to the ASR component 850 to generate output text data and/or may send the result data 1230 to the TTS component 880 to generate output audio data, depending on the situation.

The skill component 890 associated with the highest post-NLU ranker score may provide the post-NLU ranker 865 with result data 1230 indicating more information is needed as well as instruction data. The instruction data may indicate how the skill component 890 recommends the system obtain the needed information. For example, the instruction data may correspond to text data or audio data (i.e., computer-generated speech) corresponding to "please indicate _____." The instruction data may be in a format (e.g., text data or audio data) capable of being output by the device (110a/110b). When this occurs, the post-NLU ranker 865 may simply cause the received instruction data be output by the device (110a/110b). Alternatively, the instruction data may be in a format that is not capable of being output by the device (110a/110b). When this occurs, the post-NLU ranker 865 may cause the ASR component 850 or the TTS component 880 to process the instruction data, depending on the situation, to generate instruction data that may be output by the device (110a/110b). Once the user provides the system with all further information needed by the skill component 890, the skill component 890 may provide the system with result data 1230 indicating a response to the user input, which may be output by the system as detailed above.

The system may include "informational" skill components 890 that simply provide the system with information, which the system outputs to the user. The system may also include "transactional" skill components 890 that require a system instruction to execute the user input. Transactional skill components 890 include ride sharing skills, flight booking skills, etc. A transactional skill component 890 may simply provide the post-NLU ranker 865 with result data 1230 indicating the transactional skill component 890 can execute the user input. The post-NLU ranker 865 may then cause the system to solicit the user for an indication that the system is permitted to cause the transactional skill component 890 to execute the user input. The user-provided indication may be an audible indication or a tactile indication (e.g., activation of a virtual button or input of text via a virtual keyboard). In response to receiving the user-provided indication, the system may provide the transactional skill component 890 with data corresponding to the indication. In response, the transactional skill component 890 may execute the command (e.g., book a flight, book a train ticket, etc.). Thus, while the system may not further engage an informational skill component 890 after the informational skill component 890 provides the post-NLU ranker 865 with result data 1230, the system may further engage a transactional skill component 890 after the transactional skill component 890 provides the post-NLU ranker 865 with result data 1230 indicating the transactional skill component 890 may execute the user input.

In some instances, the post-NLU ranker 865 may generate respective scores for first and second skills that are too close (e.g., are not different by at least a threshold difference) for the post-NLU ranker 865 to make a confident determination regarding which skill should execute the user input. When this occurs, the system may request the user indicate which skill the user prefers to execute the user input. The system may output TTS-generated speech to the user to solicit which skill the user wants to execute the user input.

Figure 13:
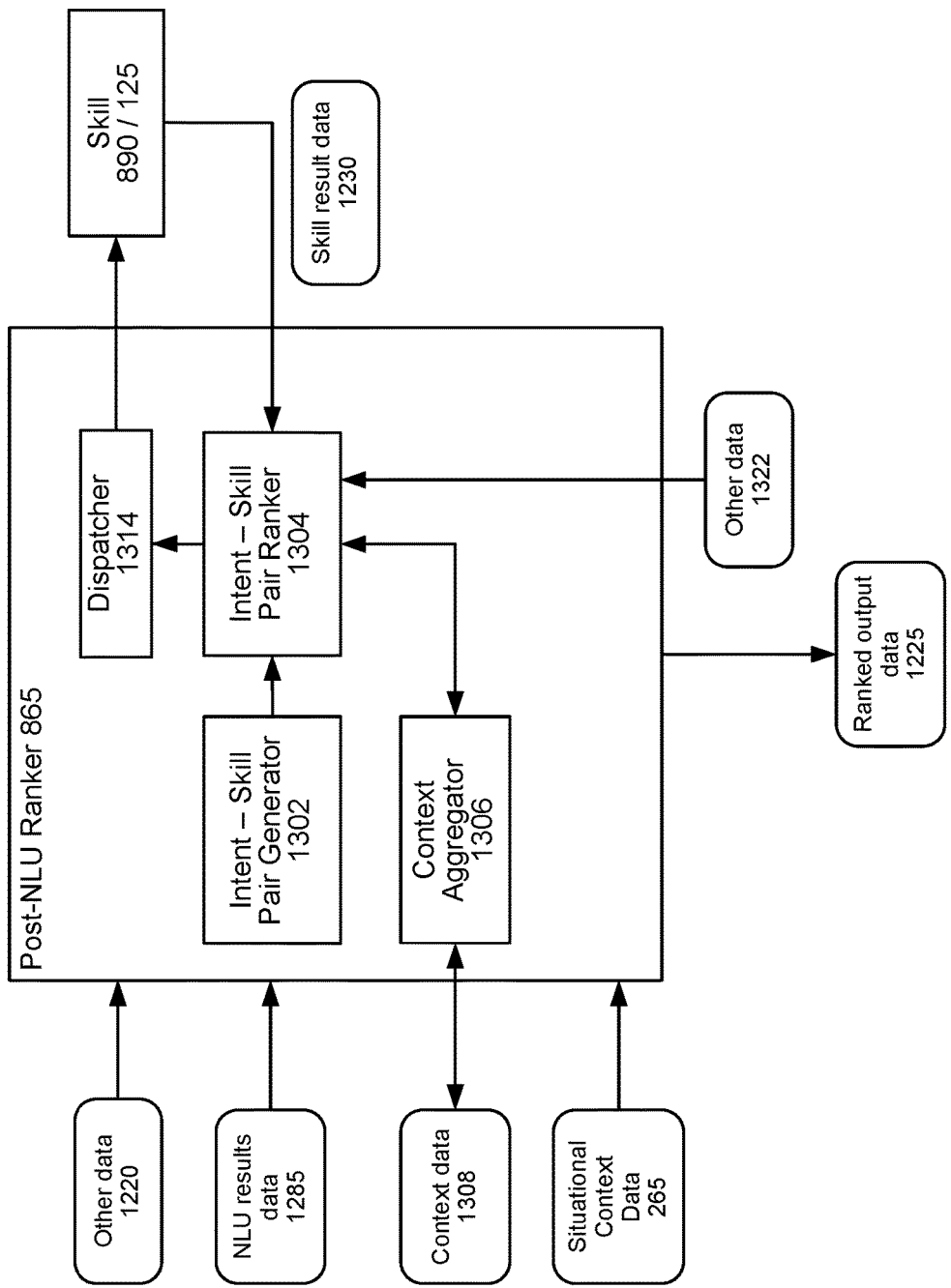
FIG. 13 is a conceptual diagram illustrating how a post-NLU ranker may process according to embodiments of the present disclosure.

FIG. 13 is a conceptual diagram illustrating how a post-NLU ranker 865 may process according to embodiments of the present disclosure. In some implementations, the post-NLU ranker 865 may generate respective scores for first and second skills that are too close (e.g., are not different by at least a threshold difference) for the post-NLU ranker 865 to make a confident determination regarding which skill should execute the user input. In some implementations, the post-NLU ranker 865 may use other data 1220 and/or other data 1322 to arbitrate between competing NLU hypotheses. For example, the post-NLU ranker 865 may receive situational context data 265 from the SCIC 150 and process it to determine whether one skill or another may be more relevant to the user request. In some implementations, the system may request the user indicate which skill the user prefers to execute the user input by outputting TTS-generated speech to the user to solicit which skill the user wants to execute the user input.

FIG. 13 illustrates other configurations and operations of the post-NLU ranker 865. When the post-NLU ranker 865 receives NLU results data 1285, the NLU results data 1285 may be sent to an intent-skill pair generator 1302. The intent-skill pair generator 1302 may include information about what skills are capable of handling what intents. Such information may be context agnostic and may thus indicate what skills are capable of handling what intents generally, without regard to the context associated with the user input. The intent-skill pair generator 1302 thus receives the NLU results data 1285 and identifies what particular candidate skills may handle the intent for NLU hypothesis. For example, if a NLU hypothesis includes a particular intent, the intent-skill pair generator 1302 identifies each skill that may execute with respect to the intent. For further example, if the NLU results data 1285 include multiple NLU hypotheses including multiple intents, the intent-skill pair generator 1302 associates each different NLU hypothesis with each skill that may execute with respect to the NLU hypothesis. As illustrated, the intent-skill pair generator 1302 may be implemented at part of the post-NLU ranker 865. However, one skill in the art will appreciate that the intent-skill pair generator 1302 may be implemented as part of the NLU component 860 or in another component without departing from the present disclosure. In such a case, the NLU results data 1285 may include intent-skill pairs.

The post-NLU ranker 865 may also include an intent-skill pair ranker 1304. The intent-skill pair ranker 1304 ranks the intent-skill pairs generated by the intent-skill pair generator 1302 based on, for example, the number of filled slots of a NLU hypothesis, an NLU confidence score associated with a NLU hypothesis, context information output by a context aggregator 1306, and/or other data.

The post-NLU ranker 865 may include the context aggregator 1306. The context aggregator 1306 receives context data 1308 from various contextual sources. The context data 1308 may include time data, which represents a time of receipt of the user input by the device 110, a time or receipt of the user input by the system component(s) 120, a user identifier associated with the user input, a device identifier of the device 110, whether other devices are linked to the device 110, and/or other information. The context aggregator 1306 may aggregate the context data 1308 and put the context data 1308 in a form that can be processed by the intent-skill pair ranker 1304. Context data 1308 may include data obtained from the device 110 or from other services connected to the system component(s) 120. The context data 1308 may include the situational context data 265 described herein. Alternatively, or in addition, the situational context data 265 may be input separately to the post-NLU ranker 865. In certain configurations, for example where situational context data 265 may represent natural language text describing the situational context, the post-NLU ranker 865 may be configured to process natural language data to assist with ranking NLU results data.

The context data 1308 may include skill availability data. Such information may indicate what skills are available and authorized to process the user input. For example, if the user has only enabled certain skills, the enabled skills may be noted in the skill availability data.

The context data 1308 may also include dialogue data. A "dialogue" or "dialogue session" as used herein may refer to data transmissions (such as relating to multiple user inputs and system component(s) 120 outputs) between the system component(s) 120 and a local device (e.g., the device 110) that all relate to a single originating user input. Thus, the data transmissions of a dialogue session may share a dialogue identifier or other unique identifier that may be used by the orchestrator component 830, skill component(s) 890, skill support system component(s) 825, etc. to track information across the dialogue session. For example, the device 110 may send the system component(s) 120 data corresponding to "Alexa, play jeopardy." The system component(s) 120 may output data corresponding to a jeopardy statement to the device 110 for output to a user(s). A user may then respond to the statement, which the device 110 sends as data to the system component(s) 120. The sending of data from the device 110 to the system component(s) 120 and the sending of data from the system component(s) 120 to the device 110 may all correspond to a single dialogue session related to the originating user input "play jeopardy." In some examples, a dialogue-initiating user input may start with a wakeword and end with a command, such as "Alexa, play jeopardy," where "Alexa" is the wakeword and "play jeopardy" is the command. Subsequent user inputs of the same dialogue session may or may not start with speaking of a wakeword. Each user input of a dialogue may be associated with a unique user input identifier such that multiple user input identifiers may be associated with a single dialogue session identifier.

Dialogue data may include interactive focus information, (e.g., representing which skill was most recently invoked to execute a previous user input for the user and/or device 110 associated with the present user input). Dialogue data may also include content focus information (e.g., representing a skill that is streaming data to the device 110 when the data corresponding to the current user input is received by the system component(s) 120). The context data 1308 may be one portion of the data used by the intent-skill pair ranker 1304 to determine which skill should execute the current user input. Thus, unlike certain systems that use interactive focus and content focus as binary determinations regarding which skill should execute a current user input, the presently disclosed architecture considers focus along with other data, thereby minimizing disproportionate routing.

The context data 1308 may also include device data. Device data may indicate characteristics of the device 110 from which the user input was received. For example, such data may include information such as display capabilities of the device, a quality of one or more speakers of the device, a device type, etc. Certain capabilities of a solo device or group of devices may be stored with the system and looked up during a particular interaction to determine if a device/group of devices can handle a go-back request. Device data may also represent a skill with which the device 110 is associated. The device data may also indicate whether the device 110 is currently streaming data or was streaming data when the user input was received and sent to the system component(s) 120. The context data 1308 (and/or other data 1322) may include a metadata flag/indicator that represents whether the particular skill being executed is one that can handle a go-back (or other navigational) request.

The context data 1308 may also include user profile data. The user profile data may represent preferences and/or characteristics of the user that originated the current user input. Such data may be received from the profile storage 870.

The context data 1308 may also include location data. The location data may represent a location of the device 110 from which the user input was received.

The context data 1308 may also include anaphora data. Anaphora data may be data used to resolve anaphora, exophora, or other references (like pronouns such as he, she, etc.) to entities that are not explicitly named in a user input. The anaphora data may include entity identifiers or other information used to resolve anaphoric references in a user input.

For example, while interacting with the system, the user may refer to an entity involved in a previous exchange in a manner that is not explicit. For example, after the system answers the Starbucks query with the location of the nearest Starbucks, the user may wish to know the hours for that Starbucks and may ask the system "how late are they open?" Even though the user did not explicitly state what "they" refers to, the user may expect the system to provide the hours (or the closing time) of the Starbucks that was just part of an exchange between the user and the system. In another example, after asking the system to "play Beethoven's $5^{th}$ Symphony" the user may ask the system "when did he write that?" In order to answer the second query, the system must understand that "he" refers to Beethoven and "that" refers to the musical work $5^{th}$ Symphony. Words that refer to an entity but do not explicitly name the entity are an example of anaphora, namely a word referring to or replacing another word.

Other references to other text may also be processed by the system. For example, exophora is a reference in text to something external to the text, endophora is a reference to something preceding or following the reference within the text, and cataphora is a reference to a following word or group or words. The system may be configured to process these, and other similar types of references (which may generally be referred to below as anaphora). Further, while a language such as English may use unknown words to substitute for anaphora/(e.g., pronouns), other languages, such as Japanese may allow phrasing of anaphora without a specific word to represent the anaphora (referred to as zero-phrase anaphora), and other languages may use other forms of reference. The present system may be used to resolve many such forms of anaphora across many different languages.

The context data 1308 may also include data regarding whether one or more skills are "in focus." A skill may be in interactive focus, meaning the skill was the most recent skill that executed a user input for a user or device associated with a present user input and/or the skill may be involved with an open dialogue (e.g., series of user inputs and responses) with a user device. Interactive focus attempts to continue a conversation between a user and the system and/or a skill for purposes of processing the dialogue. However, there may be instances where a user inputs a command that may be handled by a skill that is currently in interactive focus, but which the user does not intend to be executed by such skill. The system may process the context data 1308 and other data to determine how best to process a user input when one or more skills may be in focus.

A skill may alternatively be in content focus, meaning the skill is associated with content that is streaming to the user and/or device associated with a current user input when the current user input is received by the system. For example, a previous user input of "Play music" may result in the system streaming music to a device from a specific music skill. While the skill is streaming the music, the same user may input a second user input. Since the second user input was received when the music skill was streaming the music, the system may query that music skill in the first instance, even if the second user input is not necessarily intended for the music skill. The music skill may be configured to attempt to execute the subsequent user input (and potentially output an error) even though the user may have intended another skill to execute such user input.

The context data 1308 may also include other context data not explicitly recited herein.

The intent-skill pair ranker 1304 may operate one or more trained models that are configured to process the NLU results data 1285, skill result data 1230, and other data 1322 in order to determine a single best skill for executing the current user input from the available pairs output by the intent-skill pair generator 1302. The intent-skill pair ranker 1304 may send queries to the skills and request a first skill and a second skill (for example the candidate skills identified by the pair generator 1302), to provide potential result data indicating whether the skill can handle the intent at the particular moment and if so, what the output data for the particular skill would be (e.g., data the skill would provide to a user if the skill were selected to execute the user input) based on the NLU results data 1285. For example, the intent-skill pair ranker 1304 may send a first NLU hypothesis, associated with a first skill, to the first skill along with a request for the first skill to at least partially execute with respect to the first NLU hypothesis. The intent-skill pair ranker 1304 may also send a second NLU hypothesis, associated with the second skill, to the second skill along with a request for the second skill to at least partially execute with respect to the second NLU hypothesis. The intent-skill pair ranker 1304 receives, from the first skill, first result data 1230a generated from the first skill's execution with respect to the first NLU hypothesis. The intent-skill pair ranker 1304 also receives, from the second skill, second results data 1230b generated from the second skill's execution with respect to the second NLU hypothesis. Based on the first results data 1230a, a first NLU confidence score associated with the first NLU hypothesis, the second results data 1230b, a second NLU confidence score associated with the second NLU hypothesis, and other data 1322 (e.g., context data, user profile data, etc.), the intent-skill pair ranker 1304 determines the best skill for executing the current user input. The intent-skill pair ranker 1304 sends an indication of the best skill to a dispatcher component 1314.

The dispatcher 1314 may then send the selected skill the information needed to execute the user input, including an indication of the intent, the appropriate context data 1308 (such as device identifier, user identifier, or the like), slot data, utterance identifier, dialogue identifier, or any other information needed.

One or more models implemented by components of the orchestrator component 830, post-NLU ranker 865, shortlister 1150, or other component may be trained and operated according to various machine learning techniques.

Figure 14:
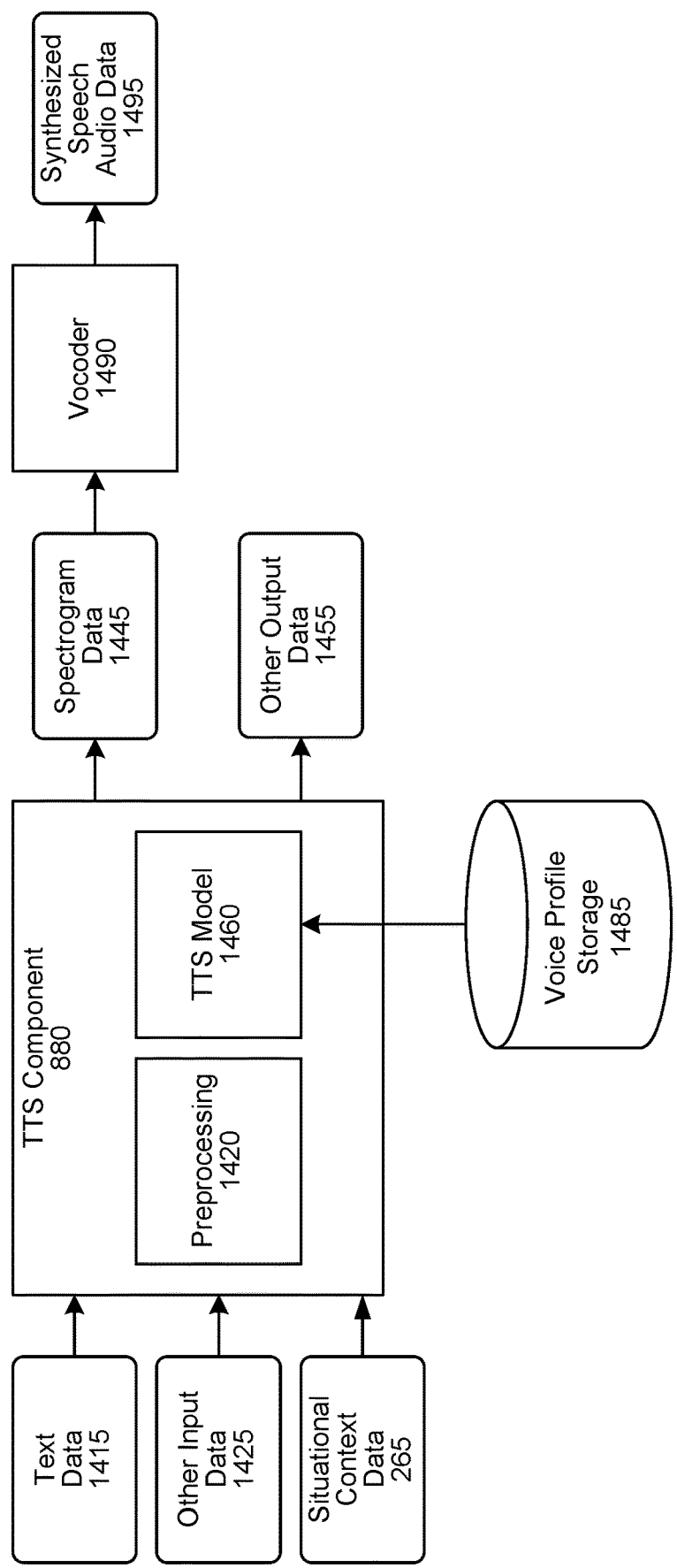
FIG. 14 is a conceptual diagram of text-to-speech components according to embodiments of the present disclosure.

FIG. 14 is a conceptual diagram of a text-to-speech (TTS) component 880 according to embodiments of the present disclosure. The TTS component 880 may receive text data 1415 and process it to generate audio data 1495 representing synthesized speech. In some implementations, the TTS component 880 may additionally determine certain aspects of the synthesized speech using other input data 1425. The other input data 1425 may include, for example, situational context data 265. Alternatively, or in addition, the situational context data 265 may be input separately to the TTS component 880. Using the situational context data 265, the TTS component 880 may select from different possible voice characteristics related to, for example, a particular voice identity (e.g., corresponding to a celebrity or other selected personality), emotion (e.g., excited, subdued, etc.), tone (e.g., low, bright, etc.), inflection (e.g., rhythmic or flat), volume (e.g., amplitude, whisper, shout, etc.), etc.

Components of a system that may be used to perform unit selection, parametric TTS processing, and/or model-based audio synthesis are shown in FIG. 14. FIG. 14 is a conceptual diagram that illustrates operations for generating synthesized speech using a TTS component 880, according to embodiments of the present disclosure. The TTS component 880 may receive text data 1415 and process it using one or more TTS models 1460 to generate synthesized speech in the form of spectrogram data 1445. A vocoder 1490 may convert the spectrogram data 1445 into output speech audio data 1495, which may represent a time-domain waveform suitable for amplification and output as audio (e.g., from a loudspeaker).

The TTS component 880 may additionally receive other input data 1425. The other input data 1425 may include, for example, identifiers and/or labels corresponding to a desired speaker identity, voice characteristics, emotion, speech style, etc. desired for the synthesized speech. In some implementations, the other input data 1425 may include text tags or text metadata that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The tags may be included in the text data 1415 and/or the other input data 1425 such as metadata accompanying a TTS request and indicating what text should be whispered (or have some other indicated audio characteristic).

The TTS component 880 may include a preprocessing component 1420 that can convert the text data 1415 and/or other input data 1425 into a form suitable for processing by the TTS model 1460. The text data 1415 may be from, for example an application, a skill component (described further below), an NLG component, another device or source, or may be input by a user. The text data 1415 received by the TTS component 880 may not necessarily be text, but may include other data (such as symbols, code, other data, etc.) that may reference text (such as an indicator of a word and/or phoneme) that is to be synthesized. The preprocessing component 1420 may transform the text data 1415 into, for example, a symbolic linguistic representation, which may include linguistic context features such as phoneme data, punctuation data, syllable-level features, word-level features, and/or emotion, speaker, accent, or other features for processing by the TTS component 880. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion associated with the text data 1415, such as surprise, anger, or fear. The speaker features may include data corresponding to a type of speaker, such as sex, age, or profession. The accent features may include data corresponding to an accent associated with the speaker, such as Southern, Boston, English, French, or other such accent. Style features may include a book reading style, poem reading style, a news anchor style, a sports commentator style, various singing styles, etc.

The preprocessing component 1420 may include functionality and/or components for performing text normalization, linguistic analysis, linguistic prosody generation, or other such operations. During text normalization, the preprocessing component 1420 may first process the text data 1415 and generate standard text, converting such things as numbers, abbreviations (such as Apt., St., etc.), symbols ($, %, etc.) into the equivalent of written out words.

During linguistic analysis, the preprocessing component 1420 may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. In some implementations, the TTS model 1460 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in a storage component. The linguistic analysis performed by the preprocessing component 1420 may also identify different grammatical components such as prefixes, suffixes, phrases, punctuation, syntactic boundaries, or the like. Such grammatical components may be used by the TTS component 880 to craft a natural-sounding audio waveform output. The language dictionary may also include letter-to-sound rules and other tools that may be used to pronounce previously unidentified words or letter combinations that may be encountered by the TTS component 880. Generally, the more information included in the language dictionary, the higher quality the speech output.

The output of the preprocessing component 1420 may be a symbolic linguistic representation, which may include a sequence of phonetic units. In some implementations, the sequence of phonetic units may be annotated with prosodic characteristics. In some implementations, prosody may be applied in part or wholly by a TTS model 1460. This symbolic linguistic representation may be sent to the TTS model 1460 for conversion into audio data (e.g., in the form of Mel-spectrograms or other frequency content data format).

The TTS component 880 may retrieve one or more previously trained and/or configured TTS models 1460 from the voice profile storage 1485. A TTS model 1460 may be, for example, a neural network architecture that may be described as interconnected artificial neurons or "cells" interconnected in layers and/or blocks. In general, neural network model architecture can be described broadly by hyperparameters that describe the number of layers and/or blocks, how many cells each layer and/or block contains, what activations functions they implement, how they interconnect, etc. A neural network model includes trainable parameters (e.g., "weights") that indicate how much weight (e.g., in the form of an arithmetic multiplier) a cell should give to a particular input when generating an output. In some implementations, a neural network model may include other features such as a self-attention mechanism, which may determine certain parameters at run time based on inputs rather than, for example, during training based on a loss calculation. The various data that describe a particular TTS model 1460 may be stored in the voice profile storage 1485. A TTS model 1460 may represent a particular speaker identity and may be conditioned based on speaking style, emotion, etc. In some implementations, a particular speaker identity may be associated with more than one TTS model 1460; for example, with a different model representing a different speaking style, language, emotion, etc. in some implementations, a particular TTS model 1460 may be associated with more than one speaker identity; that is, be able to produce synthesized speech that reproduces voice characteristics of more than one character. Thus a first TTS model 1460a may be used to create synthesized speech for the first speech-processing system component 120a while a second, different, TTS model 1460b may be used to create synthesized speech for the second speech-processing system component 120b. In some cases, the TTS model 1460 may generate the desired voice characteristics based on conditioning data received or determined from the text data 1415 and/or the other input data 1425. For example, a synthesized voice of the first speech-processing system component 120a may be different from a synthesized voice of the second speech-processing system component 120b.

The TTS component 880 may, based on an indication received with the text data 1415 and/or other input data 1425, retrieve a TTS model 1460 from the voice profile storage 1485 and use it to process input to generate synthesized speech. The TTS component 880 may provide the TTS model 1460 with any relevant conditioning labels to generate synthesized speech having the desired voice characteristics. The TTS model 1460 may generate spectrogram data 1445 (e.g., frequency content data) representing the synthesized speech, and send it to the vocoder 1490 for conversion into an audio signal.

The TTS component 880 may generate other output data 1455. The other output data 1455 may include, for example, indications or instructions for handling and/or outputting the synthesized speech. For example, the text data 1415 and/or other input data 1425 may be received along with metadata, such as SSML tags, indicating that a selected portion of the text data 1415 should be louder or quieter. Thus, the other output data 1455 may include a volume tag that instructs the vocoder 1490 to increase or decrease an amplitude of the output speech audio data 1495 at times corresponding to the selected portion of the text data 1415. Additionally or alternatively, a volume tag may instruct a playback device to raise or lower a volume of the synthesized speech from the device's current volume level, or lower a volume of other media being output by the device (e.g., to deliver an urgent message).

The vocoder 1490 may convert the spectrogram data 1445 generated by the TTS model 1460 into an audio signal (e.g., an analog or digital time-domain waveform) suitable for amplification and output as audio. The vocoder 1490 may be, for example, a universal neural vocoder based on Parallel WaveNet or related model. The vocoder 1490 may take as input audio data in the form of, for example, a Mel-spectrogram with 80 coefficients and frequencies ranging from 50 Hz to 12 kHz. The synthesized speech audio data 1495 may be a time-domain audio format (e.g., pulse-code modulation (PCM), waveform audio format (WAV), u-law, etc.) that may be readily converted to an analog signal for amplification and output by a loudspeaker. The synthesized speech audio data 1495 may consist of, for example, 8-, 16-, or 24-bit audio having a sample rate of 16 kHz, 24 kHz, 44.1 kHz, etc. In some implementations, other bit and/or sample rates may be used.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 15:
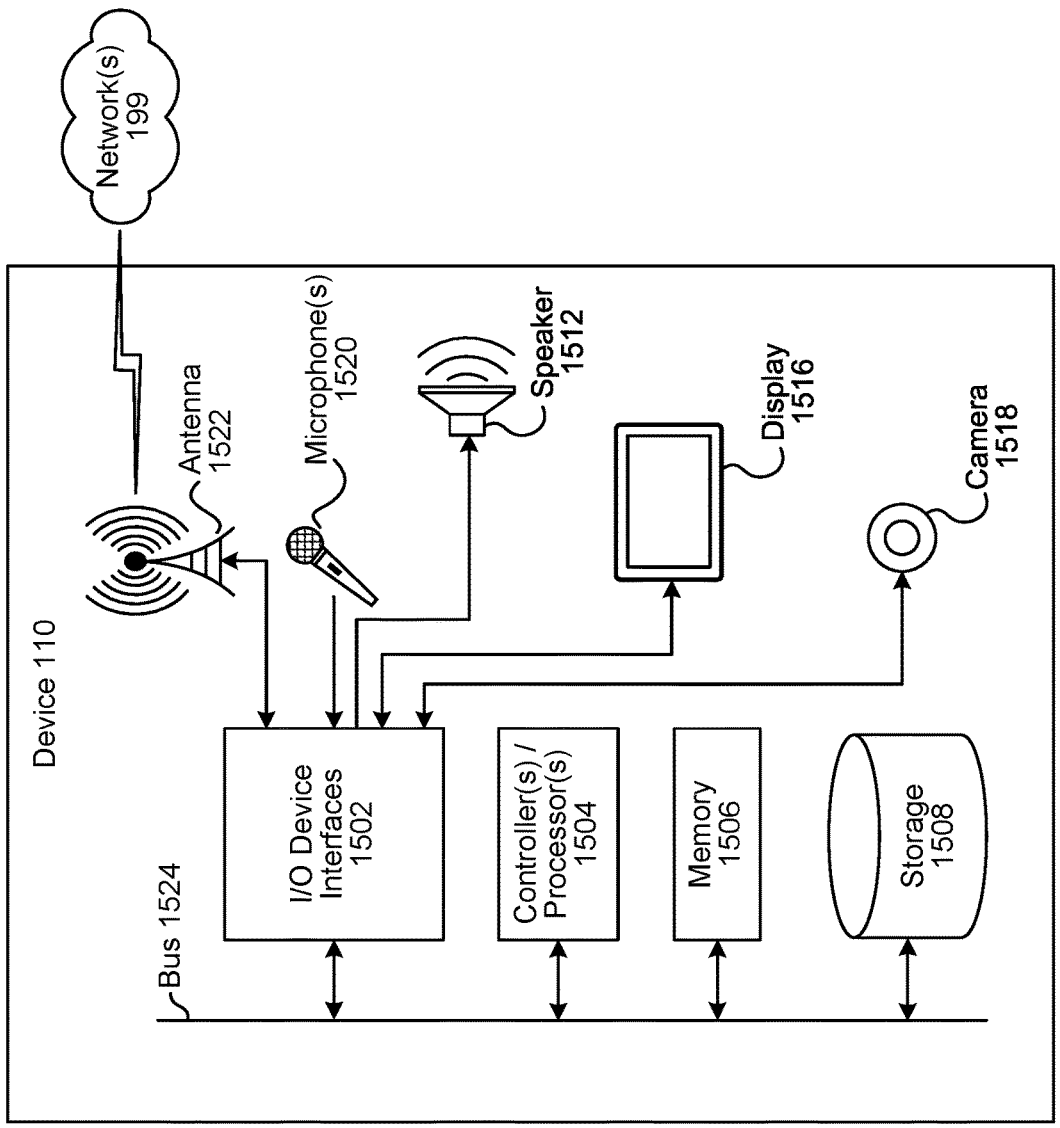
FIG. 15 is a block diagram conceptually illustrating example components of a device, according to embodiments of the present disclosure.
Figure 16:
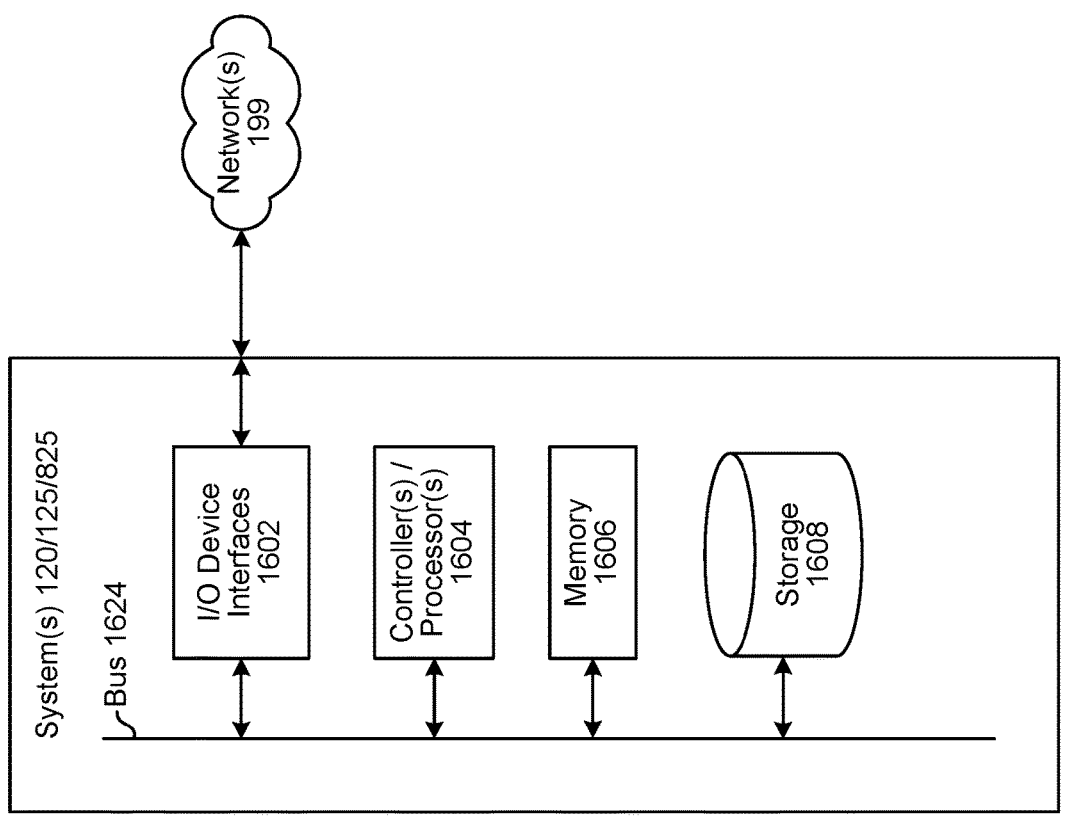
FIG. 16 is a block diagram conceptually illustrating example components of a system, according to embodiments of the present disclosure.

FIG. 15 is a block diagram conceptually illustrating a device 110 that may be used with the system. FIG. 16 is a block diagram conceptually illustrating example components of a remote device, such as the natural language command processing system component 120, which may assist with ASR processing, NLU processing, etc., and a skill support system component 825. A system (120/825) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 110 may operate locally to a user (e.g., within a same environment so the device may receive inputs and playback outputs for the user) the server/system component 120 may be located remotely from the device 110 as its operations may not require proximity to the user. The server/system component 120 may be located in an entirely different location from the device 110 (for example, as part of a cloud computing system or the like) or may be located in a same environment as the device 110 but physically separated therefrom (for example a home server or similar device that resides in a user's home or business but perhaps in a closet, basement, attic, or the like). The system component(s) 120 may also be a version of a user device 110 that includes different (e.g., more) processing capabilities than other user device(s) 110 in a home/office. One benefit to the server/system component 120 being in a user's home/business is that data used to process a command/return a response may be kept within the user's home, thus reducing potential privacy concerns.

Multiple systems (120/825) may be included in the overall system 100 of the present disclosure, such as one or more natural language processing system components 120 for performing ASR processing, one or more natural language processing system components 120 for performing NLU processing, one or more skill support system components 825, etc. In operation, each of these systems may include computer-readable and computer-executable instructions that reside on the respective device (120/825), as will be discussed further below.

Each of these devices (110/120/825) may include one or more controllers/processors (1504/1604), which may each include a central processing unit (CPU) for processing data and computer-readable instructions, and a memory (1506/1606) for storing data and instructions of the respective device. The memories (1506/1606) may individually include volatile random-access memory (RAM), non-volatile read only memory (ROM), non-volatile magnetoresistive memory (MRAM), and/or other types of memory. Each device (110/120/825) may also include a data storage component (1508/1608) for storing data and controller/processor-executable instructions. Each data storage component (1508/1608) may individually include one or more non-volatile storage types such as magnetic storage, optical storage, solid-state storage, etc. Each device (110/120/825) may also be connected to removable or external non-volatile memory and/or storage (such as a removable memory card, memory key drive, networked storage, etc.) through respective input/output device interfaces (1502/1602).

Computer instructions for operating each device (110/120/825) and its various components may be executed by the respective device's controller(s)/processor(s) (1504/1604), using the memory (1506/1606) as temporary "working" storage at runtime. A device's computer instructions may be stored in a non-transitory manner in non-volatile memory (1506/1606), storage (1508/1608), or an external device(s). Alternatively, some or all of the executable instructions may be embedded in hardware or firmware on the respective device in addition to or instead of software.

Each device (110/120/825) includes input/output device interfaces (1502/1602). A variety of components may be connected through the input/output device interfaces (1502/1602), as will be discussed further below. Additionally, each device (110/120/825) may include an address/data bus (1524/1624) for conveying data among components of the respective device. Each component within a device (110/120/825) may also be directly connected to other components in addition to (or instead of) being connected to other components across the bus (1524/1624).

Referring to FIG. 15, the device 110 may include input/output device interfaces 1502 that connect to a variety of components such as an audio output component such as a speaker 1512, a wired headset or a wireless headset (not illustrated), or other component capable of outputting audio. The device 110 may also include an audio capture component. The audio capture component may be, for example, a microphone 1520 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1516 for displaying content. The device 110 may further include a camera 1518.

Via antenna(s) 1522, the input/output device interfaces 1502 may connect to one or more networks 199 via a wireless local area network (WLAN) (such as Wi-Fi) radio, Bluetooth, and/or wireless network radio, such as a radio capable of communication with a wireless communication network such as a Long-Term Evolution (LTE) network, WiMAX network, 3G network, 4G network, 5G network, etc. A wired connection such as Ethernet may also be supported. Through the network(s) 199, the system may be distributed across a networked environment. The I/O device interface (1502/1602) may also include communication components that allow data to be exchanged between devices such as different physical servers in a collection of servers or other components.

The components of the device(s) 110, the natural language command processing system component 120, or a skill support system component 825 may include their own dedicated processors, memory, and/or storage. Alternatively, one or more of the components of the device(s) 110, the natural language command processing system component 120, or a skill support system component 825 may utilize the I/O interfaces (1502/1602), processor(s) (1504/1604), memory (1506/1606), and/or storage (1508/1608) of the device(s) 110, natural language command processing system component 120, or the skill support system component 825, respectively. Thus, the ASR component 850 may have its own I/O interface(s), processor(s), memory, and/or storage; the NLU component 860 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system component 120, and a skill support system component 825, as described herein, are illustrative, and may be located as a stand-alone device or may be included, in whole or in part, as a component of a larger device or system. As can be appreciated, a number of components may exist either on a system component 120 and/or on device 110. For example, language processing components 892 (which may include the ASR component 850 and NLU component 860), language output components 893 (which may include the NLG component 879 and TTS component 880), etc., for example as illustrated in FIG. 8.

Figure 17:
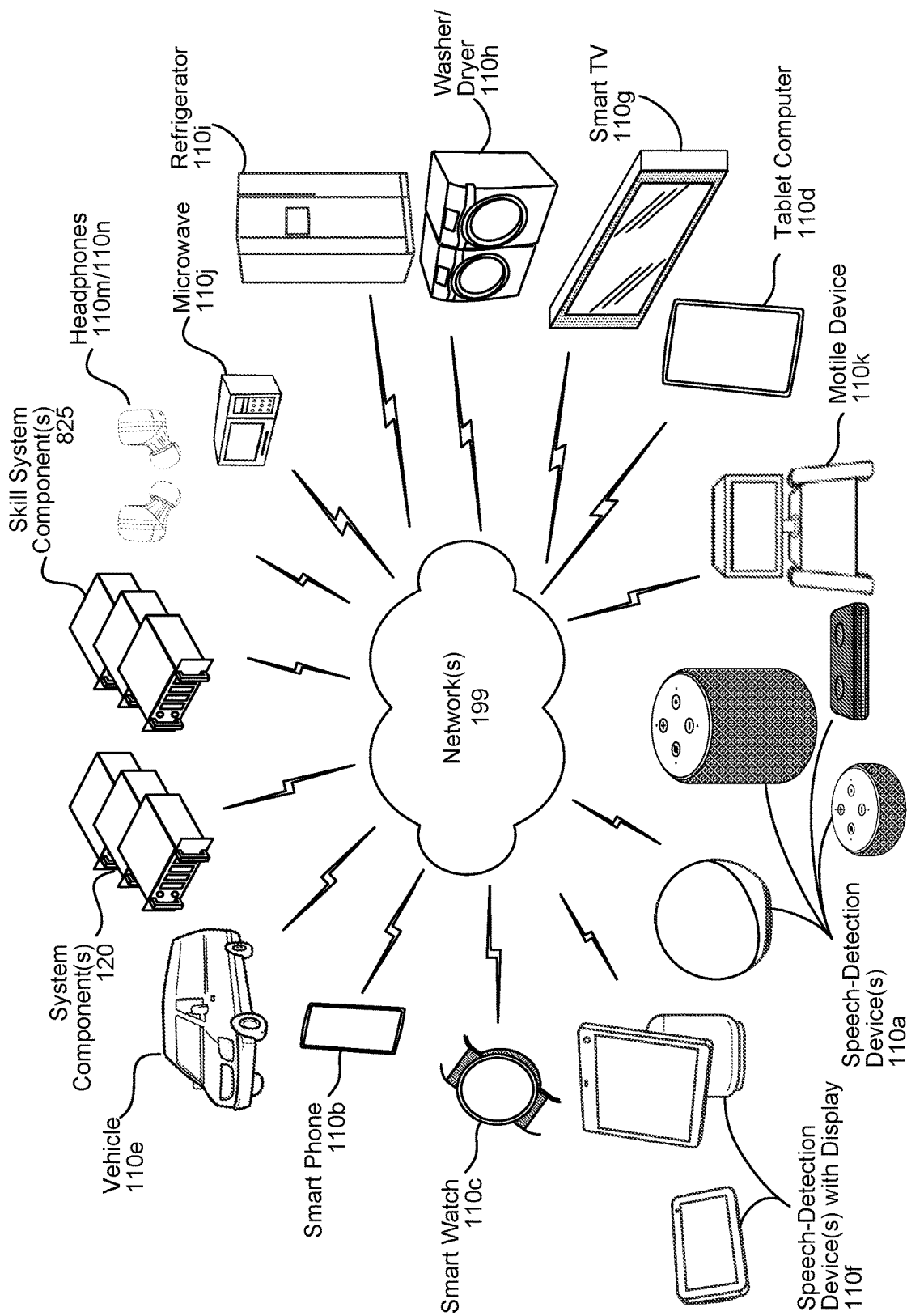
FIG. 17 illustrates an example of a computer network for use with the overall system, according to embodiments of the present disclosure.

As illustrated in FIG. 17, multiple devices (110a-110n, 120, 825) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a speech-detection device with display 110f, a display/smart television 110g, a washer/dryer 110h, a refrigerator 110i, a microwave 110j, autonomously motile device 110k (e.g., a robot), etc., may be connected to the network(s) 199 through a wireless service provider, over a Wi-Fi or cellular network connection, or the like. Other devices are included as network-connected support devices, such as the natural language command processing system component 120, the skill support system component(s) 825, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 850, the NLU component 860, etc. of the natural language command processing system component 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving, by a first system component, first context data representing a current interaction between a user and a first user device, the current interaction corresponding to a first type of activity;
   receiving second context data representing first sensor data generated by the first user device;
   processing the first context data and the second context data using a first neural network encoder to generate first embedding data representing a situational context of the user;
   receiving, from a first data storage component, user profile data corresponding to the user;
   receiving, from a second data storage component, first data representing factual information about the first type of activity;
   processing the user profile data and the first data using a second neural network encoder to generate second embedding data;
   processing the first embedding data and the second embedding data using a neural network decoder to generate fourth data representing a natural language description of the user's situational context;
   receiving, from the first user device, first input data representing a first utterance of the user;
   processing the first input data to determine first natural language understanding (NLU) data representing a user request;
   processing using the first NLU data and the fourth data, first response data; and
   causing the first user device to output the first response data.

2. The computer-implemented method of claim 1, further comprising:
   determining, using the first context data and the second context data, first tensor data corresponding to a first category of factual information associated with one or more of the first context data and the second context data;
   determining, using the first tensor data, second tensor data stored in a graph neural network in the second data storage component, wherein the first data includes the second tensor data and the user profile data includes third tensor data; and
   inputting the second tensor data and the third tensor data into the neural network decoder to generate the fourth data.

3. The computer-implemented method of claim 1, further comprising:
   determining, using the first NLU data, a first action to be performed and a first skill for handling the first action;
   determining second NLU data representing a second action to be performed and a second skill for handling the second action;
   sending, based on the fourth data, the first NLU data to a second system component corresponding to the second skill; and
   receiving, from the second system component, the first response data.

4. The computer-implemented method of claim 1, further comprising:
   sending, to the first user device prior to receiving the first context data, first model data representing an untrained model;
   receiving, from the first user device, second model data representing a model trained based on first context signals received by the first user device;
   receiving third model data representing models trained based on second context signals received by a second user device;
   determining, using the second model data and the third model data, fourth model data representing a global model for processing context signals;
   sending, to the first user device and at least a second user device, the fourth model data; and
   causing the first user device to generate the first context data using the fourth model data.

5. A computer-implemented method comprising:
   receiving first data representing a first user activity corresponding to a first user device;
   receiving second data representing sensor data generated by the first user device;
   determining, using the first data and the second data, first encoded data;
   receiving user profile data corresponding to a user of the first user device;
   receiving factual data associated with one or more of the first data or the second data;
   determining, using the user profile data and the factual data, second encoded data;
   processing the first encoded data and the second encoded data using a first neural network decoder to generate third data representing a natural language description of the user's situational context;
   receiving, from the first user device, first input data;
   processing the first input data to determine first natural language understanding (NLU) data representing a user request;
   determining, using the first NLU data and the third data, fourth data representing a response to the user request; and
   causing the first user device to output the fourth data.

6. The computer-implemented method of claim 5, further comprising:
   receiving fifth data representing user feedback to the output of the fourth data; and
   determining, using the fifth data, parameters for a second neural network decoder, the second neural network decoder representing an update of the first neural network decoder.

7. The computer-implemented method of claim 5, further comprising:
   determining, using the first NLU data, a first action to be performed and a first system component for handling the first action;
   determining second NLU data indicating a second action to be performed and a second system component for handling the second action;
   sending, based on the third data, the first NLU data to the first system component; and
   receiving the fourth data from the first system component.

8. The computer-implemented method of claim 5, further comprising:
   receiving, from a system component, fifth data representing a system-initiated action to perform on behalf of the user;

causing the first user device to output a request for user confirmation that the system-initiated action is to be performed;
receiving second input data representing user confirmation that the system-initiated action is to be performed; and
in response to receiving the second input data, causing the first user device to perform the system-initiated action.

9. The computer-implemented method of claim 5, further comprising:
determining, using the first data and the second data, a first category of factual data;
receiving, from a first data storage component, fifth data representing structured factual data corresponding to the first category;
receiving, from a second data storage component, sixth data representing unstructured data corresponding to the first category; and
determining the factual data using the fifth data and the sixth data.

10. The computer-implemented method of claim 5, further comprising:
receiving, from the first user device, second input data representing an utterance of the user;
processing the second input data to determine automatic speech recognition (ASR) data representing a transcript of the utterance;
processing the ASR data and the third data using an NLU component to generate second NLU data representing a user request; and
causing the first user device to perform an action associated with the user request.

11. The computer-implemented method of claim 5, further comprising:
sending, to the first user device prior to receiving the first data, first model data representing an untrained model;
receiving, from the first user device, second model data representing a model trained based on first context signals received by the first user device;
receiving third model data representing models trained based on second context signals received by a second user device;
determining, using the second model data and the third model data, fourth model data representing a global model for processing context signals;
sending, to the first user device and at least the second user device, the fourth model data; and
causing the first user device to generate the first third data using the fourth model data.

12. A system, comprising:
at least one processor; and
at least one memory comprising instructions that, when executed by the at least one processor, cause the system to:
receive, by a first system component, first data representing a first user activity corresponding to a first user device;
receive second data representing sensor data generated by the first user device;
determine, using the first data and the second data, first encoded data;
receive user profile data corresponding to a user of the first user device;
receive factual data associated with one or more of the first data or the second data;
determine, using the user profile data and the factual data, second encoded data;
process the first encoded data and the second encoded data using a first neural network decoder to generate third data representing a natural language description of the user's situational context;
receive, from the first user device, first input data;
process the first input data to determine natural language understanding (NLU) data representing a user request;
determine, using the NLU data and the third data, fourth data representing a response to the user request; and
cause the first user device to output the fourth data.

13. The system of claim 12, wherein the at least one memory further comprises instructions that, when executed by the at least one processor, further cause the system to:
receive fifth data representing user feedback to the output of the fourth data; and
determine, using the fifth data, parameters for a second neural network decoder, the second neural network decoder representing an update of the first neural network decoder.

14. The system of claim 12, wherein the at least one memory further comprises instructions that, when executed by the at least one processor, further cause the system to:
determine, using the first NLU data, a first action to be performed and a first system component for handling the first action;
determine second NLU data indicating a second action to be performed and a second system component for handling the second action;
send, based on the third data, the first NLU data to the first system component; and
receive the fourth data from the first system component.

15. The system of claim 12, wherein the at least one memory further comprises instructions that, when executed by the at least one processor, further cause the system to:
receive, from a system component, fifth data representing a system-initiated action to perform on behalf of the user;
cause the first user device to output a request for user confirmation that the system-initiated action is to be performed;
receive second input data representing user confirmation that the system-initiated action is to be performed; and
in response to receiving the second input data, cause the first user device to perform the system-initiated action.

16. The system of claim 12, wherein the at least one memory further comprises instructions that, when executed by the at least one processor, further cause the system to:
determine, using the first data and the second data, a first category of factual data;
receive, from a first data storage component, fifth data representing structured factual data corresponding to the first category;
receive, from a second data storage component, sixth data representing unstructured data corresponding to the first category; and
determine the factual data using the fifth data and the sixth data.

17. The system of claim 12, wherein the at least one memory further comprises instructions that, when executed by the at least one processor, further cause the system to:
receive, from the first user device, second input data representing an utterance of the user;
process the second input data to determine automatic speech recognition (ASR) data representing a transcript of the utterance;

process the ASR data and the third data using an NLU component to generate second NLU data representing a user request; and cause the first user device to perform an action associated with the user request.

18. The system of claim 12, wherein the at least one memory further comprises instructions that, when executed by the at least one processor, further cause the system to:

send, to the first user device prior to receiving the first data, first model data representing an untrained model;

receive, from the first user device, second model data representing a model trained based on first context signals received by the first user device;

receive third model data representing models trained based on second context signals received by a second user device;

determine, using the second model data and the third model data, fourth model data representing a global model for processing context signals;

send, to the first user device and at least the second user device, the fourth model data; and cause the first user device to generate the third data using the fourth model data.

\* \* \* \* \*